US012078370B2

(12) United States Patent
Cotton et al.

(10) Patent No.: US 12,078,370 B2
(45) Date of Patent: Sep. 3, 2024

(54) INTEGRATED COMMUNITY ENERGY AND HARVESTING SYSTEM

(71) Applicant: McMaster University, Hamilton (CA)

(72) Inventors: James Scott Cotton, Burlington (CA); Kelton Friedrich, Hamilton (CA); Vickram Lakhian, Hamilton (CA); Saber Mohamed, Hamilton (CA); Mohamed Yasser Abdelsalam, Hamilton (CA); Jorge Chebeir, Hamilton (CA); Jeff Girard, Hamilton (CA)

(73) Assignee: McMaster University, Hamilton (CA)

( * ) Notice: Subject to any disclaimer, the term of this patent is extended or adjusted under 35 U.S.C. 154(b) by 661 days.

(21) Appl. No.: 17/301,907

(22) Filed: Apr. 19, 2021

(65) Prior Publication Data

US 2021/0325069 A1    Oct. 21, 2021

Related U.S. Application Data

(60) Provisional application No. 63/011,704, filed on Apr. 17, 2020.

(51) Int. Cl.
*F24F 11/46* (2018.01)
*F24D 11/02* (2006.01)
(Continued)

(52) U.S. Cl.
CPC .......... *F24F 11/46* (2018.01); *F24D 11/0207* (2013.01); *F24F 5/0021* (2013.01);
(Continued)

(58) Field of Classification Search
CPC .......... G05B 2219/2614; G05B 19/042; G05B 2219/2639; G05B 15/02; H02J 2203/20;
(Continued)

(56) References Cited

U.S. PATENT DOCUMENTS 8,560,135 B2    10/2013    Tomita et al.
9,201,411 B2    12/2015    Bozchalui et al.
(Continued)

OTHER PUBLICATIONS

Lund H. et al., 4th generation district heating (4GDH): Integrating smart thermal grids into future sustainable energy systems, Energy, vol. 68, 2014, pp. 1-11.
(Continued)

*Primary Examiner* — Ryan Johnson

(57) ABSTRACT

A district energy system includes at least one energy provisioning unit, an energy management controller; a thermal distribution network coupled to the energy provisioning units and to a plurality of coupling interfaces connectable to the associated HVAC system of buildings within a district, and an electrical distribution network coupled to the energy provisioning units and to the coupling interfaces. The coupling interfaces may include both heat pumps and heat exchangers at each building, to provide heating, cooling and enable harvesting of normally wasted thermal energy from the buildings for re-distribution. The controller can manage the selection and number of energy provisioning units (and their operational set points) coupled to the district thermal distribution network and the electrical distribution network to meet the thermal and electrical demands of the district while satisfying other operational goals such as the minimization of greenhouse gas emissions.

28 Claims, 24 Drawing Sheets

(51) Int. Cl.
    *F24F 5/00*     (2006.01)
    *F24F 11/47*     (2018.01)
    *F24F 11/63*     (2018.01)
    *G05B 19/042*     (2006.01)
    *H02J 3/38*     (2006.01)

(52) U.S. Cl.
    CPC .............. *F24F 11/47* (2018.01); *F24F 11/63* (2018.01); *G05B 19/042* (2013.01); *F24D 2200/11* (2013.01); *F24D 2200/13* (2013.01); *F24D 2200/32* (2013.01); *F24F 2203/02* (2013.01); *G05B 2219/2614* (2013.01); *G05B 2219/2639* (2013.01); *H02J 3/381* (2013.01); *H02J 2203/20* (2020.01); *H02J 2310/12* (2020.01); *H02J 2310/48* (2020.01)

(58) Field of Classification Search
    CPC ........ H02J 2310/12; H02J 3/003; H02J 3/381; H02J 3/004; Y02E 20/14; Y02E 40/70; Y02E 60/14; Y02E 70/30; Y02B 30/17; F24D 10/00; F24D 10/003; F24D 11/0207; F24D 2200/13
    See application file for complete search history.

(56) References Cited

U.S. PATENT DOCUMENTS

| | | |
|---|---|---|
| 2002/0082747 A1 | 6/2002 | Kramer |
| 2014/0148963 A1 | 5/2014 | Ozog |
| 2016/0172854 A1 | 6/2016 | Zhou et al. |
| 2016/0285266 A1* | 9/2016 | Rüdlinger ............... H02J 3/381 |
| 2018/0322591 A1* | 11/2018 | Bellissima ............. G06Q 50/06 |
| 2018/0366953 A1 | 12/2018 | De Tommasi et al. |
| 2019/0154288 A1 | 5/2019 | Adirim |
| 2019/0369581 A1 | 12/2019 | Gu et al. |
| 2021/0381715 A1* | 12/2021 | Rosén ....................... F24D 3/18 |

OTHER PUBLICATIONS

Lund H. et al., The status of 4th generation district heating: Research and results, Energy, vol. 164, 2018.

Buffa S. et al., 5th generation district heating and cooling systems: A review of existing cases in Europe, Renewable and Sustainable Energy Reviews, vol. 104, 2019.

Bunning F. et al., Bidirectional low temperature district energy systems with agent-based control: Performance comparison and operation optimization, Applied Energy, 2017, pp. 1-24.

\* cited by examiner

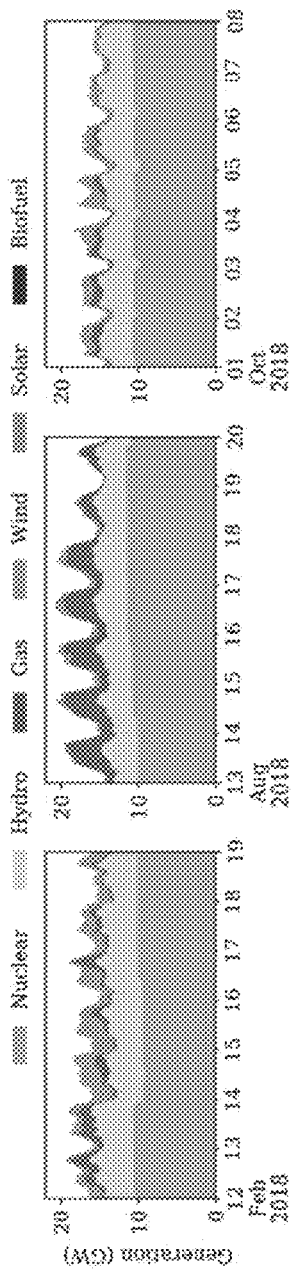
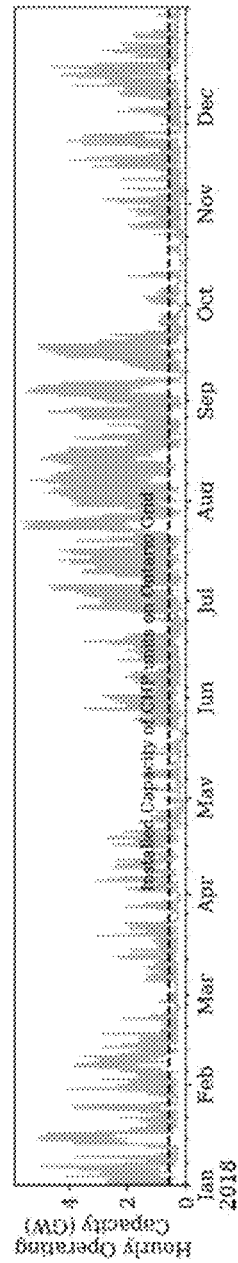
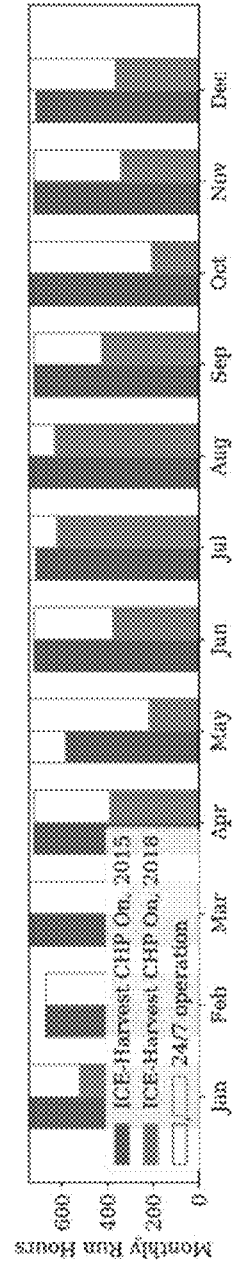
FIG. 14A
FIG. 14B
FIG. 14C

INTEGRATED COMMUNITY ENERGY AND HARVESTING SYSTEM

CROSS-REFERENCE TO RELATED APPLICATION

This application claims the benefit of U.S. Provisional Application No. 63/011,704, filed Apr. 17, 2020, the entirety of which is incorporated herein by reference.

FIELD

This specification relates generally to systems for energy management and distribution, and in particular integrated systems, devices and methods for community-level and grid-level energy management and distribution.

BACKGROUND

The following is not an admission that anything discussed below is part of the prior art or part of the common general knowledge of a person skilled in the art.

United States Patent Publication No. 2018/0366953 A1 of De Tommasi et al. purports to disclose an energy distribution system that includes at least one electric energy load and at least one thermal energy load. A grid of the system selectively supplies electric energy in accordance with a grid tariff profile. The energy distribution system further includes electric and thermal energy sources along with an energy management system that includes a computer processor and a computer readable storage media configured to forecast thermal and electrical energy loads, forecast electric energy generation capability of the electric energy source, forecast thermal energy generation capability of the thermal energy source, and perform an analysis based on energy availability and cost to meet the thermal and electrical energy load forecasts.

United States Patent Publication No. 2019/0154288 A1 of Adirim purports to disclose a method and system for optimizing the operation of a geo-exchange system, by generating predictive models pertaining to energy demand and energy capacity for a particular building or district, based on data from sensors associated with components of a district geo-exchange system, historical and real-time operational data associated with district modules, including weather forecast data and current weather conditions.

United States Patent Publication No. 2019/0369581 A1 of Gu et al. purports to disclose an integrated energy system operational optimization method considering thermal inertia of district heating networks and buildings, comprising the steps of respectively establishing a district heating network model considering transmission delay and heat loss and a building model considering thermal storage capacity; establishing an integrated energy system optimization model consisting of a combined cooling, heat and power system model, the district heating network model and the building model; solving the integrated energy system optimization model to obtain an optimal scheduling plan, control outputs of a gas turbine and a gas boiler per hour according to the optimal scheduling plan, and purchase electricity from a power grid and a wind power. According to the method, both the district heating network and buildings are included in a scheduling scope, so that the load adjustment with multiple degrees of freedom can be achieved.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

The present application relates to district energy systems that may enable a concept referred to as Integrated Community Energy and Harvesting systems (ICE-Harvest systems). An example of ICE-Harvest systems may employ a modular self-contained energy management center (EMC) connected to a selected group of buildings with diverse electrical and thermal demands through a micro-thermal network and to the electrical grid through a smart micro-grid. The EMC of the ICE-Harvest system can encompass embedded localized electrical provisioning resources (e.g. electrical generation and/or storage resources) and thermal provisioning resources (e.g. thermal generation and/or storage resources) within the thermal network. The micro-thermal network can operate as a thermal distribution grid (for instance, a single pipe loop a few kilometers in length) with individual heat pumps and heat exchangers interfacing with each building to provide heating, cooling and the ability to harvest normally wasted thermal energy from the buildings for re-distribution. This coupling of heat pumps between the micro-thermal network and electrical micro-grid can tie the typically independent electrical and thermal grids together. The ICE-Harvest systems may thus enable a holistic and optimizable energy viewpoint to address community electrical and thermal loads while simultaneously providing distributed electrical system operator grid services. ICE-Harvest systems can be implemented using optimized design and operational processes to maximize operational value in order to achieve multiple objectives such as reducing GHG emissions, providing ancillary services to the grid, providing resiliency to service disruptions, and providing flexibility to manage risks for example.

The present disclosure provides district energy systems and methods that can be used for a community node or district. The district can include multiple buildings. Most, if not all, of the buildings will have an associated heating, ventilation, and air conditioning (HVAC) system. Each of the buildings can be electrically connected to an electrical micro-grid for the district (a district electrical distribution network). Each of the buildings can also be thermally connected to a micro-thermal network for the district (a district thermal distribution network or thermal micro-grid). A central energy management unit can be connected to both the electrical micro-grid and the micro-thermal network. The central energy management unit can control and monitor the flow of electrical and thermal energy within the district. The central energy management unit can control the type and number of thermal energy resources coupled to the micro-thermal network (also referred to as district thermal energy resource management) based on the thermal and electrical demand in the district as well as the available electricity supply from the central energy management unit. The selection of the thermal energy resource type(s) and numbers coupled through the micro-thermal network may also be controlled based on the available electricity supply from an electrical transmission grid connected to the central energy management unit. The selection of the type and number of thermal energy resources can be controlled to satisfy one or more operational criteria, such as minimizing the electricity needed to be generated from energy sources that emit greenhouse gases. District thermal energy resources can also be controlled to capture and use energy from energy generation sources that would otherwise be curtailed or lost due to low demand.

In accordance with one aspect of this disclosure, which may be used alone or in combination with any other aspect, there is provided a district energy system for a district comprising a plurality of buildings, each building having an associated heating, ventilation, and air conditioning (HVAC) system and associated electrical loads, the district energy system comprising: a central energy management unit comprising: at least one energy provisioning unit, the at least one energy provisioning unit including at least one thermal storage element, each thermal storage element configured to store thermal energy; and an energy management controller; a district thermal distribution network thermally coupled to the central energy management unit and thereby the at least one energy provisioning unit, the district thermal distribution network comprising at least one fluid conduit, each fluid conduit transporting a heat transfer fluid, the district thermal distribution network comprising a plurality of external thermal coupling interfaces, each external thermal coupling interface connectable to the associated HVAC system of one of the buildings in the plurality of buildings within the district, wherein the district thermal distribution network is operable to transfer thermal energy between the central energy management unit and each external thermal coupling interface using the heat transfer fluid; a district electrical distribution network electrically coupled to the central energy management unit, the district electrical distribution network comprising a plurality of external electrical coupling interfaces, each external electrical coupling interface connectable to one of the buildings in the plurality of buildings within the district, wherein the district electrical distribution network is operable to transfer electrical energy between the central energy management unit and each external electrical coupling interface; wherein the energy management controller is configured to: determine a district thermal energy demand and a district electrical energy demand for the plurality of buildings based on a thermal demand of the HVAC system of each building and associated electrical loads of each building; determine a district electricity supply state of the central energy management unit; determine a district operational energy state based on the district thermal energy demand, district electrical energy demand, and the district energy supply state; and adjust the operation of the at least one energy provisioning unit and/or the thermal coupling between the district thermal distribution network and the at least one energy provisioning unit based on the district operational energy state such a set of energy provisioning units coupled with the central energy management unit and the plurality of external thermal coupling interfaces using the thermal distribution network is responsive to the district operational energy state.

In any embodiment, the at least one energy provisioning unit may include a combined heat and power generation unit; the combined heat and power generation unit can be thermally coupled to the at least one thermal storage element and to the thermal distribution network; and the energy management controller can be configured to operate the central energy management unit to perform at least one of: storing excess thermal energy generated by the combined heat and power generation unit using the at least one thermal storage element; and/or directing at least some of the excess thermal energy to the plurality of external thermal coupling interfaces using the thermal distribution network.

In any embodiment, the at least one energy provisioning unit may include a bidirectional heat pump; the bidirectional heat pump may be thermally coupled to the at least one thermal storage element and to the thermal distribution network; and the energy management controller may be configured to: operate the bidirectional heat pump using electricity from the central energy management unit to generate heat pump thermal energy; and operate the central energy management unit to perform at least one of: storing the heat pump thermal energy using the at least one thermal storage element; and/or directing at least some of the heat pump thermal energy to the plurality of external thermal coupling interfaces using the thermal distribution network.

In any embodiment, the at least one energy provisioning unit may include at least one bidirectional heat pump and the energy management controller may be configured to: determine that the district operational energy state is an excess carbon-free electricity supply state by determining that the district energy supply state represents an excess supply of electricity from carbon-free energy sources that exceeds the district electrical energy demand; operate the at least one bidirectional heat pump using at least some of the excess supply of electricity to generate heat pump thermal energy; and store the heat pump thermal energy using the at least one thermal storage element.

In any embodiment, the district energy system may include a plurality of energy transfer interfaces, each energy transfer interface coupled to a particular building in the plurality of buildings within the district, each energy transfer interface defining both the external electrical coupling interface and external thermal coupling interface corresponding to that particular building, where each energy transfer interface can be configured to enable the transfer of: thermal energy between the associated HVAC system of that particular building and the district thermal distribution network; and electrical energy between that particular building and the district electrical distribution network.

In any embodiment, each energy transfer interface may include at least one bidirectional heat pump and at least one heat exchanger connectable to the associated HVAC system of that particular building.

In any embodiment, each energy transfer interface may be configured to enable a bidirectional transfer of thermal energy between the associated HVAC system of that particular building and the district thermal distribution network.

In any embodiment, a temperature of the heat transfer fluid in the at least one fluid conduit may be adjustable.

In any embodiment, the energy management controller may be configured to: determine an on-peak operating temperature and an off-peak operating temperature; adjust the temperature of the heat transfer fluid to the on-peak operating temperature during an on-peak period in the district; and adjust the temperature of the heat transfer fluid to the off-peak operating temperature during an off-peak period in the district. In any embodiment, the energy management controller may be configured to adjust the temperature of the heat transfer fluid between the on-peak operating temperature and the off-peak operating temperature in timescales to provide ancillary services to the electrical grid due to the change in heat pump electrical consumption caused by a change heat transfer fluid temperature In any embodiment, the energy management controller may be configured to: determine a first seasonal operating temperature and a second seasonal operating temperature; adjust the temperature of the heat transfer fluid to the first seasonal operating temperature during a first season period in the district; and adjust the temperature of the heat transfer fluid to the second seasonal operating temperature during a second season period in the district.

In any embodiment, the at least one thermal storage element may include at least one short-term thermal storage tank.

In any embodiment, the at least one short-term thermal storage tank may hold a phase change material as a thermal storage medium.

In any embodiment, the at least one thermal storage element may include at least one seasonal storage element.

In any embodiment, the at least one seasonal storage element may include a thermally stratified geothermal storage element, the thermally stratified geothermal storage element having a central storage region and a perimeter storage region, the perimeter storage region at least partially surrounding a perimeter of the central storage region; the central storage region can be operated to store thermal energy of a first temperature and the perimeter storage region can be operated to store thermal energy of a second temperature; and the second temperature is nearer to an environmental temperature of a surrounding environment than the first temperature.

In any embodiment, the district energy system may also include at least one electrical storage element electrically coupled to the district electrical distribution network.

In any embodiment, the district energy system may also include at least one EV charging interface coupled to the district electrical distribution network, each EV charging interface operable to charge and discharge a vehicle energy storage system of an electric vehicle electrically connected thereto.

In any embodiment, the central energy management unit may be housed within one or more shipping containers.

In any embodiment, each energy provisioning unit other than the at least one seasonal storage element may be housed within a separate shipping container.

In any embodiment, the at least one energy provisioning unit may include a plurality of energy provisioning units including the at least one thermal storage element and at least one energy generating element; the central energy management unit may include an internal thermal distribution network operable to transfer thermal energy to and from each of the energy provisioning units, the internal thermal distribution network can include a plurality of fluid conduit networks, the plurality of fluid conduit networks including a first fluid conduit network and a second fluid conduit network, where each fluid conduit network is fluidly coupled to each energy provisioning unit; where the first fluid conduit network transports a first heat transfer fluid in a first temperature range that is greater than 60° C.; and the second fluid conduit network transports a second heat transfer fluid in a second temperature range between 15° C. and 60° C.

In any embodiment, the plurality of fluid conduit networks may include a third fluid conduit network, where the third fluid conduit network transports a third heat transfer fluid in a third temperature range that is less than 15° C.

In any embodiment, each fluid conduit network may be fluidly coupled to each energy provisioning unit by a unit specific conduit interface; and the unit specific conduit interface for each energy provisioning unit can include: a pair of fluid conduits, the pair of fluid conduits comprising a supply conduit and a return conduit; a fluid pump operable to control the flow of heat transfer fluid through the supply conduit and the return conduit; and a heat exchanger coupled to the pair of fluid conduits, the heat exchanger operable to adjust a temperature of the heat transfer fluid received from the supply conduit prior to the heat transfer fluid being returned to the fluid conduit network via the return conduit.

In any embodiment, the pair of fluid conduits may be selectively connectable to each fluid conduit network; and the unit specific conduit interface for each energy provisioning unit may include a thermal loop valve that is operable to adjust which fluid conduit network is connected to the pair of fluid conduits, where the thermal loop valve can be configured to prevent the pair of fluid conduits from being connected to more than one of the fluid conduit networks at any given time.

In any embodiment, the unit specific conduit interface for each energy provisioning unit may include a separate pair of fluid conduits connectable to each fluid conduit network In any embodiment, the energy management controller may be configured to: determine that the district operational energy state is an excess carbon-free electricity supply state; and control the operation of the at least one energy provisioning unit and/or the thermal coupling between the district thermal distribution network and the at least one energy provisioning unit to prioritize electrification of thermal loads over non-harvested energy resources.

In any embodiment, the at least one energy provisioning unit may include a combined heat and power generation unit and the energy management controller may be configured to: determine that the district operational energy state is a fossil fuel electricity supply state; and control the operation of the at least one energy provisioning unit and/or the thermal coupling between the district thermal distribution network and the at least one energy provisioning unit to prioritize use of thermal energy from the combined heat and power generation unit as a thermal source for the district thermal distribution network over non-harvested energy resources.

In any embodiment, the energy management controller may be configured to: control the operation of the at least one energy provisioning unit and/or the thermal coupling between the district thermal distribution network and the at least one energy provisioning unit based on one or more operational criteria, wherein the one or more operational criteria include at least one of: a GHG emission minimization criteria; a grid ancillary service criteria; a service disruption resiliency criteria; or a risk management flexibility criteria.

In any embodiments, the energy management controller may be configured to: determine that the district operational energy state is an excess harvested thermal energy state; and control the operation of the at least one energy provisioning unit and/or the thermal coupling between the district thermal distribution network and the at least one energy provisioning unit to prioritize use of the excess harvested thermal energy as a thermal source for the district thermal distribution network over non-harvested energy resources.

In accordance with this broad aspect, there is also provided a district energy system for a district comprising a plurality of buildings, each building having an associated heating, ventilation, and air conditioning (HVAC) system and associated electrical loads, the district energy system comprising: at least one energy provisioning unit, the least one energy provisioning unit including at least one thermal energy provisioning unit and at least one electrical energy provisioning unit; and an energy management controller; a district thermal distribution network thermally coupled to the at least one thermal energy provisioning unit and the energy management controller, the district thermal distribution network comprising at least one fluid conduit, each fluid conduit transporting a heat transfer fluid, the district thermal distribution network comprising a plurality of external thermal coupling interfaces, each external thermal coupling interface connectable to the associated HVAC system of one of the buildings in the plurality of buildings within the district, wherein the district thermal distribution network is operable to transfer thermal energy between the at least one thermal energy provisioning unit and each external thermal coupling interface using the heat transfer fluid; a district electrical distribution network electrically coupled to the at least one electrical energy provisioning unit, the district electrical distribution network comprising a plurality of external electrical coupling interfaces, each external electrical coupling interface connectable to one of the buildings in the plurality of buildings within the district, wherein the district electrical distribution network is operable to transfer electrical energy between the at least one electrical energy provisioning unit and each external electrical coupling interface; wherein the energy management controller is configured to: determine a district thermal energy demand and a district electrical energy demand for the plurality of buildings based on a thermal demand of the HVAC system of each building and associated electrical loads of each building; determine a district electricity supply state of the at least one electrical energy provisioning unit; determine a district operational energy state based on the district thermal energy demand, district electrical energy demand, and the district energy supply state; and adjust the operation of the at least one thermal energy provisioning unit and/or the thermal coupling between the district thermal distribution network and the at least one thermal energy provisioning unit based on the district operation energy state such that a set of the thermal energy provisioning units coupled with the plurality of external thermal coupling interfaces using the thermal distribution network is responsive to the district operational energy state.

In accordance with another aspect of this disclosure, which may be used alone or in combination with any other aspect, there is provided a centralized energy management unit for a district comprising a plurality of buildings, each building having an associated heating, ventilation, and air conditioning (HVAC) system and associated electrical loads, the centralized energy management unit comprising: a plurality of energy provisioning units, the plurality of energy provisioning units including at least one combined heat and power generation unit and at least one heat pump, and at least one seasonal storage unit; an internal thermal distribution network thermally coupled to the plurality of energy provisioning units, the internal thermal distribution network operable to transfer thermal energy between each of the energy provisioning units and between each of the energy provisioning units and the at least one seasonal storage element; a district thermal network interface connectable to a district thermal distribution network, wherein the district thermal network interface is operable to transfer thermal energy between the internal thermal distribution network and the district thermal distribution network; an internal electrical distribution network electrically coupled to the plurality of energy provisioning units, the internal electrical distribution network operable to transfer electrical energy between the energy provisioning units; a district electrical network interface connectable to a district electrical distribution network, wherein the district electrical network interface is operable to transfer electrical energy between the internal electrical distribution network and the district electrical distribution network and to thereby transfer electrical energy between the plurality of energy provisioning units and the district electrical distribution network; and an energy management controller operable to: adjust the thermal coupling between the internal thermal distribution network and the plurality of energy provisioning units and to thereby manage the transfer of thermal energy between the internal thermal distribution network and the district thermal distribution network using the district thermal network interface; and adjust the electrical coupling between the internal electrical distribution network and the plurality of energy provisioning units and to thereby manage the transfer of electrical energy between the internal electrical distribution network and the district electrical distribution network using the district electrical network interface.

In any embodiment, the centralized energy management unit may be housed entirely within a one or more shipping containers.

In any embodiment, each energy provisioning unit other than the at least one seasonal storage element may be housed within a separate shipping container.

In any embodiment, the internal thermal distribution network may include a plurality of fluid conduit networks, the plurality of fluid conduit networks including a first fluid conduit network and a second fluid conduit network, where each fluid conduit network is fluidly coupled to the plurality of energy provisioning unit; the first fluid conduit network transports a first heat transfer fluid in a first temperature range that is greater than 60° C.; and the second fluid conduit network transports a second heat transfer fluid in a second temperature range between 15° C. and 60° C.

In any embodiment, the plurality of fluid conduit networks may include a third fluid conduit network, where the third fluid conduit network transports a third heat transfer fluid in a third temperature range that is less than 15° C.

In any embodiment, each fluid conduit network may be fluidly coupled to each energy provisioning unit by a unit specific conduit interface; and each unit specific conduit interface can include: a pair of fluid conduits, the pair of fluid conduits comprising a supply conduit and a return conduit; a fluid pump operable to control the flow of heat transfer fluid through the supply conduit and the return conduit; and a heat exchanger coupled to the pair of fluid conduits, the heat exchanger operable to adjust a temperature of the heat transfer fluid received from the supply conduit prior to the heat transfer fluid being returned to the fluid conduit network via the return conduit.

In any embodiment, the pair of fluid conduits may be selectively connectable to each fluid conduit network; and each unit specific conduit interface can include a thermal loop valve that is operable to adjust which fluid conduit network is connected to the pair of fluid conduits, where the thermal loop valve is configured to prevent the pair of fluid conduits from being connected to more than one of the fluid conduit networks at any given time.

In any embodiment, each unit specific conduit interface may include a separate pair of fluid conduits connectable to each fluid conduit network.

In any embodiment, the at least one seasonal storage element may include a thermally stratified geothermal storage element, the thermally stratified geothermal storage element having a central storage region and a perimeter storage region, the perimeter storage region at least partially surrounding a perimeter of the central storage region; the central storage region can be operated to store thermal energy of a first temperature and the perimeter storage region can be operated to store thermal energy of a second temperature; and the second temperature is nearer to an environmental temperature of a surrounding environment than the first temperature.

In any embodiment, the centralized energy management unit may include an electrical grid interface electrically coupled to an electricity transmission grid; where the electrical grid interface may be adjustable to an isolation mode in which the electrical grid interface electrically isolates the centralized energy management unit and the district electrical distribution network from the electricity transmission grid; and in the isolation mode, the plurality of energy provisioning units can be configured to generate sufficient electrical and thermal energy to supply the associated heating, ventilation, and air conditioning (HVAC) system and the associated electrical loads for each building in the plurality of buildings.

In accordance with another aspect of this disclosure, which may be used alone or in combination with any other aspect, there is provided a computer-implemented method for controlling a district energy system for a district comprising a plurality of buildings, each building having an associated heating, ventilation, and air conditioning (HVAC) system, the district energy system including at least one energy provisioning unit, the at least one energy provisioning unit including at least one thermal storage unit, a district electrical distribution network coupled to the at least one energy provisioning unit and the plurality of buildings, and a district thermal distribution network coupled to the at least one energy provisioning unit and the associated HVAC system of each building, the computer-implemented method comprising: determining a long-term prediction of system operational states including a predicted thermal load demand for the plurality of buildings, a predicted electrical load demand for the plurality of buildings, and a predicted energy supply state of the at least one energy provisioning unit, wherein the long-term prediction of system operational states is determined for a first forward-looking period, wherein the first forward-looking period is in a long-term range between 6 months and two years; determining a short-term prediction of the system operational states based on the long-term prediction of the system operational states, wherein the short-term prediction of the system operational states is determined for a second forward-looking period, wherein the second forward-looking period is at most one-fourth of the first forward-looking period and the second forward-looking period is in the range of half a day to two weeks; determining a real-time prediction of the system operational states based on the short-term prediction of the system operational states and feedback data from the district energy system, the feedback data representing current system operational states of the district energy system and the electricity transmission grid, wherein the real-time prediction of the system operational states is determined for a third forward-looking period, wherein the third forward-looking period is at most one-twelfth of the second forward-looking period and the third forward-looking period is in the range of 15 minutes to 1 hour; identifying operational set points for the district energy system based on the real-time prediction of the system operational states; and controlling a current operational status of the at least one energy provisioning unit, the coupling between the district electrical distribution network and the at least one the energy provisioning unit, and the coupling between district thermal distribution network and the at least one the energy provisioning unit to provide the identified operational set points.

In any embodiment, the current operational status of the at least one and the at least one the energy provisioning unit, the district electrical distribution network, and the district thermal distribution network can be controlled using agent-based control.

In any embodiment, the method can include repeatedly updating the long-term prediction of system operational states at a long-term prediction interval, where the long-term prediction interval is at most a month.

In any embodiment, the method can include repeatedly updating the short-term prediction of system operational states at a short-term prediction interval, where the long-term prediction interval is at most an hour.

In any embodiment, the method can include repeatedly updating the real-time prediction of system operational states at a real-time prediction interval, where the real-time prediction interval is at most 10 minutes.

It will be appreciated by a person skilled in the art that an apparatus, system or method disclosed herein may embody any one or more of the features contained herein and that the features may be used in any particular combination or sub-combination.

These and other aspects and features of various embodiments will be described in greater detail below.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

BRIEF DESCRIPTION OF THE DRAWINGS

For a better understanding of the various embodiments described herein, and to show more clearly how these various embodiments may be carried into effect, reference will be made, by way of example, to the accompanying drawings in which:

FIG. 14A shows an example plot of electrical grid energy generation sources involving a mix of carbon-free and fossil-fuel generation sources during a winter month (February), a summer month (August) and an autumn month (October);

FIG. 14B shows a plot of the hourly operating capacity of Natural Gas Generators on the Ontario Electricity Grid for the year of 2018; and FIG. 14C shows an example plot of expected monthly run hours for a district energy system such as the district energy system shown in FIG. 1 to displace the operation of centralized turbine generators used as peaking power plants on the Ontario Electricity Grid for the years 2015 and 2018.

Figure 1:
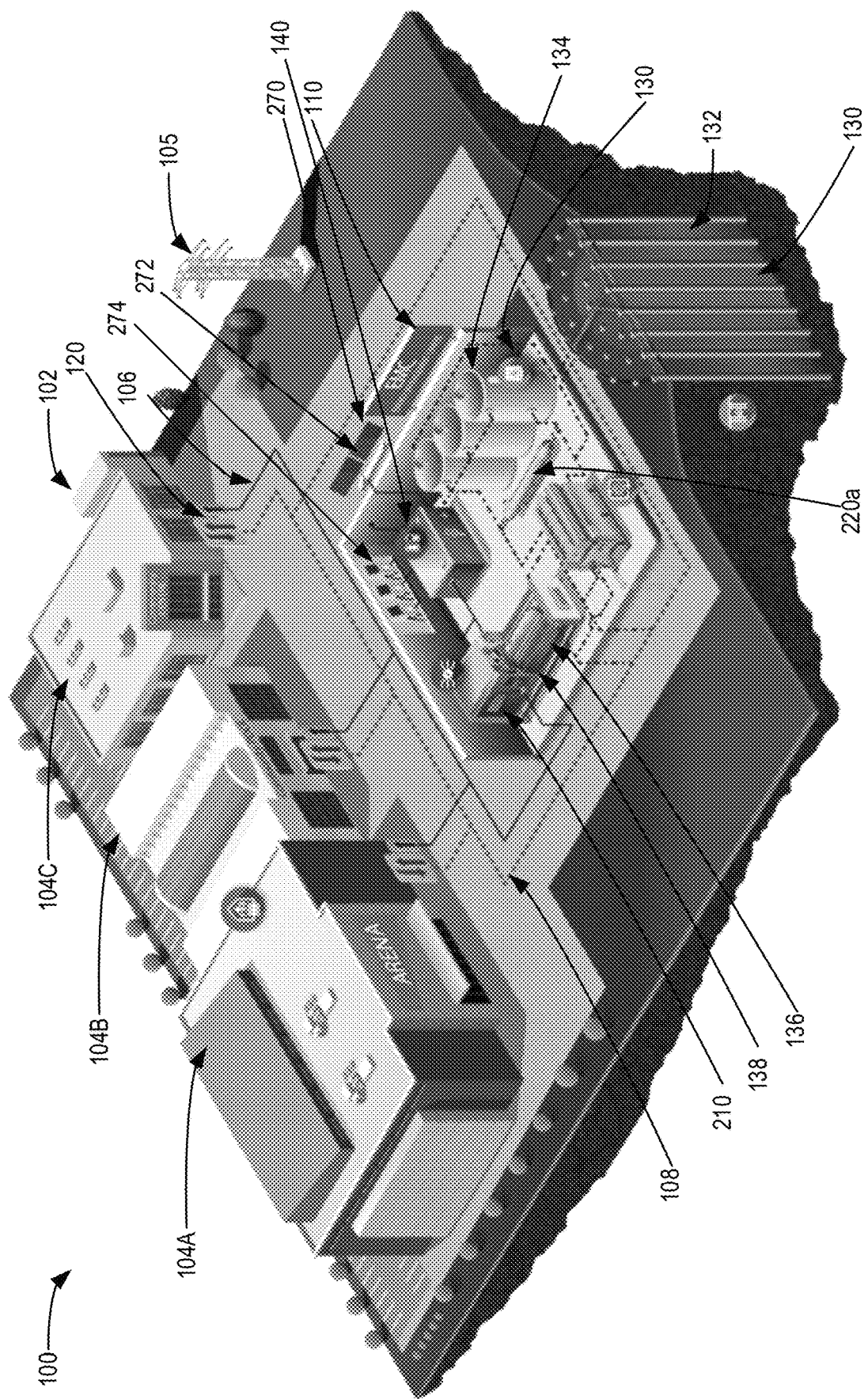
FIG. 1 shows a schematic of a district including an example district energy system.

The drawings included herewith are for illustrating various examples of aspects and features of the systems, methods, and apparatuses of the teaching of the present specification and are not intended to limit the scope of what is taught in any way.

For simplicity and clarity of illustration, elements shown in the Figures have not necessarily been drawn to scale. Further, where considered appropriate, reference numerals may be repeated among the Figures to indicate corresponding or analogous elements.

DETAILED DESCRIPTION OF THE INVENTION

Various systems, methods and apparatuses are described below to provide an example of an embodiment of each claimed invention. No embodiment described below limits any claimed invention and any claimed invention may cover apparatuses and methods that differ from those described below. The claimed inventions are not limited to systems, methods and apparatuses having all of the features of any one system, method or apparatus described below or to features common to multiple or all of the systems, methods and apparatuses described below. It is possible that a system, method or apparatus described below is not an embodiment of any claimed invention. Any invention disclosed in a system, method or apparatus described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present application relates to community-level and grid-level energy management. In particular, the present application provides systems, methods, and devices that can be used to manage both electrical and thermal (heating and cooling) demand (and supply) for a group of buildings (referred to as a district or community node). Embodiments described herein can be configured to manage districts with variable load diversities while providing a number of benefits that can include system design flexibility, reductions in greenhouse gas emissions, energy resiliency, demand management, and power quality services to electrical grids that use a mixture of carbon-free and fossil-fuel generation sources.

Embodiments of the systems and methods described herein can involve a suite of energy provisioning sources such as energy generation sources and energy storage units such as thermal storage elements. In some examples, electrical storage elements are also provided. The energy generation sources and thermal storage elements (as well as any electrical storage elements) can be linked to thermal and electrical networks for a district. The energy generation sources and energy storage elements can be configured to operate according to one or more operational targets (e.g. minimizing greenhouse gas emissions).

For simplicity, examples are described herein in the context of an operational target of minimizing greenhouse gas emissions, although it should be understood that various other operational targets may be used individually or in combination, such as reducing peak demand, peak mitigation, and/or demand for example. The specific operational goals may vary from district to district, for instance based on the existing generation mix of the electrical grid and/or the level of electrified heating within the district.

In general, examples are described in relation to the electricity generation mix in the jurisdiction of Ontario, which involves a combination of various different energy generation sources including carbon-free generation sources such as wind, solar hydro-electric, nuclear and carbon emitting sources such as natural gas, coal and petroleum generation. However, it should be apparent that the systems, methods and devices described herein may be adapted to the context of other locales (e.g. regions where electrical generation is primarily hydro-electric or regions where electrical generation is primarily or entirely fossil fuel based).

Embodiments described herein can provide a central energy management unit that includes the suite of energy provisioning units (e.g. the energy generation sources and thermal storage elements). The central energy management unit can also include electrical storage elements. The central energy management unit can be designed and sized to satisfy both electrical and thermal heating and cooling demands of a district (e.g. a small group of buildings or community node).

The central energy management unit can include modular energy provisioning elements (e.g. energy generation sources, energy storage sources) that can facilitate the energy management of districts of varying sizes. The modular energy provisioning elements can be interchanged to provide a custom district energy system for a given district. The modular energy provisioning elements can also facilitate repair and replacement of individual energy provisioning elements.

In some cases, the central energy management unit may also include energy consuming elements. In some cases, components of the central energy management unit may be operable as both energy provisioning elements and energy consuming elements.

The central energy management unit can also be designed to operate in a number of standard sizes. The standard sizes can be selected to reflect expected operational demands of most districts. Providing the central energy management unit in standardized sizes can facilitate construction and deployment of the central energy management unit. For example, components of the central energy management unit (e.g. individual energy provisioning units) can be sized to fit within standard shipping containers. This may facilitate the rapid transport, deployment and interconnection of the central energy management unit to districts in various different locales.

With growing concerns around climate change, many countries across the globe are currently driving paradigm shifts into the design and operation of energy systems to minimize reliance on fossil fuels and thus reduce greenhouse gas (GHG) emissions. Typically, an electrical grid has a mix of electrical energy generation sources available. The paradigm shift is causing a switch from fossil fuel sources to GHG emission free sources for electrical generation. As a result, large-scale integration of intermittent and disperse renewable energy resources such as solar, wind and biomass are considered a key ingredient of the transition into future sustainable energy systems.

Heating systems also have a mix of thermal energy generation sources available. As with electrical generation sources, heating sources are also transitioning from fossil fuel sources to GHG emission free sources due to concerns over climate change. However, due to transmission infrastructure challenges, heating grids are not suitable for efficiently transporting thermal energy over long distances from their generation location to the end use location. As a result, it can be challenging to transport thermal energy generated by carbon-free sources, such as renewable energy sources, to end use locations.

Embodiments described herein may facilitate heating systems that can become increasingly electrified. Accordingly, the heating systems in embodiments described herein can use the efficient transmission and distribution infrastructure of the electrical grid to utilize GHG emission free sources. Electrical grid integration of heating may contribute largely to the decarbonization of the future.

The electrical grid, while efficient at transporting electricity over long distances, requires intricate design and control to safely ensure electrical generation matches electrical load instantaneously every second of the year. Different energy generation sources, and technologies to convert those energy generation sources into electricity, have different features that affect how the sources are utilized in the electrical grid.

Base load generators are generators that for technical and economic reasons prefer to generate electricity consistently throughout a day. Examples of base load generators include nuclear generators, some hydro generators, most bio-mass generators, most coal generators and some natural gas generators.

Dispatchable peaking generators are generators that are more suited to turning on and off quickly and ramping generation output up and down. Dispatchable peaking generators can be configured to turn on/off and ramp up/down whenever requested, to match electrical generation and load requirements in real time. Examples of dispatchable peaking generators include some hydro generators, some coal generators, most petroleum generators and some natural gas generators.

Non-dispatchable generators are generators that can only produce electricity when they have availability from their energy generation source which can vary greatly with time. Examples of non-dispatchable generators include solar PV generators, wind generators and run-off-river hydro generators.

Electrical storage can function either as a generator or load in an electrical system. Accordingly, electrical storage can provide the operational flexibility of a dispatchable peaking generator. However, electrical storage elements do not convert sources into electricity, and thus are not considered typical generators.

A marginal generator is the generator that for technical and economic reasons can turn on/ramp up or turn off/ramp down at a given moment in time to ensure that electrical generation and load are matched in the electrical grid. Typically dispatchable peaking generators are used as the marginal generator in an electrical grid. However, there are times when load demand may be lower than the supply provided by base load generators and/or non-dispatchable generators. At these periods of low demand, base load generators or non-dispatchable generators can be used as the marginal generator used to balance generation with demand.

Traditionally, controlling generator output as loads varied has been used to balance supply and demand in real time. However, controlling loads to balance the electrical grid can also be used. This demand response capability can be employed at annual peak demand times, when the electrical grid faces constraints such as all electrical generators generating at maximum capacity or due to transmission and distribution infrastructure capacity constraints.

To ensure reliable and safe operation, the electrical grid needs services (referred to herein as ancillary services) provided to it to maintain quality standards. These ancillary services include a variety of reliability and grid balancing services, such as dispatchable generation and demand response capacity, spinning reserves, non-spinning reserves, voltage and frequency regulation, balancing and firming variable renewable generation, black start capabilities, non-wired solutions, reactive power compensation etc. Different types of generators, energy storage elements and demand response techniques can provide these services. However, not all technologies are suited for providing all ancillary services.

In order to reduce GHG emissions from electrical generation sources, fossil fuel-based generation must be displaced by a lower carbon emission or emission free generation source, storage element or demand response technique. Since fossil fuel-based generation is one of the most flexible generation types, it is often deployed as a dispatchable generator acting as the marginal generator. A decrease in load or an increase in generation on the grid will cause the marginal generator to shut off or ramp down, to ensure supply adjusts to match demand.

If a fossil fuel-based generator is acting as the marginal generator, a decrease in load or increase in generation caused by a lower carbon emission or emission free generation source, storage or demand response will reduce GHG emissions by decreasing the energy generation from the fossil fuel-based generator acting as the marginal generator. However, if an emission-free generation source is acting as the marginal generator, displacing the marginal generator by an emission free generation source, storage element or demand response technique will not provide any reduction in GHG emissions. Because the marginal generator in an electrical system can change during operation from hour to hour, an hour-by-hour analysis of the electrical system is required to determine GHG emissions reduction.

During operational periods when electrical demand is lower than electrical generation from carbon-free sources, carbon-free sources usually must be shut off (otherwise known as curtailed) to ensure that the electrical demand and supply match instantaneously. Currently, in jurisdictions where nuclear power, renewable energy or other carbon-free sources form a high percentage of the generation capacity (such as Ontario, Canada; France; Denmark; Spain; etc.), during periods of off-peak demand when the generation potential of carbon-free sources exceeds electrical demand, the surplus of carbon-free electricity generators is curtailed. For example, strong winds often happen at night when the demand for electricity is usually low. This can result in the curtailment of wind driven electricity generation.

Embodiments described herein may enable this surplus carbon-free electrical energy potential that is otherwise wasted to be harvested and stored (either directly using electrical storage elements and/or by converting the electrical energy to thermal energy that can be used directly or stored). This harvested energy when stored may then be used to offset electrical demand and electrical driven heating or cooling demands during peaking hours to ensure a minimum of GHGs are emitted for electrical generation. In addition, the surplus carbon-free electrical energy potential may be used to displace fossil fuel use in other energy generators such as heating generator. This may allow the harvested energy to reduce the integrated energy system's emissions, even if it does not reduce peak electrical demand.

In many existing electrical systems, natural gas fired electricity generation is typically operated as the marginal generator due to their flexibility to turn on quickly and ramp up and down upon request. Normally, these are centralized large-scale natural gas peaking power plants that reject the chemical potential energy not converted to electricity into the atmosphere as waste heat. This limits the utilization of the natural gas chemical potential energy to the conversion system's electrical efficiency.

Embodiments described herein can be configured to harvest this normally wasted thermal energy. This harvested energy can then be used to displace natural gas driven heating, and in turn reduce GHG emissions.

Embodiments described herein can be configured to operate using Combined Heat and Power (CHP) systems. CHP systems can be configured to harvest the otherwise wasted heat of electrical generation systems, such as natural gas generation sources. CHP systems can improve on the efficiency of centralized large-scale natural gas peaking power plants by increasing resource utilization.

However, CHP systems do not always reduce the fossil fuel use on the electrical grid. To reduce GHG emissions, natural gas-based CHP systems need to displace centralized natural gas peaking power plants as marginal generators, while having their heat recovery displace heating that would otherwise be natural gas driven. In jurisdictions where the capacity of carbon-free generation sources surpasses off-peak electrical demand, most centralized natural gas peaking power plants can be shut off during this period of overcapacity. These centralized natural gas peaking power plants may not be turned on again until "peak" electrical demand exceeds the generation capacity of carbon-free generation sources.

As noted above, when electrical demand is lower than generation from carbon-free sources, carbon-free sources must be curtailed to ensure electrical demand and supply match instantaneously. If a natural gas fired CHP turns on during this period of excess supply, additional carbon-free sources must shut off to balance demand and supply. As a result, the operation of the CHP system can result in an increase in fossil fuel consumption by displacing a carbon-free source. Thus, the only time a natural gas fired CHP electrical generation system decreases generation from fossil fuel sources is when it is used to offset fossil fuel sources that are acting as marginal generators to match supply with demands in the absence of heat recovery. In jurisdictions with capacity of carbon-free generation sources that meet or surpass off-peak electrical demand, peak demand periods are the only a time natural gas fired CHP electrical generation decreases generation from fossil fuel sources that would otherwise be used to meet this peak demand. In these jurisdictions, CHP systems must shut off during off-peak times if they are to reduce GHG emissions.

In order to minimize GHG emissions, the GHG emission factor of the entire electricity grid must be considered. Any electricity consumed during operating hours in which fossil fuel fired sources are generating electricity will have the attributed GHG emissions associated with it. Embodiments described herein may operate using a high-resolution (e.g. hourly) analysis of GHG emissions factor. This can change the system's operation to ensure increased consumption of electricity during periods when all generation is from carbon-free sources, and decreased consumption of electricity during periods when there is generation from fossil fuel fired source. An annual averaged electricity grid GHG emission factor is not sufficient for accurate GHG emission analysis and systems control necessary to reduce GHG emissions.

As with the electrical grid, natural gas transmission and distribution pipe grids also experience peak demand periods. Due to the compressibility of natural gas, instantaneously matching demand and supply is not as critical for naturel gas systems. However, on the time scale of hours and a day, mismatching of supply and demand can lead to pressure differential problems with natural gas systems. Accordingly, supply into natural gas transmission and distribution grids does need to closely match demand that consumes natural gas.

Unlike electricity generation, which can come from many sources, natural gas production is technically and economically limited to specific geographic regions. Fortunately, natural gas can be stored in its native form, which provides a cost-effective solution to balance typically consistent natural gas production with seasonally varying natural gas demand. While natural gas can be stored cost effectively, this is primarily done by taking advantage of natural geological formation or man-made ones, such as mines. Thus, the ability to cost effectively store natural gas is also geographically limited. As a result, the natural gas transmission and distribution grid pipe capacity is a limiting factor on supply for many communities, as natural gas cannot be produced or stored nearby. In this communities, during peak demand periods, once demand exceeds the supply infrastructure capacity, demand response is the only option available to ensure supply and demand are matched. As a result, technologies that provide natural gas demand response capabilities can support the stability of the natural gas transmission and distribution pipe grid.

Embodiments described herein can be configured to operate using district thermal distribution networks (microthermal networks) for a district. These thermal distribution networks can be used to transfer thermal energy between the central energy management unit and buildings within the district (as well as between buildings in the district).

Existing district heating systems are typically classified into five generations. The first generation generally refers to a thermal network that distributes steam to connected buildings to provide their heating demands. The second generation replaces the steam with pressurized water at elevated temperature (>100° C.), primarily to improve the efficiency of building-side heating systems. With advancements in heating system technologies, the third generation reduced the water temperature below 100° C. to allow for efficiency improvements.

The high distribution temperature used in the first three generations of district heating systems leads to increased energy losses to the surrounding environment. In addition, these systems are unable to capture heat from lower temperature sources, such as rejected heat from various processes (e.g. cooling systems), solar thermal energy sources or surface geothermal energy sources.

Electrification of heating from non-emitting GHG sources may be pivotal in reducing overall greenhouse gas emissions. However, the first three generations of district heating systems present a barrier for electrification of heating through heat pumps. In addition, the traditional district energy system configuration leaves the electricity grid disjoint from the thermal grid in heating seasons.

A fourth-generation district heating system operates at a temperature in the range of 50-60° C. This temperature range is able to meet domestic hot water requirements, while also allowing the direct utilization of rejected heat from processes, solar thermal energy sources or surface geothermal energy sources. However, the first four generations of district heating systems cannot provide cooling and would need to be combined with district cooling systems or stand-alone cooling systems at the building level.

Embodiments described herein can be implemented using a thermal distribution network of various forms, including existing thermal distribution networks. In some examples, embodiments described herein can be implemented using a thermal distribution network that can be configured to operate at near-ambient temperatures (also referred to as a fifth-generation district heat and cooling network). This can help minimize losses of the thermal distribution network. This may also improve the recovery of thermal energy available in the district. In operation, thermal distribution network systems operating at near-ambient temperatures may include energy transfer interfaces between the network and individual buildings that can be used to adjust the temperature of a heat transfer fluid supplied to the buildings to account for the needs of both the building's heating and cooling systems. Such interface systems may require various energy transfer components such as electric heat pumps and/or chillers to provide the necessary temperature adjustments.

For example, a Fifth-Generation District Heat and Cooling (5GDHC) network in embodiments described herein can include a thermal energy supply grid that uses a heat transfer fluid in the form of water or brine as a carrier medium. The network may also use hybrid substations with Water Source Heat Pumps (WSHP). A 5GDHC system may be configured to operate at temperatures so close to the ground temperature that it may not be suitable for direct heating purpose. However, the low temperature of the carrier medium can provide the opportunity to directly exploit industrial and urban excess heat and the use of renewable heat sources at low thermal exergy content.

Energy transfer interfaces can be provided between the micro-thermal network and individual buildings. The energy transfer interfaces may be configured to adjust the temperature of the heat transfer fluid supplied to the buildings. This may allow the heat transfer fluid to be used to account for the needs of both the building's heating and cooling systems. For example, individual heat pumps and/or chillers may be required at the interface between the network and each building to boost the temperature up or down depending on the requirements of the heating and cooling systems of the building, respectively. Such energy transfer interfaces may also promote electrification of the thermal energy system, in turn enhancing the coupling between the electrical and thermal grids. This may also allow the thermal distribution network to offer ancillary services to the electrical grid.

In examples of a 5GDHC system, the operation of the customer substations (the energy transfer interfaces) can be reversed to permit the thermal distribution network to simultaneously use the same pipelines for both the heating and cooling demands of different buildings. Such hybrid substations may also facilitate coupling of thermal, electrical and gas grids in a district energy system.

The first four generations of district heating systems needed 4 pipes to provide both heating and cooling. In contrast, the thermal network of example 5GDHC systems may include two pipelines; a supply pipeline and a return pipeline. Both the supply pipeline and the return pipeline can be controlled at near-ambient temperature with a low temperature difference. These pipelines can provide a thermal transfer interface between the serviced buildings and energy resources coupled to the 5GDHC system. The energy sources may include thermal power generation, excess heat from industrial processes, refuse incineration, natural geothermal processes and fuels which are difficult to control, such as biomass. Recovering energy from thermal power generation and excess heat from industrial and commercial processes may provide substantial benefits in terms of displacing GHG emissions. Embodiments described herein may also be configured to recover rejected heat from commercial processes including cooling operations within commercial and residential complexes in a district.

Embodiments described herein using a 5GDHC thermal distribution network may be configured to provide a number of advantages, such as: (1) the ability to free-float the temperature of the network to enhance heat recovery from "indigenous sources" such as the heat rejected from cooling processes and the waste heat from commercial and industrial processes; (2) lower thermal losses from the pipeline due to the near-ambient operating temperature; and (3) bi-directionality and decentralization of energy flows between the network and the buildings.

Traditional district heating and cooling networks have required large infrastructure investment and long planning horizons to implement. Thus, they were primarily deployed in urban centers with institutional building owners willing to commit to long term thermal service contracts. Additionally, there had to be many large and high energy consuming buildings in close proximity to justify the large infrastructure investment. As a result, adoption of traditional district heating and cooling networks has been limited.

Embodiments described herein can be configured to operate using micro-thermal and electrical network technologies. This may allow smaller numbers of buildings to be connected together for the benefit networking provides, such as economies of scale from larger generation equipment and transferring of energy between buildings. However, there currently are no standard methods for identifying which groups of buildings have high enough energy demands, are close enough together and have other synergies to justify connecting them together via micro-thermal and electrical network.

Embodiments described herein may provide district energy systems, methods and devices that can manage thermal and electrical energy on a district-level. Embodiments described herein may facilitate an optimal design of the different components in the system to provide an optimized district energy system that can provide various benefits including system flexibility, reductions in greenhouse gas emissions, energy resiliency, demand management, and power quality services to electrical grids.

In examples of the district energy systems described herein, thermal energy may be harvested from, and distributed amongst, buildings in a single pipeline network. In addition, long-term thermal energy storage elements may be coupled to the thermal distribution network. This may facilitate the harvesting, storage, and management of thermal energy over longer time periods.

Embodiments described herein can also include an energy management system configured to manage operation of the thermal distribution network and electrical distribution network over long-term, short-term and real-time time frames. Example control systems may be configured using a multi-layer control process that interrelates the operations and predicted future requirements taking place at different time frames (long-term, short-term and real time).

Embodiments described herein may also provide processes for optimizing the location of a district energy system within a district. For example, processes described herein may enable optimal selection of building locations in a distribution network.

Embodiments described herein can operate using many different energy sources and technologies to convert those sources into heating, cooling and electricity services. These sources and conversion technologies have different features that can affect how they are selected, sized and operated together in a community-level district energy system to promote energy efficiency and reduce GHG emissions. Understanding these sources and technologies is important to understand how to operate them together synergistically.

Embodiments of the district energy systems described herein may include one or more heat pumps. For example, heat pumps may be included in the central energy management unit within the district energy system. In some cases, heat pumps may also be included at other locations within a district energy system, such as energy transfer stations at building locations.

In embodiments described herein, heat pumps can be used to link electrical and thermal systems. The use of heat pumps may contribute to the decarbonization strategy of integrating heating systems with the electrical grid. Heat pumps can be used in various different applications, including refrigeration equipment, chillers, air conditioners, air source heat pumps, water-to-water heat pumps, heat recovery chillers, and Variable Refrigerant Flow systems for example. Heat pumps may also be used to provide heating and/or cooling operations to store thermal energy in, or extract thermal energy from, thermal storage elements. Depending on the particular use case, heat pumps can be optimized by varying a combination of refrigerants, operating pressures, compressor technologies, heat exchanger design, piping configurations and control strategies.

Embodiments described herein can be configured to use heat pumps for heating and heat recovery applications. Alternately or in addition, heat pumps can also be used for cooling applications such as refrigeration and air conditioning for example.

Heat pump systems have typically been used for refrigeration, chilling and air conditioning implementations. However, other heating technologies, primarily fossil fuel based, have traditionally been favored for heating applications. Just as cooling heat pumps can cause seasonal peak electrical demand during the hottest summer months, heat pumps used for heating can cause seasonal peak electrical demand during the coldest winter months. This may be particularly impactful in cold climates, where a full transition to electric driven heat pumps for heating could cause electrical peak demand to increase 2 to 5-fold over current annual peak. This would far surpass the current electrical grid's generation and transmission capacity, requiring billions of dollars of new electrical grid infrastructure to accommodate. Accordingly, strategies to mitigate the negative impacts of increased winter peak demand are required to support the electrification of heating as a decarbonization approach.

In general, heat pumps transfer thermal energy between two reservoirs at different temperatures. Ignoring equipment limitations, the smaller the temperature difference between the two reservoirs, the higher the Coefficient of Performance (COP), i.e., the higher the level of useful heat transferred per unit input electricity to drive the heat pump. Accordingly, reducing the temperature differences between reservoirs used with heat pumps can significantly improve overall system efficiency.

While systems using heat pump equipment optimized for a specific cooling or heating application may provide higher performance for the respective application, this may result in additional equipment and costs required to support both heating and cooling applications. District energy systems employing the same heat pump equipment for both heating and cooling applications may facilitate system modularity and provide significant capital cost savings. In such cases, the selection of heat pump equipment optimized for the whole energy system, rather than a specific heating or cooling application, can be an important design criterion for an implementation of a district energy system.

The selection of CHP technology has traditionally considered the electric to heat generation ratio required for a specific site's baseload demand profile. Embodiments described herein may be configured to select and operate CHP technology on the basis of increased efficiency. For instance, CHP technology may be selected to provide increased electrical efficiency for the district energy system. When considering impact on the whole energy system, such as how CHP electrical generation may impact the marginal generator of the electrical grid, particularly in the case when electrical export from site is allowed, higher electrical efficiency of the CHP technology may be more advantageous when trying to reduce GHG emissions.

District energy systems using micro-thermal networks with lower operating temperatures also reduce the required supply temperature. This enables the use of higher electrical efficiency CHP technologies without having to worry about also needing high temperature thermal energy, such as district heating systems requiring pressurized steam. When used to adjust output as the marginal generator changes rather than to run as a baseload generator, CHP technologies that have capabilities to turn on and off as well as ramp quickly are important to reduce GHG emissions.

Embodiments of the district energy systems described herein may include one or more absorption chillers. For example, an absorption chiller may be included in the central energy management unit within the district energy system. Absorption chillers can play a unique role as a thermally driven heat pump. Accordingly, absorption chillers may help reduce peak electrical demand during summer peaks, as thermal sources can be used for cooling rather than the electrical grid. Additionally, if high quality thermal energy is cost effectively available (e.g. from other components of the central energy management unit such as a CHP), absorption chillers can provide cooling at lower cost than electrically driven chillers, making them useful for providing cooling from heat recovery sources.

Embodiments of the district energy systems described herein may include one or more energy storage elements. For example, energy storage elements may be included in the central energy management unit within the district energy system. In some cases, energy storage elements may also be included at other locations within a district energy system, such as the building locations or other locations coupled to the micro-thermal network and/or electrical micro-grids.

Energy storage elements can play an important role in district energy systems as they provide a number of different advantages. For example, energy storage elements can bridge mismatches between supply and demand, provide peak generation capacity, and provide resiliency to network outages. When connected to the electrical grid, energy storage elements can provide ancillary services to ensure safe and reliable electricity supply.

A range of different energy storage technologies may be used in different district energy system, each with their own characteristics that make them each suited better for providing some benefits over others. As such, it can be beneficial to combine different energy storage technologies together and with generation technologies to provide a larger set of benefits than an individual technology can provide alone. Existing systems and processes generally fail to specify how to select, size and operate multiple electrical and thermal storage technologies together to deliver optimized benefits.

Community district energy systems may also require specialized designs to ensure energy resiliency. Energy service resiliency is generally defined as the ability of the energy system to anticipate, resist, absorb, respond to, adapt to, and recover from disruption of energy provision caused by planned maintenance disruptions, unplanned equipment failure, supply chain disruptions and extreme events such as wildfires, hurricanes, ice storms, etc.

Local community energy service resiliency can be considered on a capacity scale from full provision of energy services for an extended time period during a disruption to limited provision of energy services for a short period of time. The scale of resiliency needed by a community site can vary depending on stakeholder priorities and available resources. Typically, energy service resiliency has been planned for independently using dedicated local equipment, such as diesel emergency generators. District energy systems employing distributed energy resources, micro-thermal networks and electrical microgrids enable local generation equipment (normally used for regional grid connected operation) to provide energy service resiliency within the micro-grid in the event of a disruption to the regional grid.

While electricity service resiliency is often considered in resiliency planning, thermal service resiliency can be particularly relevant when considering the impact of long disruptions. Extreme hot or cold temperatures can be life threatening. While the loss of electricity can severely reduce the functionality of buildings, occupants can usually stay in buildings with no electricity. However, extreme temperatures can force occupants to leave and seek shelter elsewhere when thermal services are unavailable.

As fewer fossil fuel generation sources are used in favor of renewable sources thermal resiliency may increase in importance, since the reliability of renewables may be less than fossil fuels. This is particularly important with the increasing electrification of heating, where peak thermal demand may result in peak electrical demand. Technologies and operational strategies that can reduce peak demand during normal operation can also be used by district energy systems in micro-grid island operation to provide electrical and thermal resiliency.

For instance, the electrical grid interface of a district energy system may be adjustable to an isolation mode in which the electrical grid interface electrically isolates the centralized energy management unit and the district electrical distribution network from the electricity transmission grid. In such cases, the local generation sources, energy storage elements and operational strategies typically used to manage electrical demand and supply can be used to provide electrical and thermal resiliency.

While there is a great potential for distributed energy resources to provide energy service resiliency, determining how various technologies can be combined to provide local energy services independent of regional fossil fuel supply chains or the regional electrical grid is a complex undertaking. Careful design and operational guidance are necessary to leverage existing distributed energy resources and micro-grids to provide energy service resiliency.

For complex micro-grids that may have multiple generation sources, controllable demands, transient loads, and time varying GHG and economic signals, a comprehensive control strategy may be needed to optimize for these many varying constraints. Embodiments described herein provide examples of an Energy Management System (EMS) that can be configured to organize each component of an integrated micro-thermal network and electrical micro-grid to ensure the reliable and economic operation of the system.

The EMS can be configured to output optimal operating set-points to local controllers distributed throughout the micro-thermal network and electrical micro-grid to simultaneously minimize the operating and environmental costs while ensuring the thermal and electrical energy supply to the different buildings within the community node. To do so, the EMS can analyze data coming from the local controllers, incorporate different predictions (thermal and electrical loads, electricity price, weather, etc.) and then optimize the set-points of the controllers in each component of the system. Typical problems in distribution system analysis and optimization can be partitioned into planning time frames (considering a planning horizon of a year or even multiple years) and operational time frames (with time scales going from days to minutes). Embodiments described herein can provide control techniques for an EMS that integrate the different dynamics with different time scales involved in the energy system.

Integrated Community Energy System

An example of an integrated community energy system will now be described in relation to district energy system 100 shown in FIG. 1. A district energy system for a district, such as the district energy system 100, may be referred to interchangeably herein as a district energy system, a community energy system, or an integrated community energy and harvesting system (ICE-Harvest system). District energy system 100 can be configured to provide the electrical and thermal demands of a district or community node 102. The district 102 can include one or more community buildings 104.

As shown in FIG. 1, the district 102 includes a plurality of buildings 104A-104C. In the example illustrated, district 102 includes a number of community buildings including an arena 104A, a pool 104B, and a community center 104C. Various other buildings in a community may be connected to the district energy system 100 such as, for example, grocery stores, box stores, apartment complexes, condominiums, restaurants and so forth.

In general, embodiments of the district energy system 100 described herein can include a self-contained energy management center (EMC) 110 connected to a selected group of buildings 104. The buildings 104 can have diverse electrical and thermal demands. The EMC 110 can be connected to the buildings 104 through a local micro-thermal network 108 and a local electrical micro-grid 106. The local micro-thermal network 108 may be connected to a larger external natural gas grid (e.g. via the EMC 110). The local electrical micro-grid 106 may be connected to a larger external electrical grid 105 (e.g. via the EMC 110). In embodiments described herein, district energy systems 100 can be configured to operate using modular self-contained energy management center (EMC) 110. In some examples, the energy management center (EMC) 110 may be configured to operate in one or more of standard sizes.

District energy system 100 may be coupled to an electrical grid 105. In some examples, district energy system 100 can be configured to provide ancillary services to the electrical grid. In some examples, components of the system 100 such as distributed energy transfer systems 120 and/or an energy management center 110 containing short-term thermal storage 134, and long-term seasonal storage 132, coupled with electric heat pumps can provide demand management schemes as well as ancillary services for the electrical grid 105 through dispatchable loads. This may potentially assist in balancing the electrical grid 105 demand on a daily and seasonal basis.

In some examples, district energy system 100 can also be configured to provide demand management to a natural gas grid.

In some examples, operation of the district energy system 100 can be controlled to minimize the GHG emissions of district energy system 100, and/or the electrical grid 105, and/or the natural gas grid.

As noted above, the district energy system 100 can include a central energy management center (EMC) 110 (also referred to as a central energy management unit). The EMC 110 can be located in close proximity to the community node 102. The EMC 110 can be configured to manage the supply of electrical energy and thermal energy within the district 102. EMC 110 can be configured to meet the electrical and thermal demand of the buildings 104 in district 102. In some examples, EMC 110 can also be configured to manage electrical and/or thermal energy demand within the district 102 and/or for grid 105.

As shown in FIG. 1, district energy system 100 can include an electrical micro-grid 106 and a micro-thermal network 108. The electrical micro-grid 106 and micro-thermal network 108 can connect the node buildings 104 together. The electrical micro-grid 106 and micro-thermal network 108 can also connect the node buildings 104 to the EMC 110 (i.e. provide a thermal and electrical micro-grid network interfacing between the EMC 110 and buildings 104). This can provide the node buildings 104 with thermal and electrical couplings to electrical and thermal generation equipment housed in the EMC 110. Note the drawing shown in FIG. 1 is not to scale, as the EMC would typically be very small compared to the buildings 104 and electrical micro-grid 106 and micro-thermal network 108.

The electrical micro-grid 106 can provide a district electrical distribution network for the district 102. The electrical micro-grid 106 can be electrically coupled to the central energy management unit 110. The district electrical distribution network can include a plurality of external electrical coupling interfaces. Each external electrical coupling interface can be connectable to one of the buildings 104 within the district 102. The district electrical distribution network 106 can transfer electrical energy between the central energy management unit 110 and each external electrical coupling interface.

In some examples, the district electrical distribution network 106 can also be configured to transfer electrical energy between the central energy management unit 110 and/or each external electrical coupling interface and other energy provisioning units within the system 100, such as distributed energy storage and/or energy generation units.

The micro-thermal network 108 may be in the form of a district thermal distribution network 108. The district thermal distribution network 108 can be thermally coupled to the central energy management unit 110 (and the energy resources contained therein). The district thermal distribution network 108 can include a plurality of external thermal coupling interfaces. Each external thermal coupling interface can be connectable to the associated heating, ventilation, and air conditioning (HVAC) system of one of the buildings 104 within the district 102. The district thermal distribution network 108 can be configured to transfer thermal energy between the central energy management unit 110 and the buildings 104 within district 102. In some examples, the district thermal distribution network 108 can be configured to transfer thermal energy between different buildings 104 within district 102 directly.

The district thermal distribution network 108 can include one or more fluid conduits. Each fluid conduit can transport a heat transfer fluid. The district thermal distribution network 108 can transfer thermal energy between the central energy management unit 110 and each external thermal coupling interface using the heat transfer fluid.

The district energy system 100 can also include a plurality of energy transfer systems (ETS) 120. The ETS 120 can be configured to provide the external electrical coupling interfaces for the electrical micro-grid 106. The ETS 120 can also be configured to provide the external thermal coupling interfaces for the micro-thermal network 108. In some examples, as illustrated in FIG. 1, the ETS 120 can provide a bidirectional external thermal coupling interface for the micro-thermal network 108.

As shown in the example of FIG. 1, an ETS 120 can be positioned at each building 104. The ETS 120 can provide a combined interface between the corresponding building 104 and both the electrical micro-grid 106 and micro-thermal network 108. For example, the ETS 120 may be coupled to the associated heating, ventilation, and air conditioning (HVAC) system of each building 104. The ETS 120 can also be coupled to the electrical service utility within the individual building 104. Examples configurations for the ETS 120 are described herein in further detail below with reference to FIG. 3.

The EMC 110 can contain control and interface equipment for the local micro-thermal network 108 and the electrical micro-grid 106. The EMC 110 can also include various forms of electrical and thermal energy provision units (e.g. energy generation and/or storage equipment). The electrical and thermal energy provision equipment contained within the EMC 110 can be coupled to the local buildings 104 of the community node 102 through the local micro-thermal network 108 and the electrical micro-grid 106. In some examples, the EMC 110 may also include various forms of electrical and/or thermal energy consumption units.

The EMC 110 can contain at least one thermal storage element 130. Each thermal storage element 130 can be configured to store thermal energy. The thermal storage element 130 may be used to store excess thermal energy for later use in the thermal distribution network 108. Various examples of thermal storage elements 130 that may be used in embodiments of the district energy system 100 will be described in further detail herein below.

In the example district energy system 100 shown in FIG. 1, the EMC 110 includes both a long-term thermal storage element 132 (also referred to as a seasonal storage element) and a short-term thermal energy storage element 134. As shown, the long-term thermal storage element 132 is provided in the form of underground geothermal seasonal energy storage. In this example, the underground geothermal seasonal energy storage includes a borehole field with a plurality of boreholes extending underground. As shown, the short-term thermal storage elements 134 are provided in the form of short-term thermal storage tanks. In this example, the short-term thermal storage tanks can store a thermal storage medium such as water or a phase change material for example.

In some examples, the EMC 110 may contain an energy provisioning unit in the form of at least one embedded localized thermal generation unit 136. A localized thermal generation element 136 may be a heating and/or cooling element. Each localized thermal energy generation unit 136 can be configured to generate thermal energy using a thermal energy source. Examples of thermal energy generation units 136 and thermal energy sources are described in further detail herein below. In the example illustrated, a thermal energy generation unit 136 is provided in the form of CUP 210.

In some examples, the EMC 110 may contain an energy provisioning unit in the form of at least one embedded localized electrical energy generation unit 138. Each localized electrical energy generation unit 138 can be configured to generate electricity using an electrical energy source. Examples of electrical energy generation units 138 and electrical energy sources are described in further detail herein below. In the example illustrated, an electrical energy generation unit 136 is provided in the form of CHP 210.

In the example shown, the CUP 210 provides a combined energy provisioning unit operable to provide both thermal and electrical energy. As illustrated, the CHP 210 is coupled to both the internal thermal distribution network and the internal electrical distribution network of the EMC 110.

In some examples, the system 100 may include on-site renewable energy sources. For example, an on-site renewable generation source 270 may be provided in the form of solar PV generation units 272. As shown, the solar PV generation units 272 are coupled to the internal electrical distribution network of the EMC 110.

In some examples, the system 100 may include energy generating elements at locations other than the EMC 110. For instance, renewable energy sources 275 may be included in system 100 at buildings 102 and/or other locations coupled to the micro-thermal network 108 and/or electrical micro-grid 106 (see e.g. FIG. 4B). For instance, solar PV systems may be installed at building sites. As another example, surface geothermal energy sources may be used at a building 102, such as heat pump connected geo-exchange systems and geothermal borehole storage systems.

In some examples, the EMC 110 may contain at least one electrical storage element 140. Each electrical storage element 140 can be configured to store electrical energy. In some examples, the electrical storage elements 140 may be used to store excess electrical energy for later use in the electrical distribution network 106. In some examples, the electrical storage elements 140 may be configured to provide real-time supply/demand matching services for the district energy system 100. Various examples of electrical storage elements 140 that may be used in embodiments of the district energy system 100 will be described in further detail herein below.

In some cases, the electrical storage elements may also include bidirectional and/or unidirectional electric vehicle charging interfaces 274. As shown, the electric vehicle charging interfaces 274 are coupled to the internal electrical distribution network of the EMC 110 (and to batteries 140).

District energy system 100 can also include at least one electric heat pump. For example, one or more electrical heat pumps may be provided at the EMC 110. For example, a bidirectional heat pump 220a can be configured to provide both heating and cooling thermal energy. For example, heat pump 220a can be configured to take heat out of the internal thermal distribution network (using electricity from the internal electrical distribution network) for storage using thermal storage element 130. Heat pump 220a can also be configured to remove heat from the thermal storage elements 130 and provide it to the internal thermal distribution network. Accordingly, the heat pump 220 can be coupled to both the internal thermal distribution network and the internal electrical distribution network of the EMC 110.

Alternately or in addition, one or more electrical heat pumps may be provided in the ETS 120 for one or more buildings. The electrical heat pumps can be used to convert electrical energy into thermal energy. Depending on the particular application for an electrical heat pump, heating and/or cooling or simultaneous heating and cooling electric driven heat pumps may be used. Examples of heat pumps and their use within district energy systems 100 will be described in further detail herein below.

District energy system 100 can also include at least one absorption chillers 230. For example, one or more absorption chillers 230 may be provided at the EMC 110. As illustrated, the absorption chiller 230 is coupled to the internal thermal distribution network of the EMC 110. The absorption chiller 230 may take in hot thermal energy and output cold thermal energy. Examples of absorption chillers and their use within district energy systems 100 will be described in further detail herein below.

District energy system 100 can also include at least one heat exchanger. For example, one or more heat exchangers may be provided at the EMC 110. Alternately or in addition, one or more heat exchangers may be provided in the ETS 120 for one or more buildings. The heat exchangers can be used to transfer thermal energy between various elements of the system 100.

As noted above, the district energy system 100 includes a micro-thermal network 108. The micro-thermal network 108 can include one or more fluid conduits used to transport a heat transfer fluid between elements of the system 100. Accordingly, district energy system 100 can also include at least one pump that is operable to enable the flow of heat carrier fluid through the thermal distribution network 108.

The EMC 110 can also include an energy management controller. The energy management controller can be configured to monitor the energy flows (thermal and electrical) within the EMC 110, to and from the buildings 104 and the energy flows to and from the electrical grid 105. The energy management controller can be configured to control the number and type of district energy resources (i.e. energy provisioning units and/or energy consumption units) coupled to the micro-thermal network 108 and/or the electrical micro-grid 106. The energy management controller can control the district energy resources coupled to the micro-thermal network 108 and/or the electrical micro-grid 106 in order to meet the thermal and electrical loads of the buildings 104 in the district 102. The energy management controller can control the district energy resources coupled to the micro-thermal network 108 and/or the electrical micro-grid 106 in order to satisfy one or more operational criteria, such as minimizing greenhouse gas emissions for example. The energy management controller can also control the operation of those district energy resources to provide the desired thermal supply and demand and electrical supply that optimized the operational criteria. The energy management controller may also be referred to herein as an energy management system (EMS). Examples of the energy management system and its operation are described in further detail herein below.

The energy management controller can be configured to determine a district thermal energy demand and a district electrical energy demand for the plurality of buildings 104. The energy management controller can be configured to determine a district electricity supply state of the central energy management unit 110. The district electricity supply state can be determined at least partially based on a grid electricity supply state of the electrical transmission grid 105. The energy management controller can be configured to determine a district operational energy state based on the district thermal energy demand, district electrical energy demand, and the district energy supply state.

The energy management controller can be configured to adjust the district energy resources coupled to the micro-thermal network 108 and/or the electrical micro-grid 106 based on the district operational energy state. For example, the energy management controller can select the set of energy resources coupled to the micro-thermal network 108 and/or the electrical micro-grid 106 (and their respective operations) in order to satisfy the desired operational criteria of the district 102 while meeting the thermal and electrical demand of the buildings 104 in the district 102. In particular, the energy management controller can select the set of energy resources coupled to the micro-thermal network 108 and/or the electrical micro-grid 106 (and their respective operations) in order to satisfy the desired operational criteria of the district 102 and meet the thermal and electrical demand of the buildings 104 in the district 102 both in real-time and over short-term and long-term forward-looking periods.

District energy system 100 can also include a wired or wireless communication network. The communication network can be configured to interconnect the various elements of system 100 to the energy management controller and to one another. The communication network may allow the elements of system 100 to provide feedback to the energy management controller and allow the energy management controller to manage the operation of the various elements within the system 100.

Figure 4A:
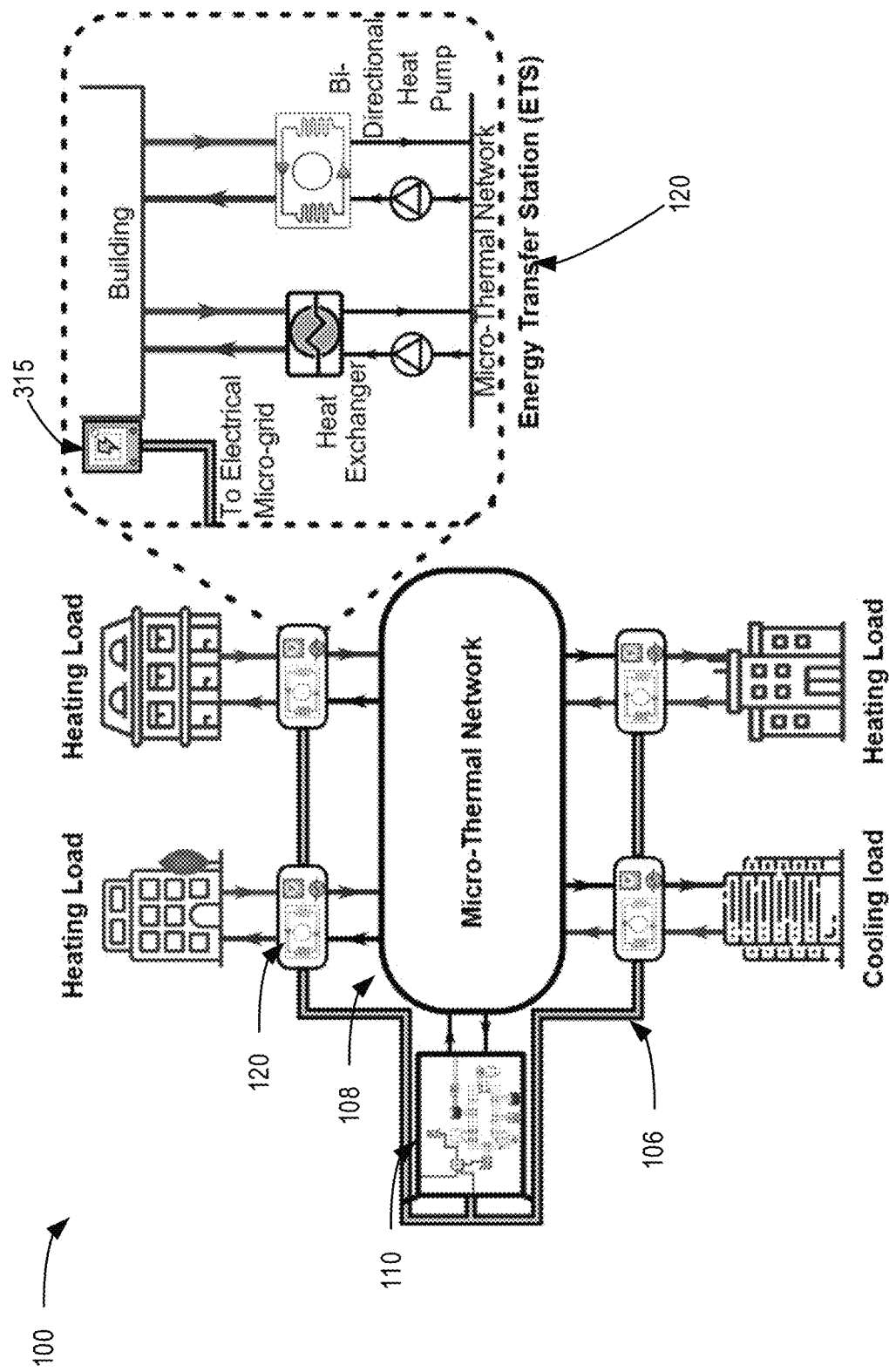
FIG. 4A shows a schematic of an example district energy system including a district micro-thermal network that may be used in the example district energy system of FIG. 1.
Figure 4B:
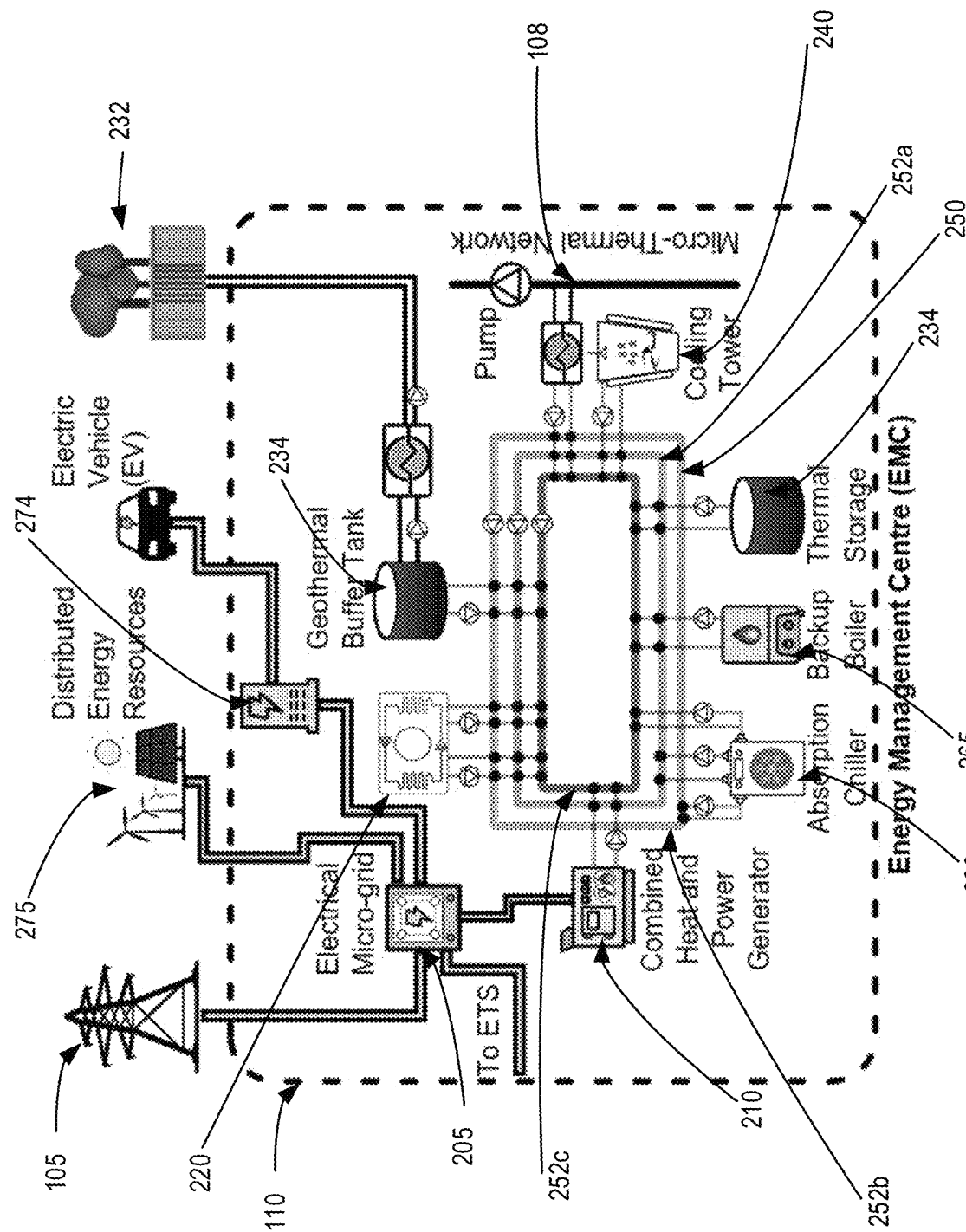
FIG. 4B shows a schematic of an example centralized energy management unit including a thermal distribution network and a district thermal network interface to the micro-thermal network shown in FIG. 4A.

Embodiments of district energy system 100 are comprised of many technologies connected together. There is no upper or lower limit to the number of technologies or equipment components that can be connected together to form a district energy system 100. For instance, FIGS. 4A-4C illustrates an example embodiment of a district energy system super structure, illustrating many of the possible energy resource types that can be included in district energy system 100. The term energy resource type, as used herein, encompasses both the energy source used by a given energy resources (i.e. by a given energy generator or a given energy consumer) as well as the technology used by that given energy resource.

Not all energy resource types of the super structure may be implemented in every community node 102, as each node may have unique constraints and priorities. As well, additional energy resources types beyond those shown in the examples of FIGS. 4A-4C may be used in district energy systems 100 for particular nodes 102. As described in further detail herein, the various energy resource types have advantages and synergies with other energy resource types, while also having disadvantages and costs. These must be considered when selecting energy resource types to include in a district energy system 100 for a specific community node.

The size and type of equipment in the EMC 110 can vary between district energy systems 100 in different community nodes 102 depending on many factors, such as the demand profile between heating, cooling and electricity, site constraints, and local utility prices for example. Examples configurations and equipment that may be used with the EMC 110 are described herein in further detail below with reference to FIGS. 2A, 2B, 4B and 4C.

Examples of Micro-Thermal Networks

The thermal energy exchange between the buildings 104 and the EMC 110 within a district can take place through a micro-thermal network 108. The micro-thermal network 108 can be provided using a thermal distribution network with one or more fluids conduits. The number and configuration of the fluid conduits can vary depending on the thermal network configuration for a given district energy system 100. For example, different embodiments of district energy systems 100 may use one-pipe uni-directional flow fluid conduit networks, two-pipe bi-directional flow fluid conduit networks, 4-pipe uni-directional flow fluid conduit networks and other 4th and 5th generation fluid conduit networks configurations.

The particular thermal network configuration can depend on design optimization criteria for the district 102. Embodiments of the district energy system 100 can be implemented using any generation of district heating network technology. However, $4^{th}$ and $5^{th}$ generation thermal distribution networks may be preferable in order to enable harvesting of thermal energy from lower temperature sources, such as waste heat from cooling processes.

The selection of the thermal distribution system configuration for a given ICE-Harvest System will depend on factors specific to the individual node in consideration. In general, the district energy system 100 can operate similarly regardless of thermal distribution system configuration. In some cases, however, the differences in thermal distribution network configuration may affect whether distributed heat pumps are needed at each individual building 104 or simply at the central EMC 110. For example, systems using one-pipe uni-directional flow and two-pipe bi-directional flow thermal distribution systems may be configured to operate using distributed heat pumps at each building 104. In other systems, such as those using 4-pipe uni-directional thermal distribution systems (i.e. micro-thermal networks with separated hot and cold supply and return pipes), heat pumps can be located at the EMC 110. In such cases, heat pumps may be omitted from the thermal coupling interface at some or all of the buildings 104.

Embodiments of the district energy system 100 can be implemented with various different types of micro-thermal networks 108. This may facilitate operations with existing micro-thermal networks that are already installed in a district. For example, various embodiments of the district energy system 100 can be used with many different types and generations of district heating and cooling networks with suitable modifications to reflect the differences in operational capabilities in the different networks.

In embodiments where a district energy system 100 is implemented any of the first four generations of district heating and cooling networks, a conventional thermal distribution system, such as a 4-pipe system can be used as the thermal distribution network 108. This conventional thermal distribution system can be used to connect the EMC 110 to the thermal interface at each building 104 (e.g. the ETS 120 at each building 104). This thermal interface unit (e.g. an ETS 120) can provide the interface coupling between the thermal distribution network and the associated heating and/or cooling system of the building 104.

In embodiments where a district energy system 100 is implemented using a 5GDHC thermal network, a thermal distribution network can be provided using a one-pipe or two-pipe fluid conduit network. Again, such a thermal distribution network can be used to connect the EMC 110 to the thermal interface at each building 104 (e.g. the ETS 120 at each building 104) between the thermal distribution network and the associated heating and/or cooling system of the building 104.

As discussed further below, the ETS 120 at each building 104 may include one or more electrically drive heat pumps. This may be particularly the case in micro-thermal networks using one or two pipe distribution networks such as 5GDHC systems. The heat pumps may be configured to provide the cooling and heating demands for the corresponding building 104. Accordingly, the ETS 120 may require a connection to the electrical micro-grid 106 to power the heat pumps. Including electrically driven heat pumps as part of the ETS 120 (which is also coupled to the thermal grid) can tie the micro-thermal network 108 and electrical micro-grid 106 together into an integrated thermal and electrical distribution network. This can facilitate a holistic and optimizable energy viewpoint to address the building electrical and thermal loads for district energy system 100.

With distributed heat pumps at each building 104 in the thermal distribution network 108, the cooling and heating demands of the buildings 104 may partially offset (e.g. by harvesting the heat from connected buildings cooling processes to meet the connected buildings heating demands), thereby reducing the energy required to maintain the temperature of the thermal distribution network 108. However, it remains unlikely (or at least infrequent) that the buildings 104 require a balance of simultaneous cooling and heating demands such that no additional heating or cooling energy is required to maintain the temperature of the thermal distribution network 108. Typically, at least some thermal energy will need to be added to or removed from the thermal distribution network 108 to maintain an acceptable operating temperature.

In embodiments described herein, the energy management center 110 can be configured to add and/or remove thermal energy from the thermal distribution network 108. In particular, a district energy system 100 may include a single centralized Energy Management Center (EMC) 110 per micro-thermal network 108. Using a single centralized EMC 110 can achieve economies of scale through energy resource units and equipment sized for the demands of the whole thermal distribution network 108, rather than having multiple smaller units per building 104.

Embodiments described herein can further modify and improve upon existing and proposed district heating and cooling networks through the use and configuration of the thermal distribution networks. In particular, embodiments described herein facilitate coupling between the electrical and thermal grids. The coupling interfaces and associated control techniques can be configured in order to minimize greenhouse gas emissions from the buildings 104 and energy sectors (e.g. the larger electrical transmission grid 105) connected to the district energy system 100. In addition, embodiments may further support secondary targets, such as reducing peak demand for district 102 and electrical grid 105 more broadly.

As noted above, the thermal distribution network 108 can be configured to transfer thermal energy by distributing a heat transfer fluid through one or more conduits that are thermally coupled to the buildings 104 and EMC 110. In some examples, the temperature of the heat transfer fluid in the fluid conduits is adjustable. For example, the operating temperature of the heat transfer fluid may be controlled to fluctuate from season to season, or from on-peak to off-peak demand periods on the electrical transmission grid (e.g. day to night). For example, the operating temperature may be adjusted using a control strategy intended to minimize the overall GHG emissions from both natural gas and electricity generating sources. Alternately or in addition, the control strategy may include additional optimization criteria, such as reducing peak electrical demand and/or providing demand response for the grid 105. The control strategy for the thermal distribution network 108 can be optimized using thermal energy storage capacity values for the system 100 (e.g. the state of charge of short-term energy storage elements 134 and long-term energy storage elements 132), predicted thermal energy requirement values for district 102 (e.g. predicted amount of heat required for a winter season), predicted thermal energy harvesting (e.g. predicted level of thermal energy to be captured from heat recovery) from buildings 104 and district energy resources and the like.

Adjusting the temperature of the thermal distribution network 108 may provide increased efficiency to a number of components within the district energy system 100. For example, the electrical demand of a heat pump at a building interface unit can be reduced by reducing the temperature difference between the thermal distribution network 108 and the building's heating or cooling systems. The coefficient of performance for heat pumps can be increased by reducing the temperature difference between the two reservoirs connected to the heat pump. Accordingly, the temperature of the heat transfer fluid in the thermal distribution network 108 may be adjusted to reduce this temperature difference, thereby increasing the efficiency of heat pumps and thereby reducing the electricity demand of those heat pumps.

For example, the energy management controller of a district energy system 100 can be configured to determine an on-peak operating temperature and an off-peak operating temperature. The energy management controller of the district energy system 100 can be configured to adjust the temperature of the heat transfer fluid to the on-peak operating temperature during an on-peak period in the district 102. The energy management controller of the district energy system 100 can also be configured to adjust the temperature of the heat transfer fluid to the off-peak operating temperature during an off-peak period in the district 102.

Alternately or in addition, the energy management controller of the district energy system 100 can be configured to determine a first seasonal operating temperature and a second seasonal operating temperature. The energy management controller of the district energy system 100 can be configured to adjust the temperature of the heat transfer fluid to the first seasonal operating temperature during a first season period in the district. The energy management controller of the district energy system 100 can also be configured to adjust the temperature of the heat transfer fluid to the second seasonal operating temperature during a second season period in the district.

When buildings 104 in the district 102 primarily require cooling during peak electrical demand periods, the temperature of the thermal distribution network 108 can be controlled to remain low to enable either direct cooling of the buildings 104 and/or reduce the temperature difference the cooling heat pumps need to overcome so they have a high COP and low electrical demand. The operating temperature for the thermal distribution network 108 during a cooling dominant period can range between about 5° C.-35° C. in a summer period. Remaining heating loads during this cooling dominant operating period may be met by heat pumps operating as heat recovery chillers.

When buildings 104 in the district 102 primarily require heating during peak electrical demand periods, the temperature of the thermal distribution network 108 can be controlled to remain high to enable either direct heating of the buildings 104 and/or reduce the temperature difference the heating heat pumps need to overcome so they have a high COP and low electrical demand. The operating temperature for the thermal distribution network 108 during a heating dominant period can range between about 45° C.-65° C. in a winter period. Remaining cooling loads during this heating dominant operating period may be met by heat pumps operating as heat recovery chillers.

Alternately, the operating temperature of the thermal distribution network 108 may not change based on the demands of building heating and cooling loads to minimize distributed building heat pump electricity consumption. For example, in systems using a 4-pipe thermal distribution system with heat pumps only located at the central EMC 110, the operating temperature of the thermal distribution network 108 need not be adjusted to reduce building heat pump electricity consumption.

In some cases, the operating temperature of the thermal distribution network 108 can be controlled to provide demand response capabilities to the electrical grid 105. For example, during off-peak periods when carbon-free electricity sources are curtailed, the temperature of the thermal distribution network 108 may be adjusted change to reduce the COP of building heat pumps and thus use more carbon-free electricity.

In different implementations of the district energy system 100, different thermal distribution system configurations may be used depending on optimization criteria for a given district 102. For example, site constraints of the district 102 that may restrict pipe installations (e.g. existing buildings, roads and utilities infrastructure) can limit installation methods and drive-up costs relative to unobstructed green field installations.

The network geometry of the thermal distribution network can also impact the selection of thermal distribution system configuration. The network geometry can impact the amount of pipe needed for each thermal distribution system configuration. For example, connecting buildings down a straight street, both One-pipe and Two-pipe configurations will require the same total length of pipe, as a One-pipe system needs to have a return run to the EMC. However, for circular or rectangular geometries, such as connecting buildings around a square city block, a One-pipe configuration only needs half the length of pipe as a Two-pipe configuration.

The capital cost of a thermal distribution network can also impact the selection of thermal distribution system configuration. The capital cost is primarily driven by the pipe installation methods possible at the site, the type of pipe used, and the number of pipes, the length of pipes, the diameter of pipes and the amount of insulation.

The length of piping to total energy delivered of the thermal distribution network can also impact the selection of thermal distribution system configuration. This roughly determines the revenue potential per unit cost, with shorter lengths between high load buildings being more cost effective to long lengths between low load buildings.

The annual energy loss of the thermal distribution network can also impact the selection of thermal distribution system configuration. The annual energy loss is determined by the pipe average operating temperature compared to average ground temperature, the number of pipes, the length of pipes, the diameter of pipes and the amount of insulation The equipment selection for energy transfer stations 120 at individual buildings 104 can also impact the selection of thermal distribution system configuration. For example, single or two pipe thermal distribution networks with low temperatures require heat pumps at each building 104 to provide cooling or heating. This, in turn, requires increased distributed electricity consumption. By contrast, 4-pipe systems that include supply and return conduits for both heating and cooling only require heat exchangers and metering at each building 104, and do not increase distributed electricity consumption.

Energy Management Center (EMC)

The following is a description of an energy management center that may be used by itself or in any integrated community energy system or in any combination or sub-combination with any other feature or features disclosed including the energy management system, the EMC thermal network, the energy transfer system, and the node design process.

In accordance with this aspect of the disclosure, there is provided a self-contained energy management unit. The self-contained energy management unit may be referred to as an energy management center, centralized energy management center, and/or a centralized energy management unit. The centralized energy management unit can be used for a district that includes a plurality of buildings. Each building can have an associated heating, ventilation, and air conditioning (HVAC) system.

The centralized energy management unit can include a plurality of energy resources such as energy provisioning units (e.g. thermal energy provisioning elements and/or electrical energy provisioning elements) and/or energy consuming units. The energy provisioning units may have various combinations of energy generating units (e.g. thermal energy generating elements and/or electrical energy generating elements) and/or energy storage units (e.g. thermal energy storage elements and/or electrical energy storage elements). The combination of energy resources can be controlled and selectively coupled to the micro-thermal network and/or electrical micro-grid to provide thermal and electrical energy to a district coupled to the centralized energy management unit and to meet various operational criteria.

The centralized energy management unit can include energy provisioning elements in the form of energy generating elements. The energy generating elements may include at least one combined heat and power generation unit and at least one heat pump. In some cases, the energy provisioning elements may also include forms of energy storage. For example, the centralized energy management unit can include at least one seasonal storage element such as a long-term geothermal storage element.

The centralized energy management unit can include an internal thermal distribution network. The internal thermal distribution network can be thermally coupled to the energy resources (e.g. the plurality of energy provisioning elements) within the centralized energy management unit. The internal thermal distribution network can operate to transfer thermal energy between each of the energy resources and between each of the energy providing resources and the at least one seasonal storage element within the centralized energy management unit.

The centralized energy management unit can include a district thermal network interface. The district thermal network interface can be fluidly coupled to a district thermal distribution network for the associated district. The district thermal network interface can operate to transfer thermal energy between the internal thermal distribution network and the district thermal distribution network.

The centralized energy management unit may include an electrical grid interface. The electrical grid interface can be electrically coupled to an electricity transmission grid. The centralized energy management unit can also include an internal electricity distribution network. The internal electricity distribution network can operate to transfer electrical energy between the electricity transmission grid and various energy resources (as well as other control elements) within the centralized energy management unit. The internal electricity distribution network can also operate to transfer electrical energy between the various energy resources within the centralized energy management unit.

The centralized energy management unit can include a district electrical network interface. The district electrical network interface can be electrically connected to a district electrical distribution network for the associated district. The district electrical network interface can operate to transfer electrical energy between the internal electricity distribution network and the district electrical distribution network. The district electrical network interface can enable the transfer of electricity between the electrical transmission grid and the district electrical distribution network and/or the transfer of electricity between the plurality of energy resources within the centralized energy management unit and the district electrical distribution network.

The centralized energy management unit can include an energy management controller. The energy management controller may also be referred to as an energy management system. The energy management controller can operate to control the energy resources coupled to the internal thermal distribution network (and thus control the transfer of thermal energy through the internal thermal distribution network). The energy management controller can also manage the transfer of thermal energy through the district thermal network interface (e.g. by selectively coupling energy resources to the internal thermal distribution network and controlling the operation of the energy resources). The energy management controller can operate to control the transfer of electrical energy through the electrical grid interface and the district electrical network interface (e.g. by selectively coupling energy resources to the internal electrical distribution network and controlling the operation of the energy resources).

The central energy management unit 110 can be configured to facilitate flexible implementation in a variety of contexts and constraints. For example, an EMC 110 may be sized to be housed within one or more portable shipping container of standard size. For instance, individual energy resources may each be contained within a separate shipping container.

This can allow the EMC 110 to be easily replaced with a smaller or larger EMC, for instance where the building loads for a district 102 change, or even removed all together. This can also allow individual energy resource modules to be replaced with smaller or larger resource modules, or with different types of resource modules. This also allows the containerized modules of the EMC 110 to be sized for the current state of the node, without having to be oversized for expected future growth, that may never come, enabling risk management to load changes.

Some examples configurations of an EMC 110 are shown in FIGS. 2A, 2B, 4B and 4C. The EMC 110 can include various different types of energy resources (such as energy provisioning elements). Examples of energy provisioning elements can include combined power and heat generators, heat pumps, absorption chillers, boilers, cooling towers, thermal storage elements, electrical storage elements, renewable electrical generators, renewable thermal generators, emergency generators, bi-directional electric vehicle storage, and so forth. Some examples of energy provisioning elements that may be included in an EMC 110 will now be described with reference to FIGS. 2A, 2B and 4B.

Combined Heat and Power Generation Units

As illustrated, the EMC 110 can include an energy generating element in the form of a combined power and heat generator 210. Various different types of generators can be used for a combined power and heat generator 210 in EMC 110, so long as the resulting heat generated can be harvested and used within the internal thermal distribution network (and/or micro-thermal network). Some examples of combined power and heat generators 210 that may be used in embodiments of the EMC 110 can include a heat engine, a fuel cell and a modular nuclear reactor. Features and examples of combined power and heat generators 210 that may be used in embodiments of the EMC 110 are described in further detail herein below.

CHP generation units 210 can provide a direct link between the electrical and thermal systems within the EMC 110. Accordingly, optimizing the size and operation of the CHP 210 can contribute significantly to minimizing the GHG emissions in a district energy system 100.

A number of different CHP technologies may be used in embodiments of the district energy system 100. The selection and operation of the CHP 210 in a given EMC 110 can vary depending on the characteristics of a given district 102. The selection of the CHP 210 may typically be selected to minimize GHG for a district 102 (and associated electrical and natural gas grids). Alternately or in addition, other criteria may also be used to select the CHP 210, such as capital cost, lifetime run hours, operational flexibility, maintenance costs, thermal temperature supply, and other considerations.

In order to minimize GHG emissions, the CHP 210 may be selected and operated to provide maximal electrical efficiency. CHP energy source type and CHP technology specific aspects may impact the electrical efficiency of the CHP 210.

Additionally, the operation of the CHP 210 can be controlled to improve electrical efficiency. For example, running the CHP 210 at part load may be avoided during normal operation as this can cause lower efficiency. Accordingly, the CHP 210 may be controlled to run at full load when turned on during normal operations of the EMC 110.

In some operational states, the CHP 210 may need to run in a part load condition. For example, electrical export limitations from the district 102 may force the CHP 210 to operate in part load. In addition, operating the EMC 110 in island micro-grid mode may require the CHP 210 to operate in part load to provide resiliency during a main grid power outage.

Alternately, the operation of the CHP 210 can be controlled to improve electrical efficiency of the overall system 100. For instance the CHP 210 may run in a part load to provide better overall system efficiency, even where the efficiency of the CHP 210 itself may be reduced.

The CHP 210 can be thermally coupled to other elements of the EMC 110 through the internal thermal distribution network. Similarly, the CHP 210 can be coupled to the district micro-thermal network 108 (via the internal thermal distribution network). The thermal energy from the CHP 210 can be directed to other elements of the EMC 110 and/or to the thermal distribution network 108 through the internal thermal distribution network.

For example, the energy management controller can control the EMC 110 to store recovered thermal energy generated by the combined heat and power generation unit 210 using thermal storage element(s) 132/134 in the EMC 110. Alternately or in addition, the energy management controller can control the EMC 110 to direct the recovered thermal energy generated by the CHP 210 to the thermal distribution network 108 of district 102. Alternately or in addition, the energy management controller can control the EMC 110 to direct the recovered thermal energy generated by the CHP 210 to other elements of the EMC 110 that make use of thermal energy (e.g. absorption chiller 230).

As noted, the thermal energy from the CHP 210 can be used to heat the district micro-thermal network 108 (via the internal thermal distribution network 250 of the EMC). Depending on the configuration of the micro-thermal network 108, the temperature of thermal energy required can vary. For example, 5GDHC networks do not require high temperature thermal energy whereas early generation thermal distribution networks may require higher temperatures to transfer thermal energy.

In some cases, the thermal energy from the CHP 210 can also be used for other components of the EMC 110. This may ensure that as much of the thermal energy generated by CHP 210 as possible is harvested within EMC 110.

While 5GDHC networks do not require high temperature thermal energy, other technologies used in the EMC 110 (for example an absorption chiller 230 and/or thermal storage elements 130) may require higher supply temperatures that may be provided by the CHP 210. Accordingly, while CHP electrical efficiency may be a driving factor in CHP technology selection, higher temperature thermal energy supply from a CHP heat recovery system may also be an important consideration for a given system. A CHP 210 that provides a higher temperature thermal energy supply can provide the potential benefit of multi-stage heat recovery from the CHP.

As discussed further herein below, the internal thermal distribution network of the EMC 110 may operate with multiple thermal headers. The flexibility of having multiple thermal headers in the EMC 110 can further reduce the cost needed to benefit from multiple stage heat recovery, such as may be enabled by a higher temperature thermal energy supply from a CHP heat recovery system.

The CHP 210 in an EMC 110 can use various types of technologies including, for example, internal combustion engines, simple cycle natural gas turbines, combined cycle natural gas turbines, micro-gas turbines, steam fired turbines, organic Rankine cycles, fuel cells, nuclear reactors etc. Each CHP technology has varying performance factors such as electrical and thermal efficiencies, maximum thermal temperature supply, minimum start up and shut down periods, wear impact from on/off cycling, expected run hour lifetime, initial capital costs varying with size, maintenance costs, etc. that impact the CHP technology selection for a given EMC 110.

The CHP 210 in an EMC 110 can use various types of energy sources including, for example, natural gas, bio natural gas, petroleum, coal, ethanol, garbage incineration, biomass, hydrogen, small modular nuclear reactors, etc. Each CHP fuel source has varying evaluation factors such as resource availability, delivery infrastructure, fuel cost, the associated CHP technologies that can be driven by the fuel, pollution, safety, public acceptance of fuel source, etc. that impact the CHP fuel source selection for a given EMC 110.

As described further herein below, the EMC 110 can be configured to enable modular connectivity of energy resource units within the EMC 110 itself. That is, the connectivity between the different energy resources (e.g. energy provisioning units and/or energy consuming units) within an EMC 110 may permit individual energy resource components to be removed and replaced without requiring the other components of the EMC 110 to be replaced. Accordingly, the initial selection of a CHP technology and/or energy source in a given EMC 110 can be changed after an EMC 110 is designed and installed, without requiring major changes to the rest of the EMC 110 system to accommodate the new CHP technology and/or fuel source (apart from potential changes to the CHP technology or fuel source to accommodate the change). This enables improved CHP technologies to replace old CHP technologies in energy systems with little to no retrofit costs, making them future technology ready. This also facilitates changes in CHP fuel source to replace a prior CHP fuel source.

The operation of the CHP 210 can be controlled based on a number of factors. For example, the operation of a CHP 210 may be controlled in order to minimize overall GHG emissions attributed to the district 102 (e.g. from the EMC 110 and the energy provided by an associated electrical grid 105 or natural gas grid). Accordingly, the operation of a CHP 210 may vary depending on the nature of the energy generation sources available to a district 102 as well as the particular configuration of the CHP 210.

For example, some districts 102 may be located in jurisdictions with capacity of carbon-free generation sources that meet or surpass off-peak electrical demand. Accordingly, peak demand periods may be the only time in which a CHP 210 that operates using fossil fuels (e.g. natural gas fired CHP electrical generation) for such districts 102 decreases generation from fossil fuel driven marginal generators that would otherwise be used to meet this peak demand. Accordingly, the operation of the CHP 210 in the EMC 110 for such a district 102 may be restricted to peak demand periods under normal operating conditions.

Even under such conditions, providing a CHP 210 in a centralized EMC 110 for a district 102 can enable the decentralization of normally centralized large-scale gas generation peaking power plants to capture and store normally wasted thermal energy from the thermally driven electricity generation cycle. In some cases, the operation of the CHP 210 in this case may be configured to follow day-ahead forecasted dispatching, where the operation of the CHP 210 can be used to meet the peak demand, and not operate during off-peak hours.

Alternately, the CHP 210 may be fired by a carbon-free source (such as hydrogen fuel cell or small modular reactor) rather than a fossil fuel source. In such cases, the operation of the CHP 210 can be adjusted to minimize GHG emissions.

For a fossil fuel-based CHP 210 that is operated in an electrical load following strategy to displace grid level fossil fuel fired marginal generators, the recovered heat must be utilized in order to reduce GHG emissions. As described herein, the EMC 110 can combine thermal technologies that, along with the micro-thermal network 108, ensure the recovered CHP heat is utilized. Examples processes for selecting, sizing and operating CHP technology and energy sources in coordination with the thermal distribution network, and other EMC components (e.g. heat pumps, absorption chiller, short-term thermal storage, seasonal thermal storage) so that recovered heat is utilized fully are described in further detail herein.

Heat Pumps

District energy system 100 can include one or more heat pumps 220. As shown in the examples of FIGS. 1, 2A, 2B, and 4B, the EMC 110 can include one or more heat pumps 220. As will be further discussed herein below, heat pumps 220 may also be used in energy transfer stations 120 (see e.g. FIG. 3) that provide coupling interfaces to the buildings 104.

The heat pumps 220 can be electrically driven. That is, the heat pumps 220 can be configured to use electrical energy in order to transfer thermal energy between two reservoirs at different temperatures.

Different configurations of electrically driven heat pumps 220 may be used in embodiments of the district energy system 100. For example, single and double-stage heat pumps 220 may be used. In some cases, single-stage heat pumps 220 may be preferred to avoid the double lift problem.

Figure 2A:
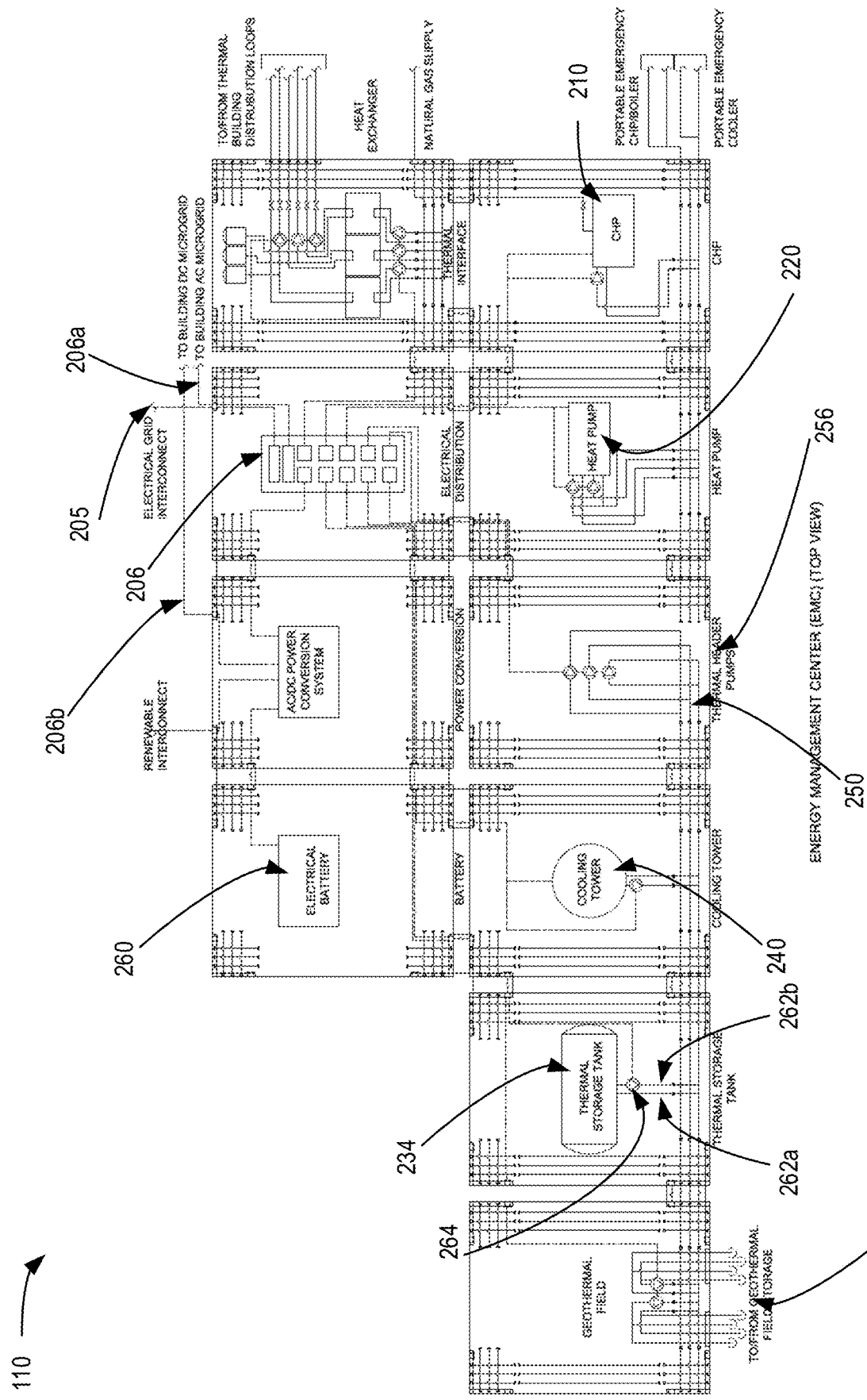
FIG. 2A shows a schematic top view of an example centralized energy management unit and associated electrical and thermal interconnections that may be used with the example district energy system of FIG. 1.
Figure 2B:
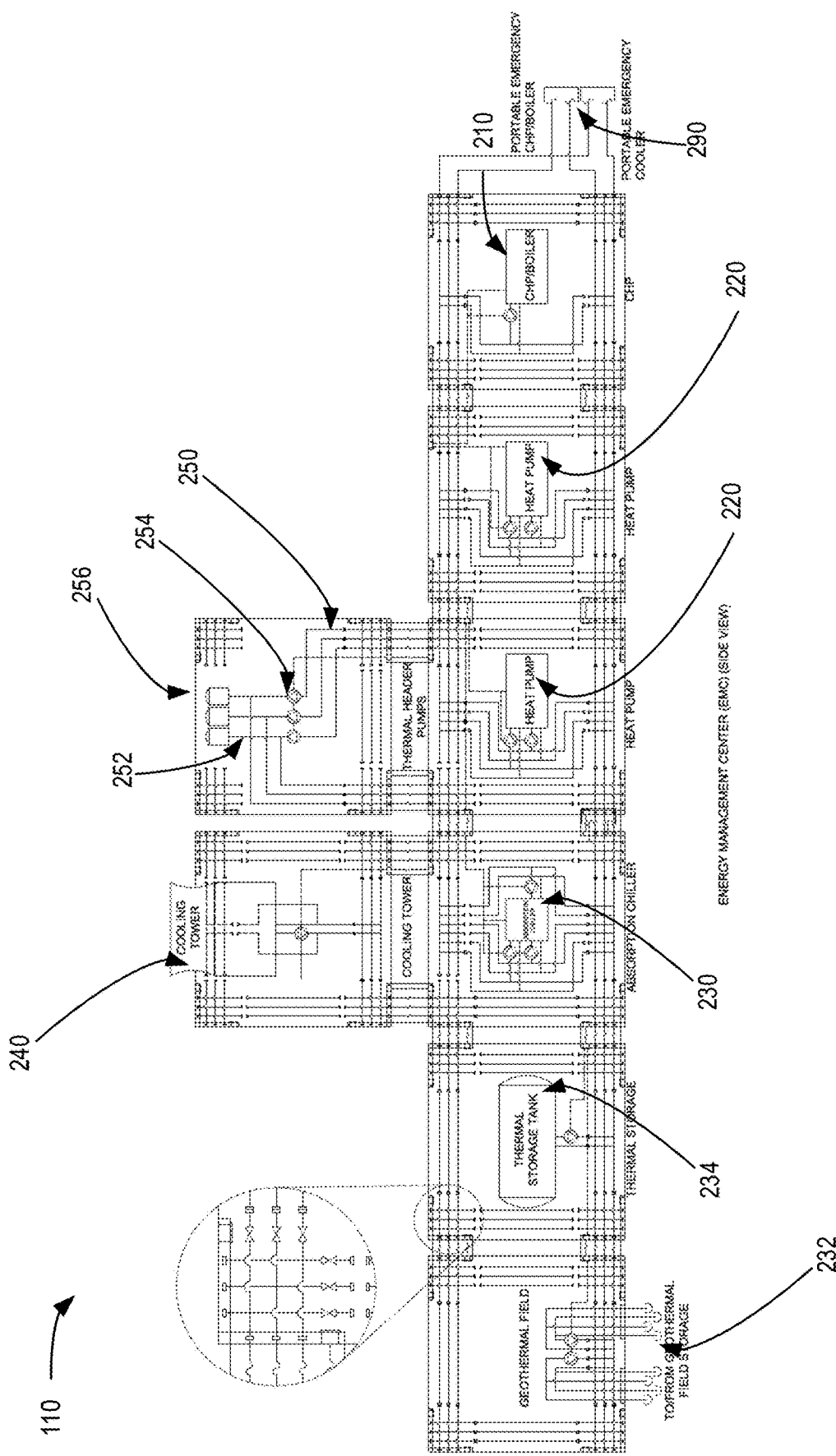
FIG. 2B shows a schematic side view of the example centralized energy management unit and associated electrical and thermal interconnections of FIG. 2A.

Heat pumps can provide a direct link between the thermal and electrical systems in an EMC 110 (and within a district energy system 100 more generally). As shown in FIGS. 1, 2A and 2B, heat pumps 220 can be coupled to the internal thermal distribution network 250 of the EMC 110. The heat pump 220 can be configured to convert electricity into thermal energy provided to the internal thermal distribution network 250 and thereby other components of the EMC 110 (e.g. thermal storage elements) and/or the micro-thermal network 108.

Heat pumps 220 may also provide means for heat recovery from cooling processes. Heat pumps 220 are commonly used in cooling processes, in the form of air conditioners, chillers and refrigerators. Accordingly, cooling-only heat pumps may be used for certain applications within a system 100.

However, cooling-only heat pumps are optimized for cooling, and typically reject the thermal energy gained to the atmosphere as waste heat. By contrast, in embodiments of system 100 and EMC 110 the heat pumps 220 may be selected based on total energy system efficiency, such that the heat pumps 220 can provide both heating and cooling operations. In some examples, each heat pump 220 can be configured as bidirectional heat pumps usable to transfer thermal energy in both directions between the respective reservoirs (e.g. a heat pump 220 in the form of a heat recovery chiller). This may allow the heat pumps 220 to operate for both heating and cooling applications.

During normal operating conditions of the district energy system 100, when there is simultaneous heating and cooling demands in a district 102, heat recovery chillers can be used to meet the simultaneous heating and cooling demands. However, use of heat recovery chillers (and heat pumps more generally) may be limited or restricted during the largest peak electrical demand periods to prevent excess demand on the electrical micro-grid 106.

To avoid a decrease in system wide COP, caused by the double lift problem of heat being transferred through multiple heat pump cycles, a single heat recovery chiller cycle may be used as much as practically possible. For some applications, however, single heat pump cycles for heat recovery may not be practical, particularly when there is a very large temperature differential to overcome. For instance, single heat pump cycles may not be practical for heat recovery in the case of refrigeration applications where freezing temperatures are needed.

While heat pumps 220 can provide a link between the thermal and electrical systems within the EMC 110, they can also introduce high levels of electrical demand into the district energy system 100. Accordingly, where heating and cooling demands are not simultaneously matched, heat pumps may or may not be used to meet the heating and cooling demand depending on the operating conditions of the electrical micro-grid 106 and/or the external electrical grid 105.

EMC 110 can be configured to mitigate peak demand caused by heat pumps 220. For example, the EMC 110 can be controlled in order to minimize the temperature differential the heat pump transfers across. In some cases, the temperature differential may be eliminated entirely between the thermal reservoirs, such that direct heat exchange can be used, by-passing the heat pump 220 entirely. This can completely eliminate the peak electricity required for the heat pump 220.

In order to minimize the temperature differential across a heat pump 220, the thermal distribution network (e.g. micro-thermal network 108 and/or internal thermal distribution network 250) coupled to the heat pump 220 can be supplied with thermal energy from other thermal sources such as heat recovery from a CHP 210, an absorption chiller 230, a short-term thermal storage element 134 and/or a long-term thermal storage element 132 for example.

Another method that can be used to minimize the temperature differential across a heat pump 220, is to select the thermal reservoir with the temperature closest to the desired heating or cooling supply temperature. In the case of winter heating needing a temperature close to the supply temperature of domestic hot water, the outside air may be below freezing, resulting in a low COP if the heat pump 220 uses outside air as a source thermal reservoir. By connecting the heat pump 220 instead to a long-term thermal storage thermal reservoir 132 that stores thermal energy (e.g. at 40° C.), a much higher COP can be achieved from the heat pump 220, reducing peak electrical demand for the same amount of heating demand.

During non-peak periods when carbon-free electricity is being curtailed, minimizing electrical consumption is no longer a priority. Accordingly, heat pumps 220 can operate to harvest otherwise curtailed electricity. During such curtailment periods, heat pumps 220 can be used to meet the heating or cooling demands for the district 102. Alternately or in addition, the heat pumps 220 may be used to harvest electrical energy and convert it to thermal energy for storage in a thermal storage element 130.

For example, the energy management controller of the EMC 110 may determine that the district 102 has an excess renewable electricity supply state as the district and/or electrical transmission grid has an excess supply of electricity from renewable energy sources that exceeds the district electrical energy demand. The energy management controller may then operate the at least one heat pump 220 within the EMC 110 using at least some of the excess supply of electricity to generate heat pump thermal energy. The heat pump thermal energy may be stored using the thermal storage elements 132/134 in the EMC 110.

Additional electrical load can be added during curtailment periods using heat pumps 220 to charge short- and long-term thermal storage. By switching when the heat pumps 220 are on or off, and which thermal reservoirs they are transferring energy from, electrical demand can be varied providing demand management capabilities critical to mitigating the impacts of electrification of heating, while also being able to provide ancillary services to the electrical grid 105.

Thermal Storage Systems

In general, a district energy system 100 can also include one or more thermal storage elements. Thermal storage elements can provide a number of advantages when integrated into the district energy system 100. Thermal storage technologies are often an order of magnitude cheaper and have longer equipment lifetimes than electrical storage technologies. As such, thermal storage systems may be preferable to electrical storage for meeting thermal loads.

Additionally, including thermal storage elements in the district energy system 100 provides significant advantages in combination with harvestable waste heat from other elements of the system 100 (such as CHP 210, cooling towers 240, and other processes that occur at buildings 104 and generate excess thermal energy). By contrast, electrical storage elements cannot directly store and use this thermal energy to meet peak demand later. In addition, existing electrical storage technologies are not capable of storing large quantities of energy over extended periods with the same effectiveness as seasonal storage elements in the form of long-term geothermal storage elements such as borehole thermal storage.

Peak energy demand of buildings 104 is primarily associated with weather causing a peak heating or cooling load. Thus, the annual peaks in a building's demand can be met, at least in part, by thermal energy stored in thermal storage elements. If electricity would otherwise be used to meet this peak thermal load, thermal energy stored in thermal storage elements can reduce peak electrical demands.

While stored electricity is generally be considered the same quality, or exergy, the quality of stored thermal energy is very dependent on the temperature of the stored energy. In some cases, heat pumps 220 may be used to increase the temperature of thermal energy for storage, requiring electricity. This can increase the electrical demand for the district 102. However, the use of heat pumps 220 to generate higher quality thermal energy for storage may also help harvest electricity from renewable sources that might otherwise be curtailed during periods of low demand. Nonetheless, district energy systems 100 as described herein can be configured and controlled to ensure that thermal energy quality is used and maintained, thus reducing the need for heat pumps to increase the quality of thermal energy.

Thermal storage elements can be classified based on the time scales of the charging and discharging processes of those elements. As discussed herein, thermal storage elements can be separated into short-term thermal storage (STTS) elements and long-term thermal storage elements (also referred to as seasonal storage elements). STTS elements can provide faster charging and discharging rates at useful temperatures in the time scale range of days to a week. On the other hand, seasonal storage elements are more suited for shifting thermal energy between the seasons where the time scales are in the order of months.

As shown in the example of FIGS. 2A, 2B, and 4B, the EMC 110 can include one or more short-term thermal energy storage elements 134.

Short-term thermal storage elements 134 can be configured as cooling storage elements and/or heating storage elements. In some cases, the same thermal storage elements 134 may operate as a heating storage element or cooling storage element depending on the conditions in the district 102 and the thermal energy requirements of buildings 104 (e.g. dependent on whether the district is in a summer or winter period).

Short-term thermal storage elements 134 can store excess thermal (heating and/or cooling) energy generated by, or harvested from, other components of the district energy system 100. In the example illustrated, the short-term thermal storage elements 134 are located at the EMC 110. Alternately or in addition, short-term thermal storage elements 134 may be located external to the EMC 110 in fluid communication with the micro-thermal network 108. Alternately or in addition, short-term thermal storage elements 134 may be located at one or more buildings 104 within the district 102. A combination of short-term thermal storage elements 134 located at the EMC 110 and/or the buildings 104 and/or other locations coupled to the micro-thermal network 108 may also be used.

Various types of technologies can be used to provide short-term thermal storage elements 134. In the examples illustrated, the short-term thermal energy storage elements 134 are provided in the form of short-term thermal storage tanks 234. The short-term thermal storage tanks 234 can be configured to store thermal energy using a storage medium contained within a storage container.

For example, various types of thermal energy storage mediums can be used. In some cases, the storage medium may be a sensible thermal storage medium such as water for example. Thermal storage elements 134 using sensible thermal storage mediums can store thermal energy by increasing or decreasing the temperature of the storage medium.

Alternately, a thermal storage element may operate using a latent thermal storage medium. In latent thermal storage elements, the thermal energy can be stored using a phase change material (PCM).

Alternately, a hybrid mix of sensible and latent storage mediums may be used. For example, encapsulated PCMs in a water storage tank may be used as a hybrid storage medium.

The operating temperature of short-term storage elements 134 can also vary depending on the application for a given storage element. For example, a short-term storage element 134 used to provide cold thermal storage may store thermal energy in a range of about 0-10° C. while a short-term storage element 134 used to provide hot thermal storage may store thermal energy in a range of about 35-90° C.

Short-term thermal storage elements 134 can also operate in different configurations within a district energy system 100. For example, a short-term thermal storage element 134 may be an open-loop thermal storage element. An open-loop thermal storage element can interface directly with the system 100 (e.g. with the micro-thermal network 108, and/or the internal thermal distribution network 250 of the EMC, and/or the HVAC system associated with a building 104).

In other cases, a short-term thermal storage element 134 may be a closed-loop thermal storage element. A closed-loop thermal storage element can be coupled to the thermal distribution networks of system 100 through an interface element such as a heat exchanger. As such, closed-loop thermal storage elements can be isolated from the thermal distribution networks of system 100. This may provide increased control over the charging and discharging of the thermal storage elements.

The district energy system 100 can also include long-term thermal storage elements 132. Long-term thermal storage elements 132 can be used to store excess thermal energy seasonally. Seasonal storage elements may be located at the EMC 110. This can facilitate the storage and management of high-quality thermal energy for long-term storage. As shown in the example of FIGS. 1, 2A, 2B, and 4B, the EMC 110 can include a long-term thermal energy storage element 132 in the form of a geothermal field 232. Long-term thermal storage elements 132 may enhance the harvesting of heat from other elements of the district energy system 100, such as cooling processes, CHPs 210 and absorption chillers 230.

In a district energy system 100, the operation of on-site CHP 210 systems during the summer and shoulder seasons often generates excess heat that is not immediately usable because of low heating demand. This provides a considerable amount of thermal energy that—if properly shifted between seasons—can offset some of the heating demands for the district 102 during the winter. Long-term thermal storage elements 132 can store this excess thermal energy for later use in a different season.

In addition, there often exists large amount of waste heat generated in the district 102 from cooling processes (e.g. waste heat from air conditioners and refrigerators) and commercial processes (e.g. restaurant ovens). Seasonal storage can allow the district energy system 100 to harvest and store excess thermal energy available during a first seasonal period (e.g. the summer and shoulder seasons) to be used during a second seasonal period (e.g. the peak heating times in winter).

In general, long-term thermal storage elements 132 can be characterized by a large thermal capacity that is usable to transfer large amounts of thermal energy between different seasons of the year. As a result, long-term thermal storage elements 132 typically have lower charging and discharging rates for useful temperatures compared to STTS elements 134.

An example of long-term thermal storage elements 132 that may be used in district energy system 100 are geothermal systems that use natural ground resources to store thermal energy. For example, long-term geothermal storage elements 132 may be provided in the form of borehole thermal storage (BTS) systems and/or aquifer thermal storage systems. Borehole thermal storage systems include a plurality of boreholes extending below ground in a geothermal field. Borehole heat exchangers can be used to exchange heat between the system and the ground. Geothermal exchange systems typically aim to maintain the ground in the BTS close to the initial natural ground temperature, to minimize thermal loses and degradation of thermal power capacities of ground-coupled heat pump systems. However, BTS systems can be controlled to reduce and/or elevate the temperature of the ground in the geothermal field, thus actively storing high grade heating and/or cooling thermal energy.

Some additional examples of thermal storage technologies can include, for example, pit storage, hot rock storage elements, hot ceramic storage elements, reversable thermal chemical process storage elements, molten salt thermal storage elements and so forth.

As noted above, the temperature of stored thermal energy can affect the quality of the energy that can be used. Accordingly, the district energy system 100 can be configured to increase the temperature of harvested thermal energy prior to storage in a long-term storage element 132. For example, a heat pump or heat recovery chiller can be used to upgrade harvested low-temperature thermal energy to a higher temperature usable to increase the thermal energy stored in the long-term storage element 132.

The implementation of seasonal storage systems can encounter some challenges. For example, costs associated with the drilling and/or the installation of ground heat exchangers may limit uptake. In addition, the operational efficiency of seasonal storage may be capped at around 60% for a 50K temperature differential between the average storage temp and the far field temperature due to the thermal losses into the far field. Nonetheless, long-term storage elements 132 provide significant advantages in capturing heat that would otherwise be lost to waste, even with subsequent thermal losses. Environmental considerations associated with cycling the ground at elevated temperatures for hot storage or freezing the ground for cold storage may also impact the practical implementation of seasonal storage systems.

Seasonal storage allows for waste heat to be harvested during the summer and shoulder seasons and stored for later use during winter. For thermal storage, it is important to maintain the thermal energy from high temperature sources, such as CHP waste heat, close to their source temperature.

In embodiments described herein, long-term storage elements 132 can be arranged in thermal stratification configurations. This can help maintain the quality of the thermal energy from higher temperature sources, in turn reducing the required work for heat pumps and, in turn, reducing peak electrical demand. For example, high temperature heat, such as from a CHP 210, can be sent to the center of a borehole field, while lower temperature heat, such as cooling process rejection heat, can be sent to the perimeter of a borehole field.

The district energy system 100 can operate with the at least one long-term geothermal storage element 232 configured as a thermally stratified storage element. The thermally stratified storage element can include a central storage region and a perimeter storage region. The perimeter storage region can at least partially surround a perimeter of the central storage region. The central storage region can be operated to store thermal energy of a first temperature and the perimeter storage region can operated to store thermal energy of a second temperature. The temperature of thermal energy stored in the perimeter storage region can be maintained nearer to an environmental temperature of a surrounding environment than the temperature of thermal energy stored in the central storage region. The perimeter storage region may thus act as thermal insulation for the central region of the long-term storage element.

For example, rejected, low-grade heat from cooling heat pumps and absorption chillers 230 can then be used as an active thermal insulation in an outer ring (the perimeter region) of the seasonal storage element. When configured in this manner, the EMC 110 can maintain high utilization of the heat from the CHP 210, in both summer and winter seasons. During shoulder seasons (spring and fall), the typical loads for either heating or cooling are low and so the operation of the CHP 210 can result in the high-grade heat being stored directly within the seasonal storage element 132.

The perimeter region of the of the borehole field can replace a cooling tower, while storing rejection heat from cooling processes within district 102. This may reduce the electricity that would otherwise be required if a heat recovery chiller was used to increase the temperature of the cooling process rejection heat up to a temperature above the center of the borehole field in order to charge it.

However, even with a thermally stratified long-term storage element, heat recovery chillers and heat pumps may still be used to increase the temperature of stored thermal energy in some instances. For example, the district energy system 100 can be configured to operate a heat recovery chiller during times of curtailment of carbon-free electrical generation to upgrade harvested low-temperature thermal energy to a temperature above the central region of the thermal storage element. Thus, through coordinated control of heat recovery chillers and thermal stratification of a borehole field, peak electrical demand for cooling can be reduced, and harvested low-temperature thermal energy upgraded using carbon-free electrical generation can be stored at higher temperatures to meet peak winter heating demand.

While seasonal storage has a natural synergy for storing harvested waste heat, it can also be used for seasonal cold storage. Whether to use hot or cold seasonal storage can depend on the peak demand for a given district 102. For instance, district energy systems 100 in temperate climates may tend to have hot seasonal storage, while district energy systems 100 in tropical climates may tend to have cold seasonal storage.

In some cases, seasonal storage elements can be coupled with STTS elements to facilitate effective storage of thermal energy and use of the stored thermal energy. For example, SSTS elements 134 can be configured to operate as a thermal buffer for long-term thermal storage elements 132 to facilitate charging and discharging of the long-term thermal storage elements 132 while accounting for more rapid changes in demand within the district 102 (see e.g. FIG. 4B).

SSTS elements 134 can provide rapid thermal charge and discharge rates for the district energy system 100. Accordingly, SSTS elements 134 are well suited for addressing short term variations in thermal supply and demand within a district 102. However, much like electrical batteries STTS elements 134 can discharge rapidly and become fully discharged in a short period of time.

By combining STTS elements 134 with seasonal storage elements 132, the STTS elements 134 can be configured to manage rapid changes in thermal supply and demand changes, while leaving seasonal storage elements to manage long term trends in thermal demand and supply.

As with long-term thermal storage elements 132, STTS elements 134 can be configured to use thermal stratification strategies, such as temperature driven density stratification, to maintain thermal energy quality. In some cases, STTS elements 134 can be configured for both high temperature and low temperature storage. Accordingly, such STTS elements 134 can be used to meet both winter heating peaks and summer cooling peaks. STTS elements 134 that can be located either in the EMC or the ETS 120 can be operated with heat pumps 220 to harvest curtailed carbon-free electrical generation and convert it into stored thermal energy that can be discharged to offset some of the peak thermal demands of the community node and reduce peak electrical demand that would otherwise be needed to meet these peak thermal demands.

Absorption Chillers

As shown in the examples of FIGS. 2A, 2B, and 4B, the EMC 110 can include one or more absorption chillers 230. Absorption chillers 230 are examples of energy provisioning elements that can operate as thermally driven heat pumps optimized for cooling applications. Absorption chillers 230 can consume hot thermal energy in order to generate cold thermal energy. Absorption chillers 230 can leverage their thermal driven heat pump characteristics within the district energy system 100 to consume thermal energy generated by, or harvested from, other elements of the system 100. This may help reduce peak electrical demand during summer peaks and/or provide cooling at a lower cost than electrically driven chillers.

In some examples, absorption chillers 230 can be connected to CHP systems 210 to form Combined Cooling Heating and Power (CCHP) systems. In such systems, the absorption chiller 230 can take the normally un-used heat from the CHP 210 during operation in summer. This reduces electricity consumed for cooling during the summer season-a period when CHP units 210 tend to have the most unused thermal energy for direct heating. In this manner, absorption chillers 230 promote the higher energy utilization of a CHP power plant 210, when it might otherwise have efficiency more comparable to a natural gas fired peaking power plant with no waste heat recovery.

While absorption chillers 230 can offer benefits when connected with a CHP 210, they typically cannot be distributed at each building 104 like electric driven heat recovery chillers (such as the heat pumps used in ETS 120). Accordingly, absorption chillers 230 may be provided on-site at the EMC 110.

Absorption chillers 230 also have limitations as they are not able to operate as heat recovery chillers which recover cooling process heat and provide it at useful heating temperatures. Additionally, if absorption chillers 230 only operate in the summer, they have fewer run hours, which reduces yearly savings, thereby reducing their value in a given district energy system 100. Thus, design and operational processes, such as those described herein, can be used to maximize the value of absorption chillers in community energy system applications.

In order to reduce GHG emissions, an EMC 110 can be controlled to use fossil fuel sources in a CHP 210 to generate electricity to drive an electrically driven heat pump 220 and use the recovered CHP thermal energy to drive absorption chillers 230. This can provide greater resource utilization as compared to using the fossil fuel in a direct fired absorption chiller.

Various different types of absorption chillers 230 may be used in embodiments of system 100, including single stage and two stage absorption chillers. While single stage configurations may often be preferred with electric driven heat pumps, this is not necessarily the case for the absorption chiller 230. In some examples, two stage absorption chillers may even help the system 100 maximize resource utilization.

Since an absorption chiller 230 can be driven by harvested thermal energy from the CHP, it is less affected by the double lift problem that impacts electrically driven heat pumps. Two-stage chillers tend to use a higher thermal supply temperature for higher COPs as compared with single stage absorption chiller using a lower temperature supply. This may be particularly advantageous for absorption chillers 230 configured to operate using the high temperature waste heat from CHP 210.

Since absorption chillers 230 are not designed for heat recovery applications, for an absorption chiller 230 to fully remove the need for electrically driven heat pumps 220 at peak demand, the heat rejected by the absorption chiller 230 will be at a lower temperature, close to the atmospheric rejection temperature of most chillers. Outside of reducing peak electrical demand, absorption chillers 230 can be used year-round to reduce electrical consumption of heat recovery from cooling process, by acting as the first stage on a heat pump cycle. For example, an absorption chiller 230 can intake thermal energy at a first temperature and output thermal energy at a second temperature, which can then be provided to a heat pump to increase the COP of the heat pump to reduce electrical consumption.

By providing cooling and lifting the recoverable heat to the atmospheric rejection temperature of most chillers, the COP of electrically driven heat recovery heat pumps will be increased, as they have a smaller temperature differential to overcome to provide the recovered heat at standard heating application temperatures. In periods where the node cooling demand is less than the full capacity of the absorption chiller 230 driven by the full heat generated from the CHP 210, the energy management controller can be configured to determine whether seasonally storing the excess CHP heat will result in less GHG emissions than using the excess CHP to drive the absorption chiller 230 more and charge a short-term cold storage system. That is, the energy management controller may selectively store the extra excess CHP heat in seasonal thermal storage elements for use long-term or use the extra excess CHP heat to drive the absorption chiller 230 more and charge a short-term cold storage system for short-term and/or real-time cooling.

In some cases, absorption chillers 230 may be preferred in district energy systems 100 expected to require year-round cooling loads as absorption chillers 230 are primarily optimized for cooling applications. In addition, absorption chillers 230 may be used predominantly in conjunction with CHP 210 to ensure a high-quality thermal source for the chiller 230.

As noted above, CHP 210 may run to displace a fossil fuel fired marginal generator during summer-time peak electrical demand period. In this operational mode, the heat recovered from the CHP 210 can be used to drive the absorption chiller 230. The absorption chiller 230 can then provide cooling supply for the micro-thermal network 108, thereby reducing electrical demand from electrically driven chillers.

Atmospheric Heat Transfer Units

As noted above, in some cases, the energy resource units in a district energy system 100 may include energy consumption units. For example, district energy system 100 may include energy consumption units in the form of one or more atmospheric heat transfer units, such as atmospheric heat rejection coils and/or cooling towers. As shown in the examples of FIGS. 2A, 2B, and 4, the EMC 110 can include one or more heat rejection units in the form of cooling towers 240.

In general, cooling towers 240 operate as a type of heat exchanger that contains a volume of water as a heat sink.

Typically, the cooling tower 240 allows the stored water and atmospheric air to come into contact with each other to adjust the temperature of the stored water (typically to reduce the temperature of hot water stored in the tank). During this process, small volumes of water may evaporate, lowering the temperature of the water circulating within the cooling tower.

Under some operational conditions, it may not be practical for the district energy system 100 to recover and use all the waste heat from cooling processes within a district 102. For example, during summer peak electrical demand periods, it may be more important for the system 100 to reduce electrical demand than to recover heat rejected by cooling processes in the district. Accordingly, rejecting thermal energy from a heat recovery sink to the atmosphere (which is cooler than the heat recovery sink) can increase the COP of electrically driven heat pumps 220 and thereby lower electrical demand within the district 102.

In some cases, the district energy system 100 may be implemented in a district 102 that is cooling dominant on an annual basis. In such cases, it may not be possible to use all the heat recovered from cooling processes within the district 102. Accordingly, at least some of the rejected heat from the cooling processes may need to be rejected rather than harvested.

In most cases, atmospheric heat rejection coils and cooling towers operate as heat rejecting units. In some cases, however, the district energy system 100 can use atmospheric heat rejection coils and/or cooling towers as atmospheric heat extraction unit. In such cases, the atmospheric heat extraction unit may be configured to extract heat from the atmosphere, in a similar process to an air source heat pump. This may allow GHG emission free electricity to be used to extract heat out of the atmosphere and store it in seasonal storage during periods of curtailment of carbon-free generation sources on the grid 105.

On-Site Renewables

District energy system 100 may also include one or more renewable energy resources as energy provisioning units. The renewable energy resources can be integrated into the district energy system 100 on-site at the EMC 110 and/or at other locations coupled to the micro-thermal network 108 and/or electrical micro-grid 106.

Renewable electrical energy resources using various types of renewable energy sources may be used with the district energy system 100, such as wind, solar PV, concentrated solar, geothermal hot rock, biomass, waste-to-energy, renewably produced hydrogen and so forth. Within the district energy system 100, renewable electrical energy resources can operate as they normally would in a micro-grid to generate energy.

In operation, the energy management controller can be configured to permit renewable electrical energy resources to generate at maximum capacity (i.e. to generate as much energy as possible at any given time period) with limited control. This may help maximize the energy generated from carbon-free sources, particularly those with variable production levels. Providing minimal control over the energy generated from carbon-free sources will typically have limited impact on annual generation apart from curtailment. However, as discussed herein, various other elements of the district energy system 100 can be controlled to minimize curtailment of the renewable energy resources.

In some examples, integrated renewable electrical energy resources can be configured to provide ancillary services to the electrical grid 105. Energy management controller can be configured to provide various ancillary services, such as controlling ramp rate, fault ride through, reactive power compensation, curtailment of generation during periods of surplus carbon-free generation. These capabilities to provide ancillary services to the grid 105 can also be used by the EMC 110 when operating in island mode while providing resiliency to the node 102 during main grid power outages.

Renewable thermal energy resources can also be included in the district energy system 100. Renewable thermal energy resources may use various types of renewable thermal energy sources in the district energy system 100, such as geothermal hot rock, geothermal exchange, sewer heat recovery, wind, and solar thermal energy sources for example.

In operation, on-side renewable thermal energy resources, such as solar thermal heat sources, may be configured to operate at maximum capacity during heating dominant periods (i.e. to produce as much thermal energy as it can, due to its carbon-free source). However, during cooling dominant periods, operation of the on-side renewable heat resources may be curtailed to reduce peak electrical demand. The operation of the on-side renewable heat resources may be managed in a manner similar to waste heat recovery within the district energy systems 100. For example, during cooling dominant periods, generation of renewable thermal energy may be curtailed to reduce the electrical demand of heat pumps that otherwise would be used to store the heat in thermal storage elements.

Combined renewable energy resources can also be included in the district energy system 100. For example, integrated renewable electrical and thermal generation resources, such as Building Integrated solar Photovoltaic-Thermal (BITV-T) systems, can be included in district energy system 100 and coupled to both the micro-thermal network 108 and electrical micro-grid 106. This can greatly increase renewable generation on site, by increasing the total renewable efficiency. This may provide additional benefits, such as enabling the owners or managers of a district 102 to target net-zero energy and/or carbon neutral certifications.

While the operation of the district energy system 100 normally does not change whether renewable energy resources are connected at the district 102 to system 100 or somewhere else in the electrical grid 105, there are some notable considerations. For example, when the district 102 is restricted to not exporting electricity to the grid 105, and the generation capacity of site renewable energy resources and the on-site CHP 230 (e.g. a natural gas fired CHP) combined can exceed site electrical loads, the energy management controller can be configured to avoid exporting electricity.

In embodiments where the CHP 230 in EMC 110 is a natural gas fired CHP that is being controlled to displace centralized fossil fuel fired peaking generation with no heat recovery, then both the site renewable energy resources and site CHP 230 can be considered to both have GHG emission free generation. Accordingly, determining the which energy generation source to dispatch down (i.e. curtail) becomes more challenging.

The energy management controller can be configured to identify whether the district 102 is operating in a maximum energy generation state. In the maximum energy generation state, the energy management controller can be configured to use any on-site thermal and/or electrical storage to allow both the site renewable energy resources and the peaking CHP to run at maximum capacity, in order to maximize the GHG emission free generation.

In some cases, however, the energy management controller may determine that the maximum energy generation state is not currently possible for district 102. For instance, the energy management controller may determine that on-site storage is not available (e.g. there is insufficient on-site storage, using on-site storage would require too much electricity to operate heat pumps etc.) to allow both the on-site renewable energy generators and the CHP 230 to run at maximum capacity. The energy management controller may then analyze the energy generation of the on-site renewable generators and the CHP 230 to identify which generators should be curtailed.

The energy management controller can be configured to analyze the utility of the heat coming from the CHP 230 to determine whether to curtail the CHP 230 or the on-site renewables. Where the heat from the CHP 230 contributes to reducing peak electrical demand, operating the CHP 230 may be preferred over operating the on-site renewables (i.e. on-site renewables may be curtailed). For example, the energy management controller may determine that the heat from the CHP 230 is reducing peak demand by avoiding the need for electricity driven heat pumps (a likely case in the winter). In such cases, the site peaking CHP 230 can be determined to have priority over the site renewable energy resources.

Where the heat from the CHP 230 does not contribute to reducing peak electrical demand, operating the on-site renewable energy resources may be preferred over operating the CHP 230 (i.e. CHP 230 may be curtailed). For example, the energy management controller may determine that the heat from the CHP 230 is not reducing peak demand (e.g. in the summer). In such cases, the site renewables can be determined to have priority over the CHP 230.

Having renewable generation resources in the district energy system 100 at district 102 provides the added advantage of an additional generation source for the district 102 when power from the grid 105 is lost. This can further support resilient operations of the electrical micro-grid 106 and micro-thermal network 108 in an island mode configuration. When operating in an island mode configuration, the district energy system 100 can be configured to prioritize site renewables electricity over the CHP 230 at all times, as the CHP 230 can no longer displace centralized fossil fuel fired peaking generation. When operating in the island mode configuration, the energy management controller may be configured to only operate the CHP 230 to firm the site renewables (i.e. to ensure site electrical and thermal loads are met when the site renewable generation is not sufficient).

Electrical Storage Systems

In some examples, district energy system 100 can also include one or more electrical storage elements. Each electrical storage element can be configured to store excess electrical energy from the electrical micro-grid 106.

As shown in the example of FIG. 2A, the EMC 110 can include one or more electrical storage elements 260 in the form of batteries. Alternately or in addition, electrical storage elements 260 may be located external to the EMC 110 in electrical communication with the electrical micro-grid 106. Alternately or in addition, electrical storage elements 260 may be located at one or more buildings 104 within the district 102. A combination of electrical storage elements 260 located at the EMC 110 and/or the buildings 104 and/or other locations coupled to the electrical micro-grid 106 may also be used.

Various types of batteries may be used as electrical storage elements 260. For example, electrochemical batteries may be used to provide stationary electrical storage within a district energy system 100. Various types of electric batteries may be used to store electricity such as Li-ion, lead acid, sodium Sulphur, flow batteries, etc. Electrochemical batteries can provide low to medium available capacities (e.g. in the range of 1 kW-10 MW). Electrochemical batteries can provide medium to large discharge times in the range of minutes to hours. As such, electrochemical batteries may be particularly suited for transmission and distribution grid support and load shifting. However, electrochemical batteries may encounter drawbacks related to cost, lifetime and environmental impact. Various other types of electrical storage elements may be used, such as, for example capacitor storage elements, ultracapacitor storage elements, fly wheel storage elements, compressed air storage elements, pumped hydro storage elements, gravity storage elements, superconducting magnetic energy storage elements, fuel cell storage elements, reversable thermal chemical process storage elements, latent and sensible thermal storage elements for electricity.

Integrating electrical storage elements in the district energy system 100 may provide a number of advantages. For example, electrical storage elements may support flexibility in the sizing of the electrical generation elements (e.g. CHP, solar PV, fuel cells, etc.) included in the EMC 110. Electrical storage elements in the system 100 can be selected and sized to store excess electrical energy to be used in the times of peak demand, with the capability of rapidly changing power output providing operational flexibility. This may alleviate the need to oversize other electrical generation technologies based on sporadic peak demands of the community node 102.

Electrical storage elements may also support demand management operations for the electric grid 105. For instance, in jurisdictions with high capacity of carbon-free generations sources the electric grid 105 can experience surplus baseload generation when there is insufficient demand from the grid 105. As a result, carbon-free resources may be curtailed. Electrical storage elements in the system 100 can be sized and controlled to support a more favorably levelized electric grid 105 that enables further expansion (and reduced curtailment) of the renewable generation sources connected thereto.

Electrical batteries may also be well suited for ancillary services that require quick changes and high ramp rates, such as frequency and voltage regulation. Thus, electrical storage elements 206 in the district energy system 100 can be combined and controlled with other electricity generation units, so that bulk energy requirements can be met by slower moving generators such as a CHP, while the electrical storage elements 206 are configured to provide quick power and lower energy provision requirements. Such fast response capabilities of the electrical storage elements 206 can be used in both grid connected and island mode operations of the district energy system 100.

Electrical storage elements may also enable the EMC 110 to operate the CHP 230 at its optimal capacity. This can further increase the electrical efficiency and engine cycling of the CHP 230, even while the EMC 110 operates in an electrical load following configuration. The electrical storage elements can be configured to switch from charging to discharging and ramping up and down quickly, so that CHP 230 can operate consistently even as electrical demand varies or generation from site renewables vary.

In some examples, the district energy system 100 can further include at least one electric vehicle (EV) charging interface 274 coupled to the district electrical distribution network 106 (see e.g. FIG. 1). Each EV charging interface 274 can operate to charge and discharge the energy storage system of an electric vehicle. The EV charging interface 274 may be an EV charging and discharging hub coupled to the electrical micro-grid 106.

The energy management controller can be configured to control an external EV charger coupled to an electric vehicle and/or an onboard charger of the vehicle. Depending on the EV charger being used, the EV charger may enable unidirectional or bi-directional charging. In some cases, EV charging interface may further enable the district energy system 100 to access the built-in energy storage elements from electric vehicles within the district 102 to support the electrical micro-grid 106 (and in some cases the electrical transmission grid 105 as well).

The EV charging interface can be configured to provide bidirectional electrical charging and discharging. That is, in addition to the standard operation of Grid-to-Vehicle charging, Vehicle-to-Grid charging capability may also be controlled by the energy management controller in the EMC 110.

The energy management controller can manage the operation of the EV chargers to provide some of the same benefits as stationary electrical batteries. For example, managing the operations of the EV charges may help reduce deep cycling and maintain driving range. However, energy management controller may be configured to control EV charging to primarily provide ancillary services that involve high frequency changes to provide power quality, but do not have an impact on energy charged or discharged over a long period. In some cases, the energy management controller may manage the EV charging interface to support grid wide demand response events to minimize annual peak electrical demand, or to allow EV owners to provide more services in exchange for financial compensation.

The energy management controller can be configured to manage the operation of a bidirectional EV charging interface to provide ancillary services to the electrical micro-grid 106 (and in some cases, thereby to the electrical transmission grid 105). For example, the EV charging interface can be managed to provide demand response by causing the electric vehicles to slow or stop charging, or even to discharge their batteries while parked, during the times of peak demand on the grid to thereby reduce demand. Furthermore, controlling the EV charging interface to charge the batteries of the EV vehicle during periods of reduced demand can help add load when it is beneficial to the grid (e.g. during off-peak times when there is curtailment of surplus carbon-free generation).

In some cases, an EV charging interface may operate in a plurality of charger controllability levels. For example, the charger controllability levels may range from EV charging dominant levels (e.g. where the EV charging is a prioritized load for fastest EV battery recharge time) to grid support dominant levels (e.g. where the EV charging can be controlled for the complete benefit of the grid or other grid connected components regardless of the end EV battery charge state) and optionally various intermediate levels. Depending on the charger controllability level for a given EV charger, the range of ancillary services it can provide may change. For instance, the more dispatchable an EV charger load, or discharge in the case of bi-directional capability, the larger the range of ancillary services it could provide to the electrical grid. The less dispatchable an EV charger load, the less value they could provide in terms of ancillary services. In some cases, the charger controllability level of an EV charging interface may be adjusted by the owner of the electrical vehicle connected thereto and/or the owner of the EV charging interface.

EMC Management of the Electrical Micro-Grid

As shown in the examples of FIGS. 2A and 4B, the EMC 110 can be connected to an electrical transmission grid 105 by an electrical grid interface 205. The electrical grid interface 205 can provide a coupling between the electrical transmission grid and the electrical micro-grid 106 for the district 102 as well as the internal electrical distribution network of the EMC 110. The electrical grid interface 205 can provide island mode protection and control for the internal electrical distribution network of the EMC 110 and the associated electrical micro-grid 106 for the district 102.

The electrical grid interface 205 can provide a point of common coupling for the electrical transmission grid 105 and the micro-grid 106. The electrical grid interface 205 can include protection and control circuitry that can be controlled to allow for islanding or grid connection for the micro-grid 106.

The EMC 110 can also include an internal distribution panel 206 coupled to the point of common coupling 205. The distribution panel 206 can operate as a bus to allow protection and control of the EMC 110 and site electrical generation equipment and loads. The distribution panel 206 can also facilitate protection and control of the electricity going to the buildings 104 in the node 102.

In some cases, the voltage at the point of common coupling may change in each EMC 110 based on the node peak power consumption and the operation voltage of the local municipal electrical distribution system. In some cases, transformers may be included to step up or down the voltage for electricity generation equipment and the loads in the buildings 104 and the EMC 110.

Internal to the EMC 110, each EMC electrical load (e.g. each energy resource unit module) can be served using a separate distribution panel. This may allow for separate protection and control of each EMC load circuit.

In some cases, the electrical micro-grid 106 may include a local DC micro-grid 206*b* as well as a local AC micro-grid 206*a*. The local DC micro-grid 206*b* and local AC micro-grid 206*a* can be configured to operate in parallel. In some cases, DC distribution may be sent to buildings 104. However, in many implementations the DC micro-grid 206*b* may remain internal to the EMC 110 (e.g. acting as part of the internal electrical distribution network of the EMC 110). For example, the DC micro-grid 206*b* can connect EMC DC generation (such as Solar PV), DC storage (such as electrical batteries), DC loads (DC EV Fast Charging, Control equipment) and AC to DC conversion equipment (such as a bi-directional inverters).

In some cases, the EMC 110 can be configured to export electricity through the point of common coupling 205 from the district energy system 100 to the external transmission grid 105. In some cases, exporting electricity through the point of common coupling 205 from the district energy system 100 to the external transmission/distribution grid 105 may be restricted and/or prevented (e.g. due to technical and/or economic constraints). The maximum export capacity is normally a technical constraint set by upstream municipal distribution grid protection equipment. In such cases, the electrical grid interface 205 can be configured to prevent exporting from the system 100. However, export limitations can impact the optimal design, sizing and control of the district energy system.

In some cases, existing electrical distribution infrastructure may be used to provide the electrical micro-grid 106. For example, if all the buildings at the end of a municipal electrical distribution feeder are connected to the same district energy system 100, the existing electrical distribution infrastructure may be used as the micro-grid 106. In such cases, the existing infrastructure may be modified by providing the necessary protection and control equipment (of the EMC 110) to isolate and island the micro-grid 106 from the rest of the municipal electrical distribution feeder.

In some examples, cable trays beside the thermal header pipes can be used for the EMC internal electrical distribution network. This may allow conductor wire to be added and removed quickly. The cable trays can include external coupling trays at each of the external interconnection panels of a given energy resource module.

As noted, each thermal and electrical equipment module (E.g. each energy resource unit module) within the EMC 110 can have an associated electrical distribution panel to provide electrical protection for the equipment within the module. The associated distribution panel may be preinstalled within the module to facilitate rapid installation and/or removal of individual modules from the EMC 110. To connect modules electrically, a conductor can be installed between the main bus of the internal distribution network and the distribution panel for each module.

Each equipment module within the EMC 110 can be configured to include an external interconnection panel. The interconnection panel can be used to facilitate connecting and disconnecting the module from the EMC 110. For instance, the interconnection panel can be used to facilitate connecting and disconnecting the electrical and thermal distribution networks within individual energy resource modules to the internal electrical and thermal distribution networks within the EMC 110.

In some cases, the energy resource modules can include multiple interconnection panels on the external faces of the module housing (e.g. on the external face of a shipping container within which that module is housed). For example, the resource modules may be contained within a housing having a generally rectangular parallelepiped and/or cuboid form. In some examples, an energy resource module may include a plurality of interconnection panels with a separate interconnection panel at each corner of one face of the housing. In some examples, the energy resource module may include a plurality of interconnection panels with at least one separate interconnection panel at each corner of the housing. In some examples, the energy resource module may include a plurality of interconnection panels with a plurality of interconnection panels at one or more corners of the housing. The plurality of interconnection panels at a corner of the housing may include separate interconnection panels for each face of the housing that meets at that corner. In some cases, the energy resource module may include a plurality of interconnection panels at each corner of the housing, where the plurality of interconnection panels at each corner of the housing may include separate interconnection panels for each face of the housing that meets at that corner.

To connect a pair of thermal and electrical equipment modules together in the EMC electrical distribution network, interconnection ports can be placed in the interconnection panels on each equipment module. Preferably, the interconnection ports can be placed in the respective interconnection panels of the thermal and electrical equipment modules that are facing each other. A flexible conduit can then be installed between the cable trays of each module. This can allow the electrical conductor to be installed between the main micro-grid bus and the distribution panel for each module.

The EMC 110 can also include internal communication cabling. The communication cabling can be used to control and monitor the operation of the various equipment modules in the EMC 110. Communication cable trays can also be used within the EMC 110 to allow communication cables to be added and removed quickly. Cables can be run through the interconnection ports of the modules in the EMC 110 to interconnect the thermal and electrical equipment modules.

The EMC 110 can also include monitoring and control equipment for each of the modules contained in the EMC 110. For example, the distribution panel of each electrical generator and major load in the EMC 110 can include energy measurement and control equipment. This will allow for monitoring the status of electrical equipment, such as power quality and energy rate delivery or removal from the electrical micro-grid. Electricity control can be achieved primarily by interfacing with the internal control of each unit, with protection systems as a backup. The amount of electricity generated or consumed by a given module can be managed by the energy management system. For instance, the energy management system may control the amount of electricity generated or consumed by a given module according to an optimization process, such as the example optimization process described herein below.

Each thermal equipment unit in the EMC 110 can also include energy measurement and flow rate control equipment. This will allow for monitoring the status of thermal equipment units, such as temperature and energy rate delivery or removal from the internal thermal distribution network of the EMC 110 (e.g. from a thermal header loop). The flow rate control can be used to achieve a flow rate determined the energy management system. For instance, the energy management system may control the flow rate for a given module according to an optimization process, such as the example optimization process described herein below.

The EMC 110 can also include modules with equipment that use natural gas. For example, modules that include boilers, CHPs, emergency generators may require a supply of nature gas. Accordingly, the EMC 110 can also include an internal natural gas distribution network. In some cases, the system 100 can also be configured to provide natural gas distribution for the buildings 104 in district 102.

Natural gas resource modules can include a natural gas distribution manifold and associated safety equipment. The natural gas distribution manifold and associated safety equipment can be preinstalled in each energy resource module that uses natural gas. As a result, only a single natural gas connection is required to be installed between the main natural gas service manifold and each module's natural gas distribution manifold. This can facilitate rapid interconnection and/or removal of individual modules.

To connect the EMC natural gas piping distribution between thermal and electrical equipment modules, natural gas piping can be installed between the distribution manifold of each module (e.g. using the interconnection ports and interconnection panels) to allow natural gas to flow between modules.

The EMC 110, and the modules contained therein, can be sized to ensure that peak demand can be met by the EMC 110 for the whole node 102. In respect of thermal equipment modules, the peak demand can refer to a peak flow rate. In respect of electrical equipment modules, the peak demand can refer to a peak amperage. The various fluid interconnection components (e.g. pipes, pumps, heat exchangers, etc.) can be sized based on maximum flow rate. The various electrical conductors and protection systems can be sized based on maximum current for the EMC's voltage.

EMC Thermal Network

The following is a description of an EMC thermal network that may be used by itself or in any integrated community energy system or in any combination or sub-combination with any other feature or features disclosed including the energy management center, the energy management system, the energy transfer system and the node design process.

As illustrated in FIGS. 1, 2A, 2B, and 4B the EMC 110 can include an internal thermal distribution network 250. The internal thermal distribution network 250 can be configured to transfer thermal energy to and from the plurality of energy resource units (e.g. energy provisioning units) within the EMC 110.

The internal thermal distribution network 250 can include a plurality of fluid conduit networks 252. The plurality of fluid conduit networks 252 may be referred to as a multiple thermal header loop system. Each fluid conduit network 252 (also referred to as a thermal header) can be fluidly coupled to a plurality of the energy resource units in the EMC 110.

Each thermal header loop 252 can be configured to transport a heat transfer fluid. The heat transfer fluid can be used to transfer thermal energy between components of the EMC 110. Each thermal header loop 252 can be controlled to transport the heat transfer fluid at a specific temperature range. The specific operating temperature range for a given thermal header 252 in a given configuration can vary.

In the example illustrated, the fluid distribution network 250 includes three fluid conduit networks 252A-252C (i.e. a three thermal header configuration). However, more or less thermal header loops are possible. For example, only two fluid conduit networks may be used in different configurations of an EMC 110.

In the example shown in FIGS. 2A, 2B and 4B, a first thermal header loop 252a can be controlled to transport the heat transfer fluid in a first temperature range that is above 60° C. This first fluid conduit network 252a can thus act as a hot loop for the EMC 110. EMC equipment (i.e. energy resource units) that generates thermal energy over 60° C. can be fluidly coupled to the first fluid conduit network 252a to allow that equipment to add their generated heat to the hot loop 252a. Similarly, EMC equipment loads (i.e. energy resource units) requiring heat over 60° C. can be fluidly coupled to the first fluid conduit network 252a to allow that equipment to remove heat from the loop 252a.

Examples of typical energy resource units (e.g. EMC equipment or loads) that may add or remove heat from the hot temperature loop 252a can include:
Thermal Distribution Micro-grid 108
Combined Heat and Power Unit 210
Short-Term Thermal Storage (Charge and Discharge) 134
Long-Term Thermal Storage (Charge and Discharge) 132
Heat Pump 220 Condenser Coil
Absorption Chiller 230 Generator
Back-up Boiler 265
Heat Rejection Coil/Cooling Tower 240
Interconnections with other header loops 252b/252c
Connection 290 for mobile back-up heater A second thermal header loop 252b can be controlled to transport the heat transfer fluid in a second temperature range that is below 15° C. This second fluid conduit network 252b can thus act as a cold loop for the EMC 110. EMC equipment that generates thermal energy below 15° C. can be fluidly coupled to the second fluid conduit network 252b to allow that equipment to remove heat from the cold loop. Similarly, EMC equipment loads requiring cooling less than 15° C. can be fluidly coupled to the second fluid conduit network 252b to allow that equipment to add their heat to the cold loop 252b.

Examples of typical energy resource units (e.g. EMC equipment or loads) that may add or remove heat from the cold temperature loop can include:
Thermal Distribution Micro-grid 108
Short-Term Thermal Storage (Charge and Discharge) 134
Long-Term Thermal Storage (Charge and Discharge) 132
Heat Pump 220 Evaporator Coil
Absorption Chiller 230 Evaporator
Heat Rejection Coil/Cooling Tower 240
Interconnection with other header loops 252a/252c
Connection 290 for mobile back-up cooler A third thermal header loop 252c can be controlled to transport the heat transfer fluid in a third temperature range that is between 15° C. and 60° C. This third fluid conduit network 252b can thus act as a middle or intermediate temperature loop for the EMC 110. For middle temperature loop 252c, EMC equipment and loads can add or remove heat from the middle temperature loop 252c depending on the relative temperature of the equipment and the 252c.

Examples of typical energy resource units (e.g. EMC equipment or loads) that may add or remove heat from the middle temperature loop can include:
Thermal Distribution Micro-grid 108
Short-Term Thermal Storage (Charge and Discharge) 134
Long-Term Thermal Storage (Charge and Discharge) 132
Heat Pump 220 Condenser Coil
Heat Pump 220 Evaporator Coil
Absorption Chiller 230 Condenser and Absorber
Heat Rejection Coil/Cooling Tower 240
Interconnection with other header loops 252a/252b As noted above, only two fluid conduit networks may be used in different configurations of an EMC 110. For example, the EMC 110 may be configured to operate using only a hot loop 252a and an intermediate loop 252c.

The EMC 110 can also include plurality of thermal header pumps 254, including a header pump 254 for each thermal header loop 252. For example, the header pumps 254 can be housed within a main thermal distribution header module 256, which contains the EMC thermal header pumps. The main thermal distribution header module 256 can also include additional thermal mechanical systems operable with the thermal header loops 252. For example, the thermal mechanical systems may include expansion tanks, make-up heat transfer fluid systems, heat transfer fluid treatment systems, pressure regulating and relief valves, strainers, air removers, etc. The main thermal distribution header module can also include fluid connections to the thermal headers for mobile back-up thermal generator (e.g. Boiler, Chiller, CHP etc.).

In some examples, fuel source distribution and safety equipment can also be contained in this thermal distribution header module. In the example illustrated in FIGS. 2A and 2B, natural gas distribution equipment is included in the EMC 110. The thermal distribution header module may thus contain necessary equipment such as a fuel source emergency shut off valve, pressure regulator, metering, distribution manifold, connection for mobile back-up equipment (e.g. Boiler, Gen Set, CHP etc.).

The thermal distribution header module may also include a district thermal network interface. The district thermal network interface can connect the thermal header loops 252 to the district thermal distribution network 108. In some examples, the thermal distribution header module may also include micro-thermal network equipment, such as pumps and heat exchangers for the district thermal distribution network 108. Alternately, the micro-thermal network equipment may be contained in a separate module.

As shown in the example of FIGS. 2A and 2B, thermal header loop pumps 254 can circulate the heat transfer fluid through the corresponding loops 252. Each thermal header loop 252 can be fluidly coupled to a module within the EMC 110 by an element specific conduit interface. In some examples, the element specific conduit interface can be coupled to the thermal header loops 252 using the interconnection ports and interconnection panels for the corresponding module.

The element specific conduit interface for each equipment module can include a pair of fluid conduits 262. The pair of fluid conduits 262 can be provided by two pipes installed in each equipment module. The pair of fluid conduits 262 can include a supply conduit 262a and a return conduit 262b. This allows heat transfer fluid to flow down one pipe and back the other.

Each individual EMC equipment unit can include its own fluid pump 264. The fluid pump 264 can form part of the element specific conduit interface for that equipment module. The fluid pump 264 can operate to remove heat transfer fluid from a thermal header loop 252 to the fluid conduits 262 of that equipment module. The fluid pump 264 can be configured to control the flow of heat transfer fluid through the supply conduit 262a and the return conduit 262b.

The element specific conduit interface for each equipment module can include a heat exchanger. Heat transfer fluid removed from the thermal header loop 252 can be sent to the heat exchanger. The heat exchanger can operate to either add or remove energy from the heat transfer fluid thereby changing its temperature. The heat transfer fluid, so modified, can then be returned to the thermal header loop using the return conduit 262b.

Various equipment modules may be coupled to multiple thermal header loops 252 within the EMC 110. For example, a heat pump condenser coil may be connected to the hot, middle and cold EMC thermal header loops 252A-252C.

The element specific conduit interface for each equipment module can allow the thermal equipment therein to connect a supply pipe and return pipe to a given thermal header loop 252. In some examples, the element specific conduit interface for each energy providing element can include a separate pair of fluid conduits 262 connectable to each fluid conduit network 252. Alternately, the element specific conduit interface may use the same supply pipe 262a and return pipe 262a to connect to multiple EMC thermal header loops 252. This may reduce the volume of piping required in the EMC 110. This may also facilitate modular installation of the equipment module in different EMCs having different configurations of thermal header loop systems (e.g. 2 loop vs. 3 loop systems).

The pair of fluid conduits 262 in the element specific conduit interface may be selectively connectable to each fluid conduit network 252a-252c. The element specific conduit interface for each equipment module can include a thermal loop valve system. The thermal loop valve system can operate to adjust which fluid conduit network is connected to the pair of fluid conduits 262. The thermal loop valve system can be configured to prevent the pair of fluid conduits 262 from being connected to more than one of the fluid conduit networks 252 at any given time. For example, motorized valves can be used to ensure that a thermal equipment unit is only connected to one EMC thermal header 252 at a given time.

The EMC 110 can be configured to control the flow rate of each of the thermal header loops 252. In some cases, the EMC 110 can also be configured to control the flow rate of each of the conduits 262 in the individual modules. This may provide added control over the temperature of each header loop 252 as well as load and generation output changes. This configuration can provide the flexibility of having multiple energy resource units (e.g. generators and/or loads) adding or removing thermal energy from a given header loop 252 simultaneously.

The element specific conduit interface for each equipment module also allows EMC equipment units to be added and removed from the EMC 110 without hindering the ability of other EMC equipment units from being able to add or remove heat from the thermal header loops 252. This avoids the need to redesign the pump sizing, EMC thermal system design and control each time an equipment unit is added and/or removed from the EMC 110.

By enabling the equipment units to connect to different thermal header loops, enhanced control flexibility can be provided in the EMC 110. This may also help enhance the overall efficiency of the EMC 110. For instance, the same equipment unit may be able to add or remove heat from different thermal header loops 252 based on changing load and generation profiles.

The energy management system can also be configured to control which of the thermal header loops 252 the supply and return pipes 262 of an equipment unit is connected to change the order of the series connection. For thermal equipment whose efficiency is highly sensitive to temperature, such as a heat pump 220, the order can be arranged to maximize efficiency. For example, when simultaneously adding heat from multiple sources, it is better to have a heat pump 220 adding energy before a CHP 210, as an increase in temperature a few degrees may reduce the COP of the heat pump 220 noticeably, but an increase in temperature a few degrees will have almost no noticeable efficiency change in the CHP 210.

By connecting the supply and return pipes of an equipment unit to both a thermal header's supply and return pipes, it is possible to connect multiple thermal equipment units in parallel. This allows the same temperature to enter equipment units simultaneously adding or removing heat from the thermal header loop 252. This can help improve the efficiency of equipment units that have similar efficiency performance based on temperature such as heat pumps 220 and thermal storage 132/134.

In some cases, the element specific conduit interface for an equipment module may include mixing valves. The mixing valves can be configured to ensure that the supply temperature for the equipment within the module remains within the acceptable operating range for that equipment. This further enhances the flexibility of the thermal header loop system, allowing for connection of equipment operating at different temperature ranges.

For example, the EMC 110 may include a heat pump evaporator that needs a supply temperature below 30° C. and a geothermal storage field that can supply heat at 45° C. If the heat from the storage field was fed directly into the evaporator this could lead to mechanical failure of the heat pump. The mixing valves may be configured to mix the return from the heat pump (e.g. at 25° C.) with the supply from the geothermal storage (45° C.) in a ratio to achieve the acceptable 30° C. supply to the heat pump evaporator, avoiding mechanical failure.

While enabling each equipment unit to connect to both pipes of each thermal header loop 252 provides added flexibility, it requires more piping and valving. To reduce costs associated with the extra piping and valving, a multiple header connection component can be used that can be mass manufactured.

To enable connection to other thermal modules, each end of the two pipes that are installed in each thermal equipment module for each thermal header, can include a connection point for a multi-port manifold or a return-joint. The connection points can be provided at the corners of an energy resource unit. As shown in the example of FIGS. 2A and 2B, connection points may be provided at each corner of the energy resource unit. For example, connection points may be provided at each interconnection port for a given energy resource unit. In some cases, unused connection points can be capped and isolated within a given energy resource unit.

In some cases, certain energy resource units may omit connection points at locations unlikely to be used by that energy resource unit. For example, cooling towers may omit connection points at the top corners of the cooling tower module, as it is unlikely that other energy resource units would be mounted on top of the cooling tower module. Alternately, all the energy resource units may be provided with connection points at the same locations to facilitate manufacturing and assembly.

Once connected, the multi-port manifold can enable connection between multiple thermal modules. Each branch on the multi-port manifold can include a shut-off valve for isolation, and a connection point that can be capped. If a multi-port manifold is not connected, a return-joint with an integrated shut-off valve can be installed so that heat transfer fluid can follow down one EMC thermal header loop pipe and then come back down the other pipe. The multi-port manifold and the return-joint can remain inside the energy resource equipment module.

As noted above, each thermal and electrical module can include interconnection panels at multiple locations on the module housing. The interconnection panels may be configured to be watertight. These interconnection panels can be located in the same location on multiple sides of the housing. This may ensure that when modules are placed beside each other on any side, the interconnection panels can be aligned. This may allow modules to be quickly and seamlessly connected regardless of whether the modules are placed side by side, end to end, stacked on top of each other, or any combination thereof. This flexibility may further support installation of the EMC 110 in districts 102 having a wide variety of site constraints, such as zoning laws that prohibit multi-story buildings (preventing modules from being stacked vertically), the only space available being along a property line (requiring modules be connected end to end), a lack of ground surface space (requiring stacking to fit all the modules on site) and so on.

To connect the EMC thermal header loops between thermal equipment modules, interconnection ports can be placed in the interconnection panels facing each other on the thermal modules. Flexible expansion joints can then be installed between the thermal modules in the interconnection ports to connect the multi-port manifolds for each EMC thermal header loop. The expansion joints may be heat traced to prevent freezing in winter if the heat transfer fluid is water.

Once connected, the isolation valves on the multi-port manifolds and the return-joints can be closed and opened so as to allow the heat transfer fluid to flow through all connected thermal modules and back to each thermal header pump in a continuous loop. This opening and closing of isolation valves to maintain a continuous flow to all thermal equipment may be required whenever a thermal module is added or removed to the EMC 110.

Each electrical and thermal equipment module may include dedicated connections to the hot and cold EMC thermal header loops 252a and 252b. This can allow HVAC equipment within the module to maintain the temperature inside the equipment module at an acceptable temperature as the outside temperature changes over the seasons. This may help reduce variations in equipment thermal gains and losses with operation.

In some examples, the EMS can be configured to control the thermal supply based on energy measurement meters to adjust the temperature in real time. When the thermal header loops 252 are connected in series, such as single pipe thermal distribution loops 252, monitoring temperature may only result in delays based on pipe length and fluid velocity.

Energy Management System (EMS)

The following is a description of an energy management system that may be used by itself or in any integrated community energy system or in any combination or subcombination with any other feature or features disclosed including the energy management center, the EMC thermal network, the energy transfer system, and the node design process.

In this aspect of this disclosure, a comprehensive energy management system is described that can be configured to ensure that the district energy system 100 can operate to meet the electrical and thermal demands of all of the buildings 104 within a district 102 while also satisfying one or more operational criteria, such as minimizing GHG emissions. The energy management system may be configured to coordinate and control the operation of the different components of the system 100 to provide efficient demand response, minimize renewable curtailment, and thus reduced GHG emissions.

Figure 10:
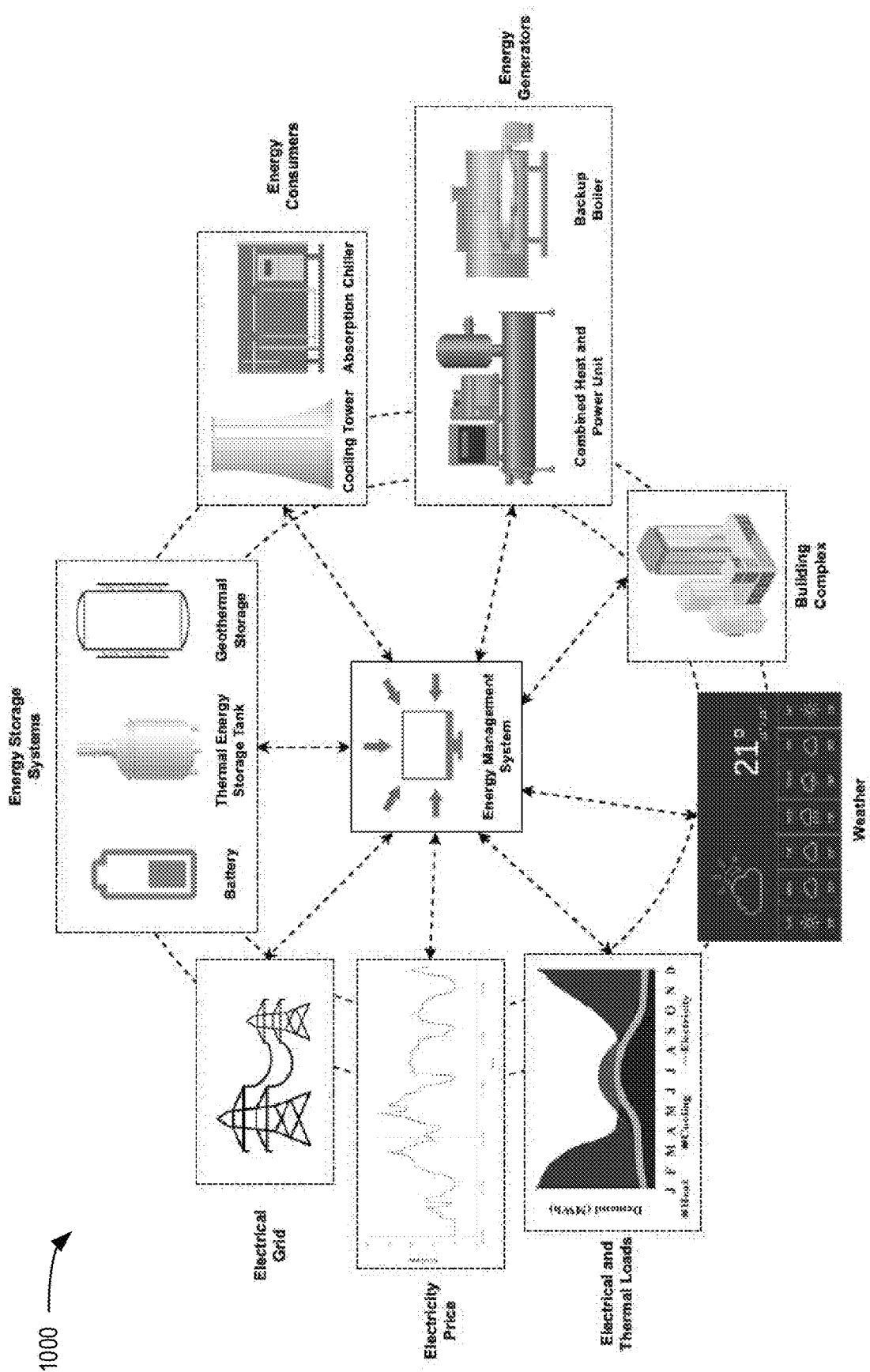
FIG. 10 shows a block diagram of an example energy management system that may be used with the example district energy system of FIG. 1.

FIG. 10 illustrates an example of an EMS 1000 that can be configured to operate in a micro-thermal network 108. As shown in FIG. 10, there are flows of energy (inner circle) and data (outer circle) throughout the different components of the district energy system 100. The energy flow illustrates the energy integration among the different components of the system. The data flow represents the exchange of information between the EMS 1000 and the different energy carriers in the system that can be used to organize the energy integration.

The EMS 1000 can be implemented using one or more computing devices. EMS 1000 can include a processor, a memory, and a communication interface unit. The EMS 1000 may also include additional elements, such as a display and an input device such as a mouse, keyboard or touchscreen.

The processor can be a computer processor, such as a general-purpose microprocessor. In some other cases, the processor may be a field programmable gate array, application specific integrated circuit, microcontroller, or other suitable computer processor.

The EMS 100 may execute an operating system, such as Windows Server, MAC OS X Server, a GNU/Linux server operating system, or other suitable operating system.

The communication interface unit may be any interface that allows the EMS 1000 to communicate with other devices or computers, such as the other components of the district energy system 100. For example, the communication interface unit may include one or more data network interface, such as an IEEE 802.3 or IEEE 802.11 interface, for communication over a network. The communication interface unit may include at least one of a serial port, a parallel port or a USB port that provides USB connectivity. Optionally, the communication interface unit may include a wireless unit such as a radio that communicates utilizing CDMA, GSM, GPRS or Bluetooth protocol according to standards such as IEEE 802.11a, 802.11b, 802.11g, or 802.11n. The wireless unit can be used to communicate with other devices or computers, such as the other components of the district energy system 100.

The processor is coupled, via a computer data bus, to memory. Memory may include both volatile and non-volatile memory. Non-volatile memory stores computer programs consisting of computer-executable instructions, which may be loaded into volatile memory for execution by the processor as needed. It will be understood by those of skill in the art that references herein to the EMS 1000 as carrying out a function or acting in a particular way imply that the processor is executing instructions (e.g., a software program) stored in memory and possibly transmitting or receiving inputs and outputs via one or more interface. The memory may also store data input to, or output from, the processor in the course of executing the computer-executable instructions.

The memory on the EMS 1000 may store one or more software applications configured to manage, monitor and/or control the operations of elements within the district energy system 100 such as the energy resource units and their coupling to the micro-thermal network and/or electrical micro-grid. For example, the memory on the EMS 1000 may store one or more software optimization applications usable to determine the desired operating conditions for the components within the district energy system 100.

The EMS 1000 can be configured to control the transfer of electrical and thermal energy within the system 100, including the transfer of electrical and thermal energy within the EMC 110, the transfer of electrical and thermal energy to and from the buildings 104, and the transfer of electrical and thermal energy to and from electrical grid 105 based on various factors, such as current energy consumption of said buildings; current local and regional electrical grid demand; current transmission electrical grid generation mix and associated GHG emissions; current requests to provide ancillary services; current requests to provide natural gas demand response capabilities; weather data; geographical data; occupancy data; historical data for energy consumption of said buildings; historical data for local and regional electrical grid demand; historical data for transmission electrical grid generation mix and associated GHG emissions; historical data for requests to provide ancillary services; historical data for requests to provide natural gas demand response capabilities; operating conditions of said system; predicted energy demands of said system; predicted local and regional electrical grid demand; predicted electrical grid generation mix and associated GHG emissions; predicted requests to provide ancillary services; predicted supply chain disruptions and major weather events that need energy service resiliency operation; and user entered preferences.

The EMS 1000 can be configured to selectively couple and uncouple energy resource units to the micro-thermal network 108 and electrical micro-grid 106 to provide the desired system operations while satisfying the electrical and thermal demands of the district energy system 100. The EMS 1000 can also be configured to identify and control the operational setpoints for the various energy resource units in system 100 to satisfy the operational criteria for the district 102.

The EMS 1000 can be configured to implement a district energy control structure operate to assess the long-term planning, and short-term planning as well as the real-time operation of the district energy system 100. The district energy control structure EMS 1000 can be defined to satisfy a plurality of district operational objectives for the district 102. The plurality of district operational objectives can include, for example:

(1) ensuring that energy generation sources operate within predefined operational ranges;
(2) ensuring that active and reactive powers are distributed in accordance with the necessity of the micro-grid 106 and/or the distribution system 105;
(3) ensuring that disconnection and reconnection processes are conducted seamlessly;
(4) ensuring that production from energy generation sources and power exchanges with the utility are optimized;
(5) ensuring that heat use for local utilization is optimized;
(6) ensuring that sensitive loads are supplied without interruptions;
(7) ensuring that in case of transmission electrical grid failure, the micro-grid 106 is able to operate through black-start; and
(8) ensuring that energy storage systems can support the micro-grid 106 and increase system reliability and efficiency.

The control structure implemented by the EMS 1000 can expand the planning horizon for the district energy system 100 from approximately 5 minutes to 1 year ahead (or more) in the system. Accordingly, the EMS 1000 can be configured to integrate the different dynamics present in the energy system 100 along with their corresponding timescales.

Figure 12:
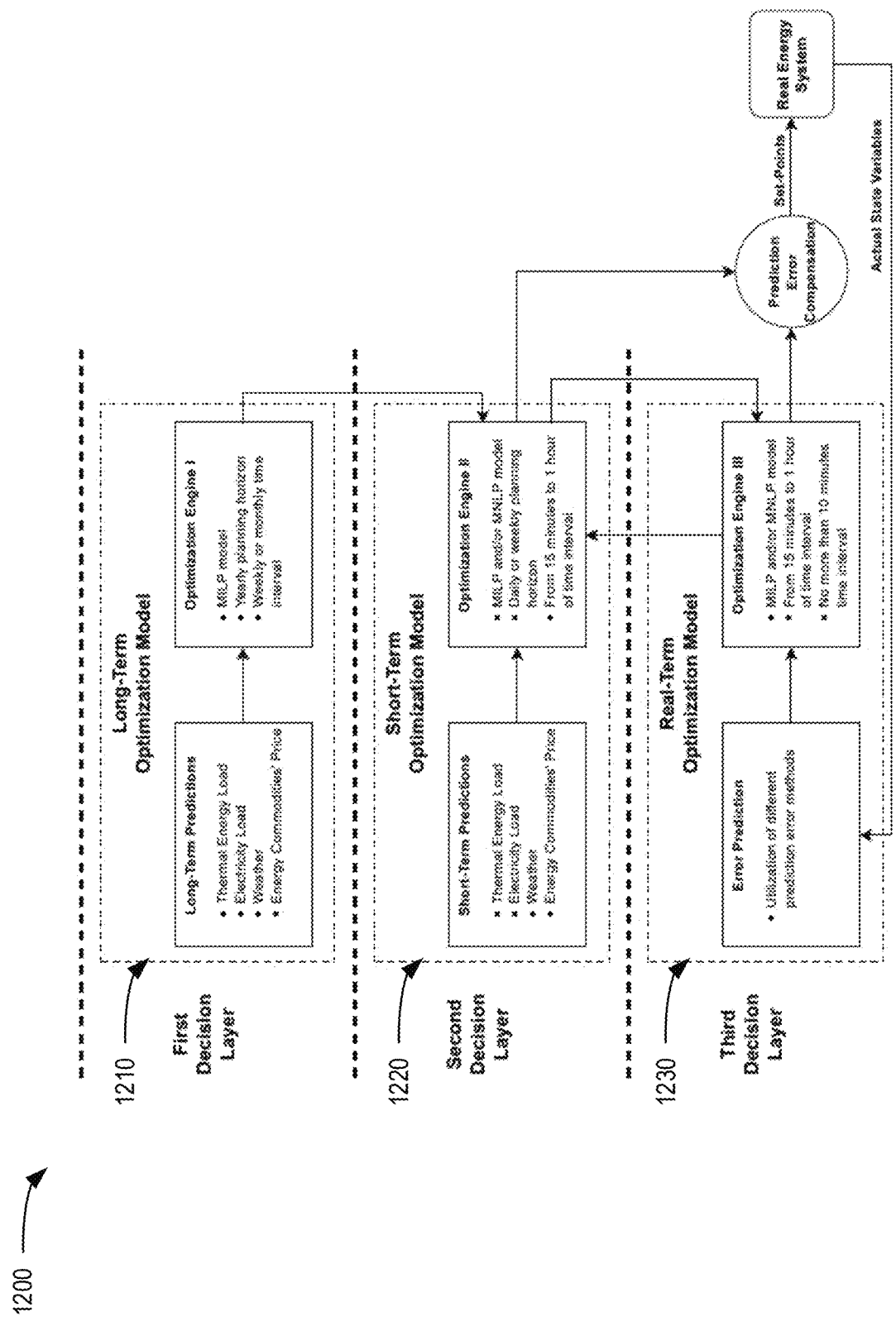
FIG. 12 shows a block diagram of an example multi-layer optimization and control process that may be used with the example energy management system of FIG. 10.

As illustrated in FIG. 12, the EMS 1000 may be configured to operate using a multi-layer control structure 1200. Each layer of the control structure 1200 can correspond to a separate planning time horizon. The example three-layer control structure 1200 can include separate prediction and optimization layers for each separate planning horizon. As depicted in FIG. 12, the outputs of each layer can be provided as inputs into the next lower layer. That is, certain variables generated by the optimization engine of a longer-term layer can be provided as input parameters of the optimization engine for the next, shorter-term layer.

As shown in the example of FIG. 12, each of the layers 1210, 1220, and 1230 can include a layer-specific prediction model and a layer-specific optimization engine. The prediction model for a given layer can include different forecasting approaches to determine variables such as the electrical and thermal loads, weather profiles, electricity and natural gas prices, etc. for the given planning horizon. The optimization engine for a given layer represents an optimization model employed for the optimal operation of the system 100 in the timescale for that layer.

As shown in FIG. 12, the uppermost layer may be referred to as a long-term layer 1210. The long-term layer 1210 can be configured to determine the optimal long-term planning of the system 100. For example, the long-term layer 1210 can be configured to determine a long-term prediction of system operational states including a predicted thermal load demand for the plurality of buildings, a predicted electrical load demand for the plurality of buildings, and a predicted transmission grid state of the electricity transmission grid. The long-term prediction of system operational states provided by the long-term layer 1210 can be determined for a long-term forward-looking period. The long-term forward-looking period may typically be in the range of 6 months to two years.

The middle layer of the control structure 1200 may be referred to as the short-term layer 1220. The short-term layer 1220 can be configured to determine the optimal short-term planning of the system 100. The short-term layer 1220 can be configured to determine a short-term prediction of the system operational states based on the long-term prediction of the system operational states from the long-term layer 1210. The short-term layer 1220 can be configured to determine the optimal operation of the system 100 at a higher level of time resolution as compared to the long-term layer 1210. For example, the short-term prediction of the system operational states may be determined for a short-term forward-looking period that is at most one-fourth of the long-term forward-looking period. The short-term forward-looking period may be in the range of half a day to two weeks. In some cases, the short-term forward-looking period may be limited based on the availability of accurate short-term forecasting data, such as weather forecasting data. For instance, the short-term forward-looking period may be limited to a short-term forward-looking period for which generally reliable weather forecast data is available (e.g. one week).

The bottom layer of the control structure 1200 may be referred to as the real-time layer 1230. The real-time layer 1230 can be configured to determine the optimal real-time operations for the system 100. The real-time layer 1230 can be configured to determine a real-time prediction of the system operational states based on the short-term prediction of the system operational states from the short-term layer 1220 and feedback data from the district energy system 100. The feedback data can represent the current system operational states of the district energy system 100 and in some cases the electricity transmission grid 105 as well as the district 102 more generally. The real-time layer 1230 may then identify operational set points for the district energy system 100 based on the real-time prediction of the system operational states. The EMS 1000 can be configured to control a current operational status of the at least one energy generating element, the district electrical distribution network, and the district thermal distribution network to provide the identified operational set points. The real-time layer 1230 can also provide feedback to the second layer 1220 in order to adjust the previous short-term predictions.

The real-time layer 1230 can be configured to determine the optimal operation of the system 100 (e.g. the operation states of the energy resource units and the coupling of the respective energy resource units to the micro-thermal network and/or electrical micro-grid) at a higher level of time resolution as compared to the short-term layer 1220. For example, the real-time prediction of the system operational states can be determined for a real-time forward-looking period. The real-time forward-looking period may be at most one-twelfth of the short-term forward-looking period. For example, the real-time forward-looking period can be in the range of 10 minutes to two hours. In some examples, the real-time forward-looking period can be in the range of 15 minutes to 1 hour.

Figure 13:
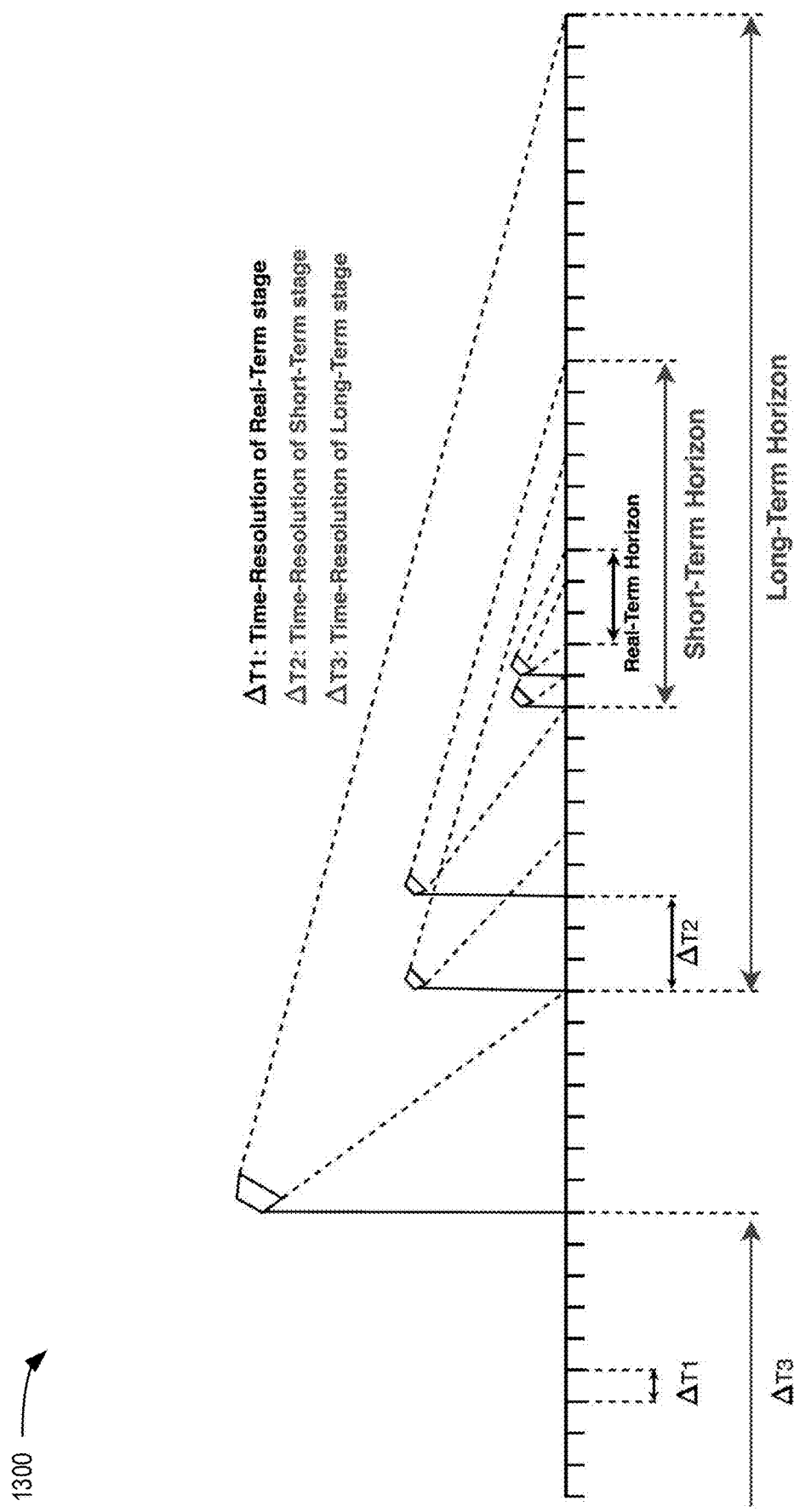
FIG. 13 shows a schematic of an example three-layered rolling horizon optimization process that may be used in the example multi-layer optimization and control process of FIG. 12.

An example illustration of the coordination between the different layers of the EMS control structure 1200 is shown in plot 1300 of FIG. 13. As shown in FIG. 13, the three layers 1210/1220/1230 adopt a rolling horizon approach and can be differentiated by their planning horizon, time resolution, and formulation.

As illustrated, the long-term optimization model can be defined to determine the optimal operating states of components (e.g. the energy resource units) of the system 100 over a year. For example, the long-term optimization model may be defined to determine the optimal operating states of the seasonal thermal energy storage 132 (e.g. energy storage capacity levels) in the district energy system 100.

The long-term optimization model can be defined to determine the optimal operating states at long-term prediction intervals. For example, the long-term optimization model can be defined to repeatedly update the long-term prediction of system operational states at a long-term prediction interval that is at most a month. For instance, the long-term optimization model can be defined to update the long-term prediction of system operational states with a weekly or monthly time-interval. The long-term optimization model can be defined to determine the long-term prediction of system operational states in long-term time steps (e.g. a day, a week).

The selected prediction interval for a given layer can be selected based on the desired computational costs. At the level of resolution provided by the long-term optimization model, an energy balance-based approach may be sufficient to capture the fundamental physics involved in the seasonal operations.

As illustrated, the short-term prediction model can be defined to determine the operating states of components of the system 100 over a daily or weekly period. For example, the short-term prediction model may be defined to determine the system participation in the electricity market of the grid 105 and the operation states of energy resource units such as on-site energy generation units in the district energy system 100.

The short-term prediction model can be defined to determine the system operating states for the short-term period (e.g. a day, a week) in short-term time steps (e.g. 30 minutes, an hour). For instance, the predicted system operating states for the short-term period may include a plurality of short-term system operating states for each of the short-term time steps (e.g. a different short-term system operating state for each time step. The short-term time steps may be defined to range between 15 minutes and two hours. For instance, the short-term time steps may be at most two hours in some instances. In some cases, the short-term time steps may be defined in an inclusive range between 30 minutes and 1 hour.

The short-term prediction model can be defined to determine the system operating states at short-term prediction intervals. For instance, repeatedly update the short-term prediction of system operational states at a short-term prediction interval that is at most a day. For instance, the short-term prediction model can be defined to update the short-term prediction of system operational states at a short-term prediction interval that ranges between 6 hours and two days. For example, where the short-term period is a week, the short-term prediction model may be configured to update the short-term prediction of system operational states at a short-term prediction interval of 1 day.

As illustrated, the real-time optimization model can be defined to determine a prediction of system operational states (and desired operational set points) of components of the system 100 in real-time. For example, the real-time optimization model may be defined to determine the desired operational set points of all the components in the district energy system 100.

The real-time optimization model can be defined to determine the system operating states for the real-time period (e.g. 15 minutes, 1 hour) in real-time time steps (e.g. 30 second, 1 minute). For instance, the predicted system operating states for the real-time period may include a plurality of real-time system operating states for each of the real-time time steps (e.g. a different real-time system operating state for each time step. The real-time time steps may be defined to range between 15 seconds and two minutes. For instance, the real-time time steps may be at most two minutes in some instances. In some cases, the real-time time steps may be defined in an inclusive range between 30 second and 1 minute.

The real-time optimization model can be defined to determine the desired operational set points at real-time prediction intervals. For example, real-time optimization model can be defined to repeatedly update the real-time prediction of system operation states (and the desired operational set points) at a real-time prediction interval that is at most 10 minutes. For instance, the real-time optimization model can be defined to update the real-time prediction of system operational states with a time interval ranging between 1 minute and 10 minutes.

In some examples, the real-time optimization model can operate using a more detailed model of the system 100 such that an energy balance approach may no longer be suitable. For instance, the real-time model may be defined to consider mass and temperature as independent decision variables of the system 100 to be determined. This may be necessary in order to accurately model important system functions such as demand side management (DSM) and energy harvesting capabilities.

Figure 11:
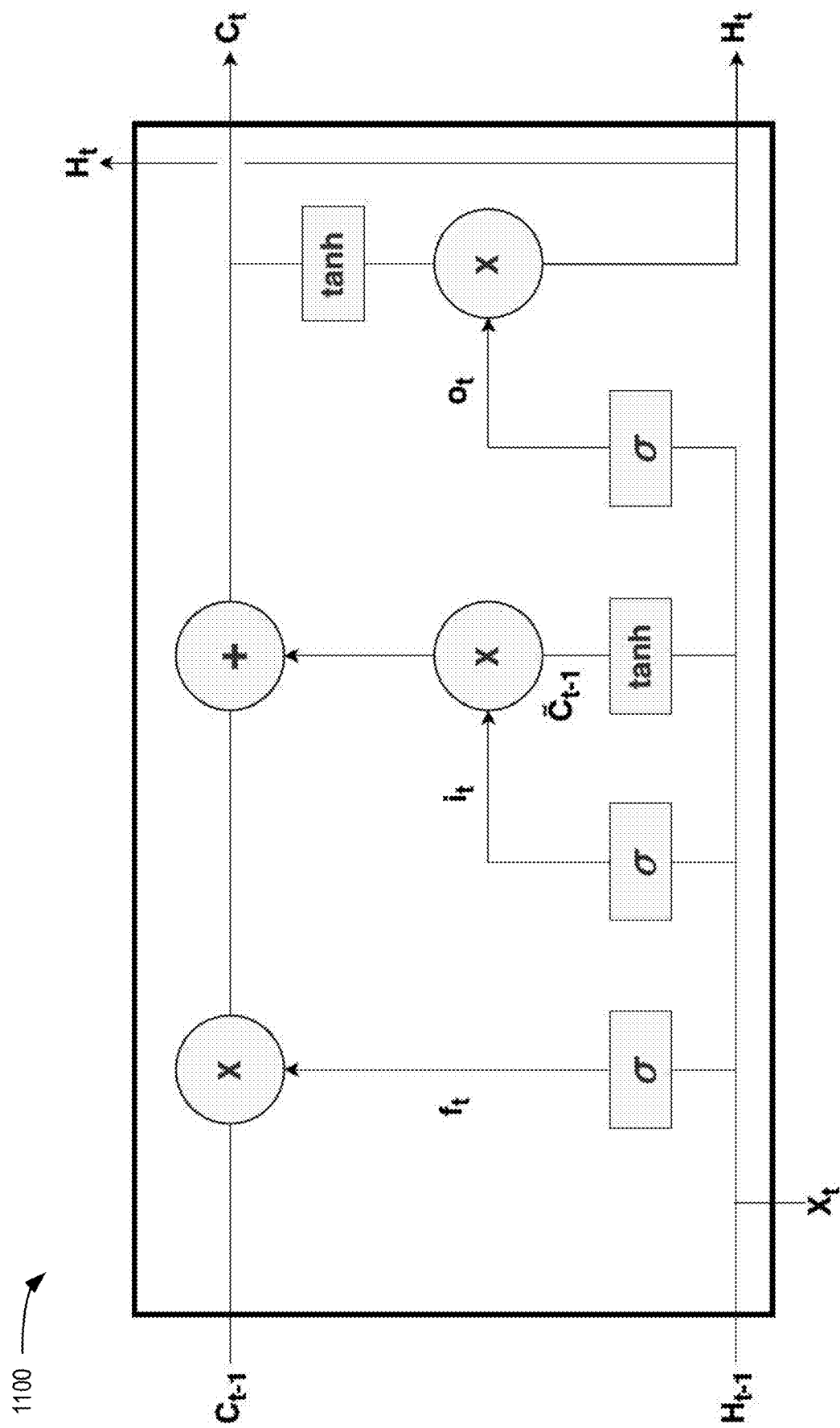
FIG. 11 shows a block diagram of an example neural network system that may be used with the example energy management system of FIG. 10.

In some examples, a special type of recurrent neural network (RNN) called a long short-term memory (LSTM) neural network 1100 can be implemented by the EMS 1000 as a primary forecasting tool. The main characteristic of the LSTM neural network 1100 is a chain structure with a repeating module containing four neural network layers and different memory blocks called cells (see FIG. 11). The LSTM neural network configuration may facilitate modelling temporal sequences. The LSTM neural network 1100 can use the cell states to retain information while memory manipulations are performed by the gates. This provides the neural network 1100 with a unique capability of learning long-term dependencies.

As illustrated, real-time layer 1230 can be configured to generate the final set-points for the local controllers of the various components of the system 100 based on the inputs coming from upper decision levels (1210 and 1220) and actual state variables of the real energy system 100. The real-time layer 1230 can be configured to generate the final set-points using the same real-time prediction intervals, real-time time steps, and real-time period as for the predictions of system operational states. In some examples, agent-based control can be used to control the current operational status of the energy resources (e.g. the energy providing elements), the district electrical distribution network (and the energy resources coupled thereto), and the district thermal distribution network (and the energy resources coupled thereto) of the system 100.

EMS 1000 can be configured to operate using an agent-based control structure. Agent-based control may ensure proper coordination of the different generators and consumers of energy in the system 100, including energy resource units and buildings 104. Each of the different generators and consumers of energy in the system 100 may be considered herein as agents.

Agent-based control facilitates the control of complex systems by splitting the main control objective into smaller objectives that the agents try to fulfil by interacting with each other. In the agent-based control that may be used with the EMS 1000, some of the set-points generated by the three-decision layer control structure can be used to determine the amount of thermal heat and electricity to be generated and consumed by the energy resource units during the operation of the district energy system 100.

The agent-based control structure consists of a broker and different agents (producers and consumers). The broker is a purely virtual component and is not directly connected to any real component of the system. Consumer agents are units that require heat and/or electricity while producer agents are units that supply thermal energy and/or electricity. In some cases, various components of system 100 may operate as both consumer agents and producer agents (e.g. absorption chillers consume and produce thermal energy; heat pumps consumer electrical energy and produce thermal energy; etc.).

Resiliency and Modularity

Embodiments of the district energy systems 100 described herein can be configured to provide electrical energy service resiliency and/or thermal energy service resiliency for a district. The electrical energy service resiliency and/or thermal energy service resiliency may be provided in addition to providing regular energy services for district 102.

As described herein, the district energy system 100 can include a plurality of energy resources including local energy provisioning units (e.g. generators and storage elements) and loads connected using an electrical micro-grid 106 and micro-thermal network 108 for the district 102. The district energy system 100 can include a centralized energy management unit 110 that can include an EMS 1000 usable to control the operation of the various energy resources, the electrical micro-grid 106 and micro-thermal network 108. The EMS 1000 can be configured to disconnect, or island, the electrical micro-grid 106 and micro-thermal network 108 from regional grids, such as a transmission grid 105. In such an island configuration, the EMS 1000 can be configured to operate the district energy system 100 independently to meet the electrical and thermal demands of the district 102. This may enable the district energy system 100 to meet the demands of the district 102 even where the regional grid 105 has suffered a disruption.

In addition to managing disruptions to the regional electrical grid 105, the district energy system 100 can be configured to provide resilient operations in the case of disruptions to other regional supply systems. For example, the district energy system 100 can be configured to provide resilient operations where the natural gas grid suffers a disruption. In particular, thermal storage elements 130 and electrified heating elements, such as heat pumps 220, can provide resilient heating capacity to district 102 that is normally not available in conventional natural gas heating systems.

In general, the micro-thermal network 108 may be considered to be innately in island mode since there are typically no regional thermal grids. However, the electrical micro-grid 106 must be designed and installed with appropriate protection and control equipment to allow the micro-grid 106 to safely transfer into island mode without posing a danger to the regional electrical grid 105. As noted above, the EMC 110 can include this necessary protection and control equipment.

In island mode, the district energy system 100 is required to provide electrical grid balancing services for the district 102 to ensure safe operation of the electrical distribution system (i.e. electrical micro-grid 106). The same capabilities that allow the EMC 110 and system 100 to provide ancillary services to support the regional electrical grid 105 can be used in island mode to reliably operate the micro-grid 106 as demand fluctuates within district 102. In addition, EMC 110 (and EMS 1000) can be configured to provide island microgrid control that ensures coordination among all the generation, storage and controllable demand assets within the district 102 to ensure safe and reliable operation in an island mode configuration.

In some examples, the energy generation capacity of the district energy system 100 (i.e. the energy provisioning units within the system 100) can be configured to provide more energy than required by the loads within the district 102. This can ensure that system 100 can provide local energy service resiliency and avoid deficits in the provision of energy services. Accordingly, the configuration of a given district energy system 100 may be designed using modelling tools to ensure that the desired capacity of energy service resiliency can be met. In some cases, an iterative modelling process may be used to ensure that system 100 can satisfy a number of operational criteria, such as meeting island mode demand, providing the lowest GHG emissions, and so forth.

In some examples, the district energy system 100 need not be designed to provide excess system capacity to ensure local energy service resiliency in island mode. In some cases, the EMC 110 can be configured to include one or more external generator connection points. For example, the EMC 110 can be configured to include exterior connection points on the housing of the thermal and electrical modules. This may allow a mobile unit to be quickly mobilized and connected to the EMC 110 if any one of the heating, cooling or electrical generation units fail. The EMS 1000 can also be preprogrammed to accommodate mobile back-up units as needed.

A mobile unit can be implemented in various ways, such as by a transport trailer with either a diesel or natural gas fired boiler, emergency generators and/or CHP to provide back-up heating and electricity. In some cases, a mobile unit may be configured to contain an electrical driven chiller, to provide back-up cooling. The mobile unit may be configured to provide its own energy source, such as diesel stored on the mobile unit. In some cases, however, energy sources such as natural gas may be supplied from the EMC's natural gas distribution system.

The external generator connection points can also be used to connect the EMC 110 to mobile back-up energy generator units. This allows mobile back-up units to be quickly dispatched and connected to the EMC 110 to account for an increase in local generation to meet required energy service resiliency capabilities. By including connection points in the EMC 110 and preprogramming the EMS 1000 with controls for a mobile unit to connect to the EMC 110 (sometimes enabling coupling within minutes) a single mobile unit may provide resiliency and redundancy to multiple of EMC's 110 within a geographic region. This can avoid the expense and space requirements of redundant back-up heating, cooling and electrical generation units in each EMC 110 that would normally be off while waiting for a normal unit to fail.

Providing connection points for mobile back-up units may further support a configuration of the EMC 110 that satisfies other operational criteria, such as reducing GHG emissions where the capacity determined for other operational criteria can satisfy the load requirements of node 102 in island mode for most of the year (e.g. apart from the peak demand during the coldest or hottest part of the year). Given the very small time period of the demand peaks (and the shorter period for disruptions to occur during a peak demand period), as well as demand reduction strategies that can be implemented using system 100, such a configuration may be particularly suited for non-essential service buildings.

The inclusion of energy storage elements 130 in the district energy system 100 can further support island mode operations for a district 102. However, energy storage technologies may further complicate the design process of the system 100, as the energy available from such technologies will vary depending on whether the energy storage capacity is charged versus discharged. Accordingly, the predictive modelling components of the EMS 1000 and control structure 1200 can be configured to identify potential island mode operation time periods. In some cases, the EMS 100 can be configured to adjust the operational goals for the optimization models to ensure maximizing preparedness for disruptions based on predictive modeling, such as weather predictions about possible ice storms or hurricanes headed to the node 102 which could cause major disruptions.

Seasonal thermal energy storage elements can also support island mode operation for the system 100, e.g. by reducing electrification of heating peak demands by providing warmer temperatures that can increase heat pump COP or enable direct exchange. This can provide a major increase in wintertime thermal resiliency, as seasonal storage can provide thermal energy for months, allowing the seasonal storage to provide heating for extended periods even if both the regional electricity and natural gas grid have suffered disruptions.

Again, the prediction models used by the EMS 1000 can be configured to predict the time and extent of any predicted loss-of-energy events to allow the system 100 to charge the appropriate energy storage elements to account for islanding mode demand and the operation of onsite generation in islanding mode. The EMS 1000 can be configured to operate onsite energy generation elements to charge energy storage elements to a suitable extent before a predicted event occurs. During the design stage, historical data about the weather conditions and the likelihood and extent of disruption events for a district 102 can be used to size the EMC generation and storage components to enable electrical and thermal energy provision for essential activities in the community node 102 during such events.

Energy Transfer System (ETS)

The following is a description of an energy transfer system that may be used by itself or in any integrated community energy system or in any combination or sub-combination with any other feature or features disclosed including the, the energy management center, the energy management system, the EMC thermal network, and the node design process.

As noted above, the district energy system 100 can also include a plurality of energy transfer systems (ETS) 120 (also referred to as an energy transfer interface). The ETS 120 can be configured to provide the external electrical coupling interfaces for the electrical micro-grid 106. The ETS 120 can also be configured to provide the external thermal coupling interfaces for the micro-thermal network 108.

Each ETS 120 can be coupled to a particular building 102 in the district. The ETS 120 can be configured to transfer thermal energy between the associated HVAC system of the corresponding building and the micro-thermal network 108. In some cases, the ETS 120 can be configured to enable a bidirectional transfer of thermal energy between the associated HVAC system of that a building and the corresponding micro-thermal network 108. The ETS 120 can also be configured to transfer electrical energy between the building 102 and the electrical micro-grid 106. The precise manner in which the ETS 120 is configured to transfer energy to and from a building can vary depending on the heating, cooling, and electrical systems in the building itself.

The ETS 120 can be configured to contain the interface between the micro-thermal network 108 and electrical micro-grid 106 and the thermal system (e.g. the HVAC system) and electrical system of the corresponding building. The ETS 120 can be configured to provide heating and cooling directly to the HVAC thermal distribution systems associated with a building 102. For example, heat exchangers 310 can be used to provide heat transfer between a building heat transfer fluid (i.e. the heat transfer fluid used in the thermal system of the building) the network heat transfer fluid used in the micro-thermal network.

The ETS 120 can also be configured to provide electrical coupling between the micro-grid 106 and the building electrical distribution system. The ETS 120 can include a building distribution panel 315 that provides an interface between the micro-grid 106 and the building electrical distribution system. The distribution panel 315 can be configured to include electrical protection components and a disconnect switch.

Figure 3:
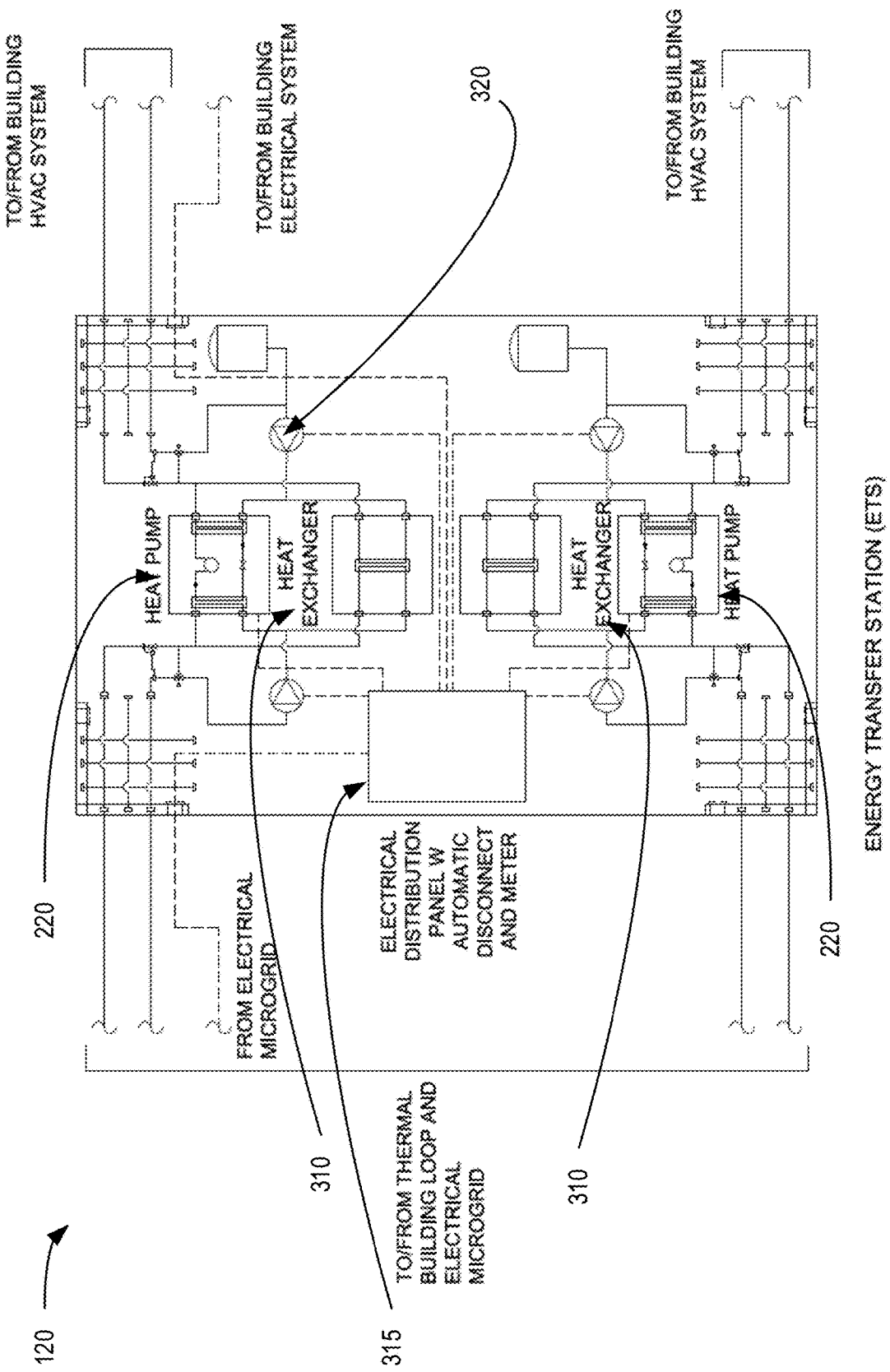
FIG. 3 shows a schematic of an example energy transfer system that may be used with the example district energy system of FIG. 1.

In some examples, the ETS 120 can include at least one heat pump 220 (see e.g. FIG. 3 which includes two heat pumps 220 in the ETS). In particular, ETS 120 may include heat pumps when the micro-thermal network 108 operates using lower temperatures (e.g. 5GDHC thermal distribution systems).

The ETS 120 can also include a plurality of pumps 320. The pumps 320 can be configured to control the flow of heat transfer fluid through the ETS 120. The pumps 320 can be used to draw heat transfer fluid in from, and push heat transfer fluid back to, the thermal distribution micro-grid loop 108. The pumps 320 can also be used to push the heat transfer fluid through the evaporator or condenser coil of the heat pump 220 and the heat exchangers 310 connected directly to the building heating and cooling loops.

The ETS 120 can operate using electricity from the electrical micro-grid 106 and/or the building's own electrical distribution network. This can provide the energy necessary to operate the pumps 320 and heat pumps 220.

Different types of heat pumps 220 can be used in the ETS 120. For example, ETS 120 may include a dedicated heat pump 220 for each of the heating, cooling and refrigeration processes required by a building 104. This may provide increased efficiency in the operation of the individual heat pumps.

Alternately, the ETS 120 may include flexible heat pumps 220 that can be used as heat recovery chillers, heating, cooling and refrigeration heat pumps at different times depending on the building's load profile. The use of flexible heat pumps can facilitate installation and reduce the size of the ETS 120, since the total number of heat pumps needed at an ETS is reduced as compared to using heat pumps limited to dedicated functions.

In some cases, the ETS 120 can be configured to facilitate the flexibility needed for heat pumps to serve multiple functions. For example, the ETS 120 may implement a thermal header loop system such as that described for the EMC 110. This can be used to facilitate switching the load or source connected to each heat pump's evaporator or condenser coil.

For buildings that use non-hydronic thermal distribution systems, such as Variable Refrigerant Flow (VRF) systems, the ETS 120 can be configured with or without heat pumps (even in a micro-thermal network 108 using a 5GDHC thermal distribution system). For VRF systems which have distributed heat pumps throughout the building, the heat exchangers 310 in the ETS 120 can be configured to interface directly with the VRF system, acting either as a condensing or evaporator coil. By adjusting the temperature of the micro-thermal network 108 based on the total load profile of the buildings 104 connected to system 100, higher COPs for VRF heat pumps can be achieved relative to a VRF using the atmosphere as its thermal source or sink.

In most cases, the system 100 can provide the sole source of thermal and electrical supply to each building 104 in a node 102. This can allow building owners to no longer need to maintain their own thermal and electrical generation equipment. Accordingly, the system 100 needs to be able to meet each building's peak demand. As a result, the ETS 120 for each building 104 can be sized to meet the peak demand for that building. For thermal systems the peak demand is a peak flow rate, while for electrical systems the peak demand is a peak amperage.

The ETS 120 can also include thermal and electrical metering equipment. This can provide energy consumption data usable for purposes beyond simply billing building customers. For example, the energy consumption data can be used to determine the operational status of the system 100. The energy consumption data can also be stored as historical data for use by the EMS 1000.

The ETS 120 can be connected to a building 104 in various ways. For example, an ETS 120 may be provided as preinstalled skids or loose components installed inside each building 104 in district 102. Alternately, the ETS 120 may be provided as containerized modules placed beside each connected building 104.

Node Design Process

The following is a description of a node design process that may be used by itself or with any integrated community energy system or in any combination or sub-combination with any other feature or features disclosed including the energy management center, the energy management system, the EMC thermal network, and the energy transfer system.

In accordance with this aspect, examples of processes for designing and operating a district energy system are provided. The design and operation processes can be configured to satisfy a number of operational criteria for a district energy system 100 and a district 102, such as:

Maintaining the occupant desired thermal and electrical services at buildings 104 connected to community node 102;
Reduced grid wide GHG emissions;
Providing services to support the electrical grid 105;
Providing demand response services to support natural gas grid;
Enabling design flexibility to minimize impacts of building load profile changes on hourly to decade time scales (both weather and adding or removing building from node);
Enabling design flexibility to minimize impacts of regional grid generation mix changes on hourly to decade time scales;
Enabling design flexibility to mitigate variability in system operation;
Enabling design modularity to promote economies of scale;
Resiliency to provide local energy services during a disruption of energy provision from regional grids;
Thermal resiliency to allow for sustained operation during extreme disruption of energy provision events;
Demand management services for the electrical grid 105 to allow for peak shifting and reduction of curtailment of renewable energy resources.

The district energy systems 100 described herein may provide increased value by connecting buildings to enable energy demand and supply synergies that cannot be obtained by individual buildings meeting their energy demands independently. Accordingly, a process for designing and operating a district energy system 100 can be defined to identify a set buildings 104 within a district 102 that have the greatest synergies and can be connected to unlock the greatest value. Identifying a set of new or existing buildings to connect in a node 102 may be an initial step of the system design process.

A node 102 for a district energy system 100 as described herein may include two or more buildings connected via a local thermal distribution network and a local electrical micro-grid. In some cases, large single building complexes, such as recreational centers, which have multiple mechanical and electrical rooms that can be connected may also be considered to form a node.

Since the district energy system 100 includes both thermal and electrical micro-grids, the set of buildings 104 for a node 102 can be identified from potential buildings that are in close enough proximity and have specific energy demand characteristics to justify the cost of connecting them together. High energy intensified buildings such as big box centers, grocery stores, wholesale retailer, residential towers, hotels, high rise office buildings, ice arenas, data centers, recreation centers, etc., that are in close geographic proximity may be particularly desirable to for use with a district energy system 100.

The district energy systems 100 described herein may provide further benefits when integrated with an external electrical grid. A district energy system 100 can integrate with a grid and provide value to the full range of electrical gird generation mixes, including from all fossil fuel-based generation to all renewable based generation mixes. District energy systems 100 described herein may be particularly suited for use with complex electrical grid generation mixes, in particular generation mixes involving carbon-free baseload generation, originating from renewable and/or nuclear sources and fossil-fuel driven peaking generation.

As noted above, district energy systems 100 may be particularly suited for use with community areas of high energy consumption. This can allow the systems 100 to distribute recovered heat from cooling processes and a CHP 210 through a micro-thermal network 108 to surrounding buildings.

Existing thermal networks are typically applied in traditional district energy systems common to downtown cores and institutional campuses. However, the district energy systems 100 described herein may extend the useful applicability of the micro-thermal network to smaller numbers of buildings. For example, the number of buildings connected in the micro-thermal network 108 can be less than those of a typical $2^{nd}$ or $3^{rd}$ generation district energy system. In some instances, a micro-thermal network 108 used with the district energy systems 100 may be coupled to a range of 4-10 buildings per thermal network. Accordingly, the generator sizes used in the EMC 110 of district energy systems 100 may also be smaller in some instances. For example, the generator sizes used in the EMC 110 may be less than 5 MW.

Rather than providing one or two large thermal grids in a given location (e.g. a city), the district energy systems 100 herein may enable the use of many micro-thermal network per city. By locating the district energy systems 100 in areas of high demand, it is possible to meet the higher energy density per linear kilometer required for thermal networks to be cost effective. This may further encourage uptake of the district energy systems 100.

Micro-thermal network systems are typically more flexible to implement as compared to large thermal grids. This may allow micro-thermal networks to be installed in locations 102 where customers buildings 104 have entered contracts to connect, ensuring a return on thermal network investment. This can further support uptake of the district energy systems, by reducing or avoiding the need for a large initial investment in a thermal network to connect a smaller number of first adopters, with the risk of needing more customers to be connected in the future to pay for the large initial investment.

Micro-thermal networks such as those used in district energy systems 100 enable more diverse location of buildings to connect to thermal networks, minimizing risk of installing a large district system. When multiple micro-thermal networks are installed in nearby locations, it may then become possible to interconnect the micro-thermal networks together. This can result in a thermal network resembling a more traditional large district system, although achieved without the initial financial risk of traditional large district systems. Economies of scale can be achieved by monitoring and maintaining multiple very similar micro-thermal networks, e.g. through remote monitoring.

To design a district energy system for a given district, a design model of the energy demand characteristics and profiles of multiple high intensified energy building architypes can be defined. The model can define the energy demand characteristics and profiles of each architype on a high time resolution basis (e.g. a time resolution between 1 minute and 1 hour).

An example of an energy demand characteristic is a heat rejection characteristic that specifies the amount of heat rejected from each building's cooling systems at each time interval over a year. Another example of an energy demand characteristic is a heating energy requirement characteristic. The rejected heat identified in a building's heat rejection characteristic could be applied toward heating requirements of other nearby buildings connected in a node 102 if coupled in a district energy system 100.

Buildings within a region can be classified into various types of building heating classes (or building heating scores). Each building can be associated with a building heating class (or heating score) such as a heating dominated class, a cooling dominated class, or a balanced thermal energy consumer class. The association between a building and the building heating class can be determined using a ratio of the respective building's heat rejection characteristic to heating energy requirements on both an annual basis and at each high-resolution time interval. The building heating classifications can be used as a main input to a building node clustering identification process.

For example, building heating classifications can be used to identify pivot/anchor buildings that a cluster of connected buildings can be centered around. A pivot or anchor building may typically be identified as at least one building having a year-round large heat rejection process (e.g. a data center, refrigeration systems, process waste heat) where the normally rejected thermal energy from a cooling process can be recovered and transferred via the micro-thermal network to other buildings that need heating.

Various machine learning techniques may be used to identify the locations of potential district energy nodes 102 around pivot buildings. Geographic Information System (GIS) tools can be used to identify and map high intensified energy buildings within a specified node distance of a pivot building. For example, the specified node distance may be in the range of 0.5 to 2 km. The high intensified energy buildings within the specified node distance from the pivot buildings (along with the pivot building itself) may be identified as a set of community buildings that may be synergistically connected by a micro-thermal network. This set of community buildings can be used to define a district 102 that can with used with example district energy systems 100.

A node energy load mix can be identified for the set of buildings. The node energy load mix can specify the type of energy load mix in the set of buildings. For example, the node energy load mix may be identified as a heating dominated node, a cooling dominated node, or a balanced thermal energy node.

A node energy harvesting potential can also be identified for the plurality of buildings. The node energy harvesting potential can specify the potential for energy harvesting from cooling and waste process heat from the set of buildings. The node energy harvesting potential can also include a node re-distribution potential. The node re-distribution potential may specify the level of building-to-building energy re-distribution available for the set of buildings.

Figure 5A:
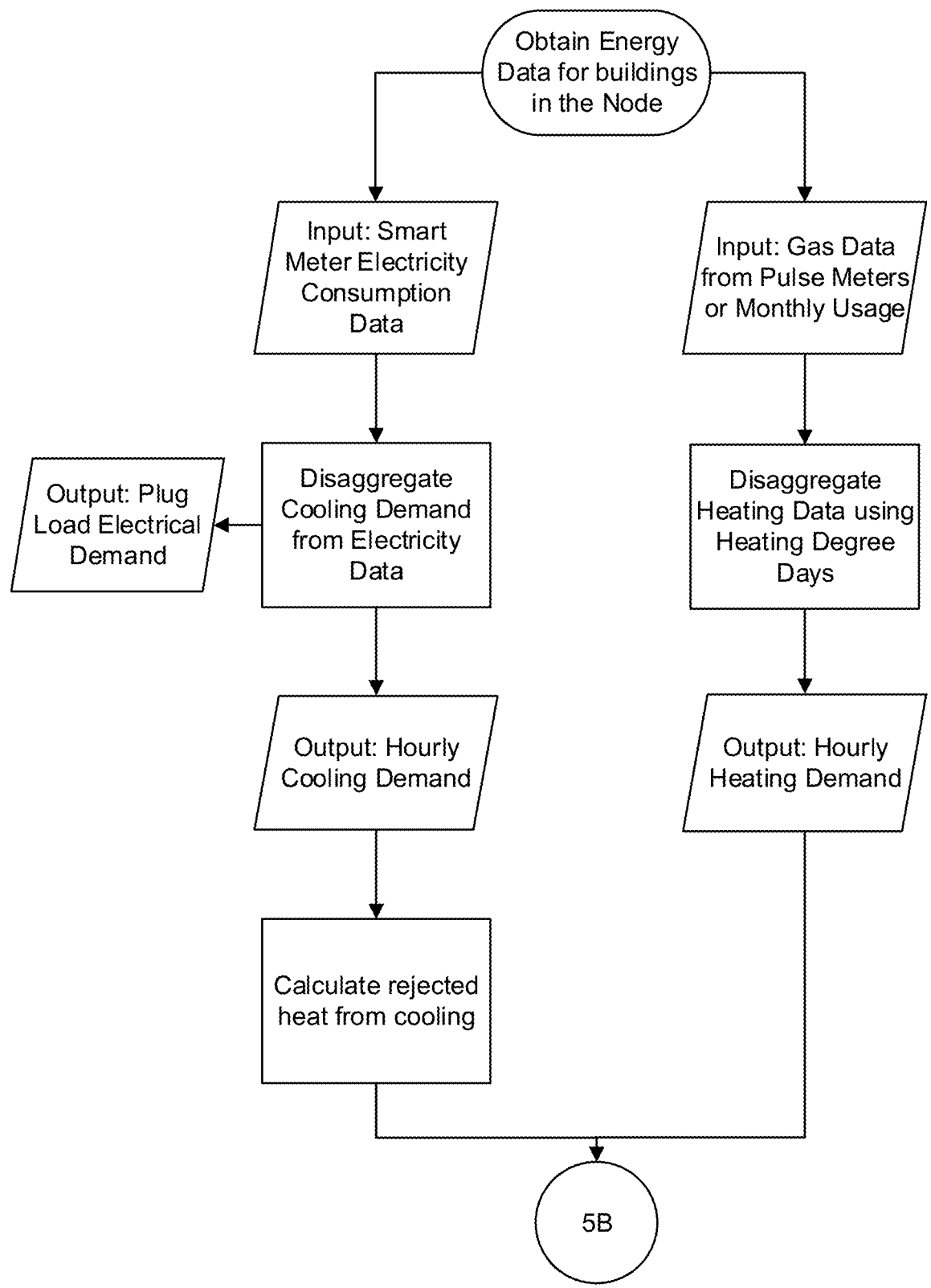
FIGS. 5A-5B show a flowchart of an example community node classification method that may be used for a district such as the district shown in FIG. 1.
Figure 5B:
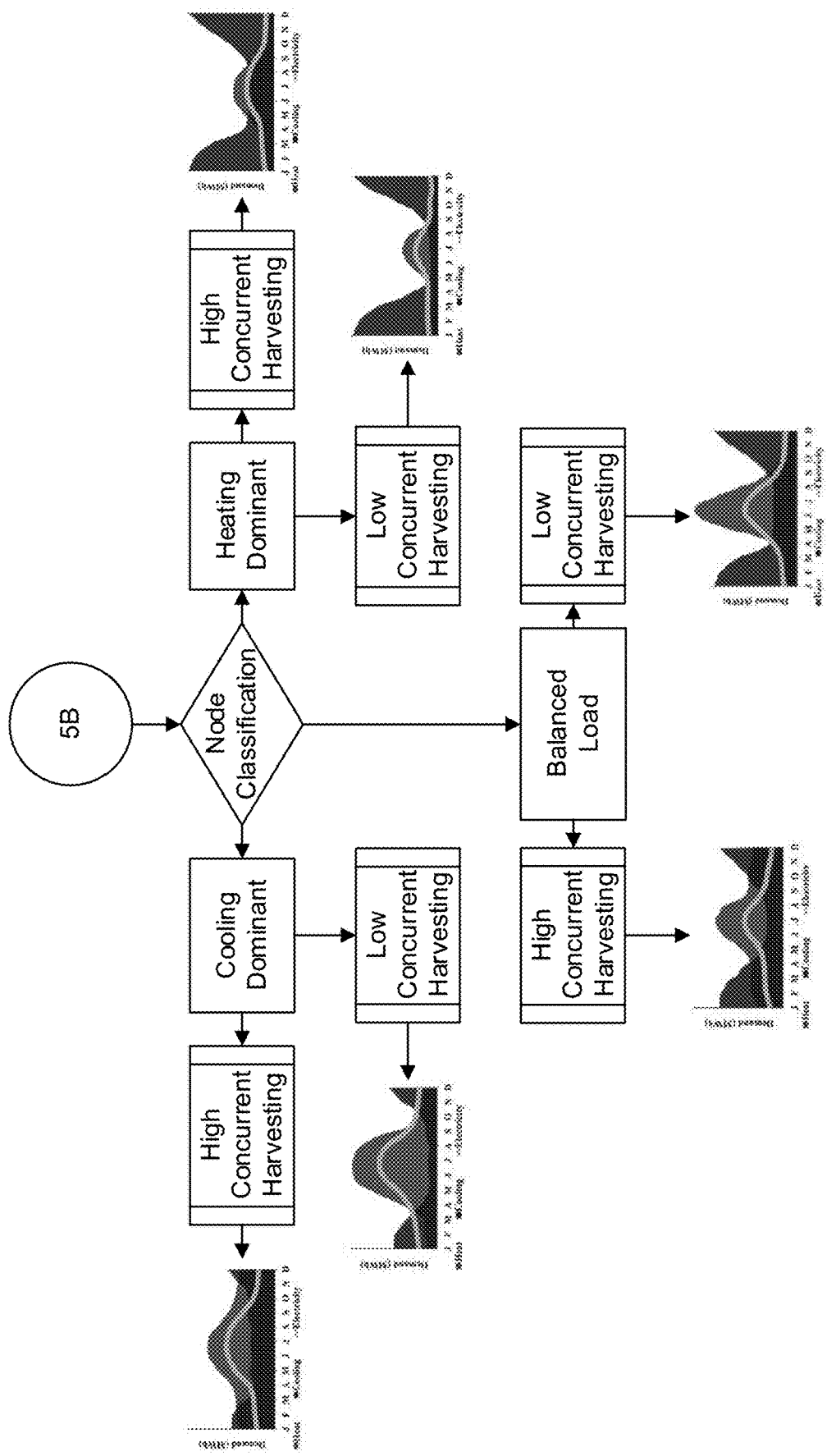

The combined load profile of the individual buildings in the node (i.e. in the set of buildings) can be combined or stacked together to defines the node's total load profile. FIGS. 5A and 5B illustrate some examples of the possible different load mixes in that may be used in nodes 102. Equipment selection, sizing and operation can be determined based on analysis of the overall node load profile. This analysis can, in turn, provide feedback usable to update the definitions of building architypes and sizes and the selection of buildings to include in a set for a node to maximize synergy benefits.

Design and operation of a district energy system for a specific district 102 can depend on the high-resolution node load profile for that district 102. Accordingly, accurately predicting the potential node's load profile can have downstream impacts on the operation of the district energy system. Existing commercial engineering building energy modeling tools may provide detailed models of building load components. Such models may be used to predict a potential node's load profile.

However, the accuracy of commercial engineering building energy models in high intensified complex buildings on a higher resolution (e.g. hourly) basis may not provide a sufficient basis for predicting node load profiles when compared to the actual building consumption data. In some cases, high-resolution energy consumption data may be recorded using smart/interval meters to provide total building electricity consumption over a certain time interval (usually high-resolution periods such as 1 hour). A predicted load model (e.g. using machine learning techniques) trained based on historical high-resolution energy consumption data (for a building size, and/or building archetype, and/or building location) and node weather data can be used to predict the electricity profiles for all the buildings in the set of buildings for a potential node.

In some cases, cooling system energy consumption may not be recorded separately from other energy consumption. Rather, the cooling system energy consumption may be included in the aggregated electricity smart meter data for a building. Accordingly, cooling systems energy consumption may be disaggregated from the aggregated electricity smart meters reading using classification and clustering techniques. A predicted cooling load model (e.g. using machine learning techniques) trained based on these disaggregated cooling load profiles can be used to predict the cooling loads for different building architypes.

In some cases, historical heating load profiles may be available in the form of monthly aggregated data for each building architype based on natural gas meters. A predicted heating demand model trained based on the actual monthly consumption of similar buildings, building operation schedule, and weather information can be used to predict high-resolution demand of different building architypes, sizes and locations.

Figure 9A:
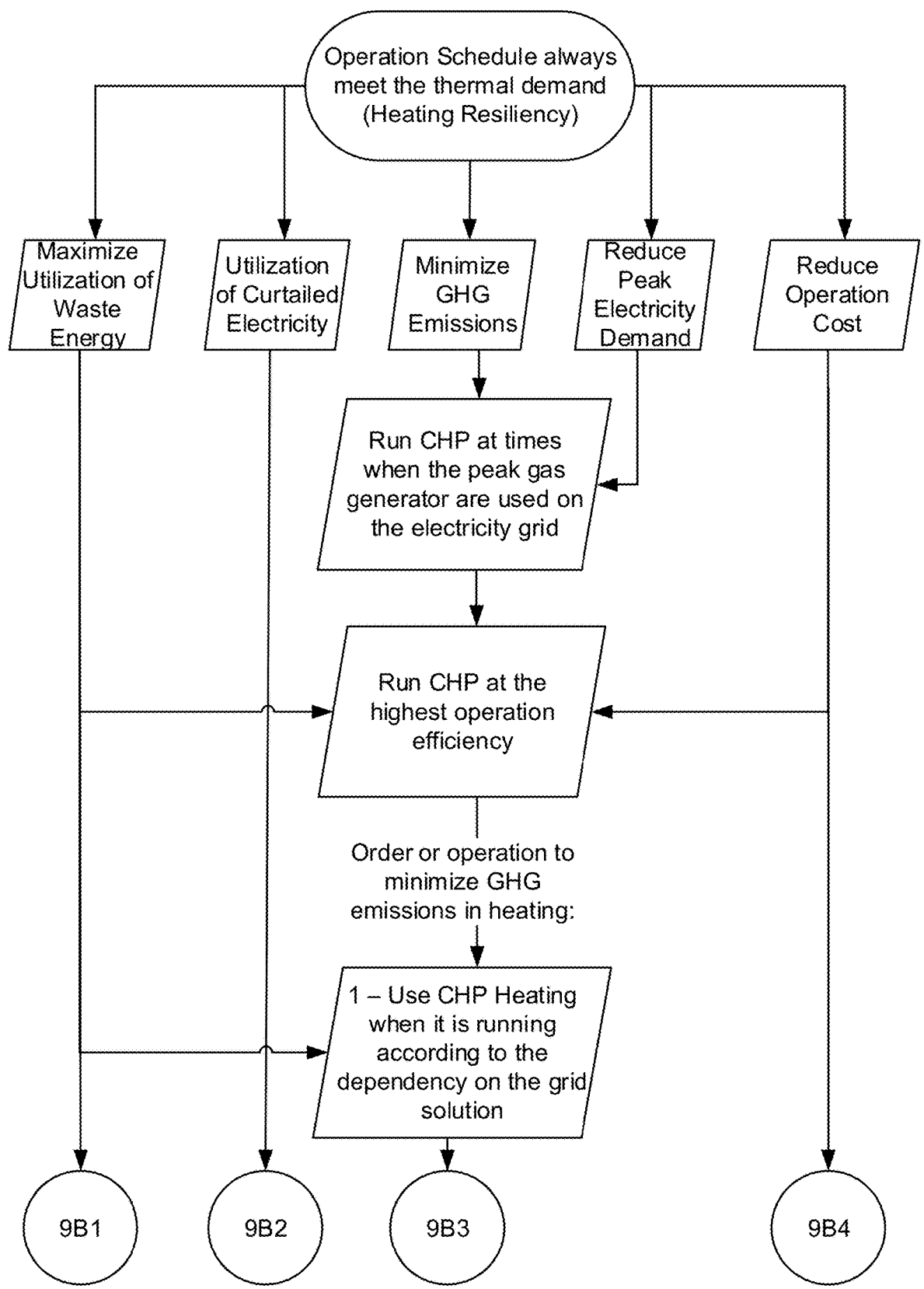
FIGS. 9A-9B show a flowchart of an example method for determining hourly operations of an example district energy system such as the district energy system of FIG. 1.
Figure 9B:
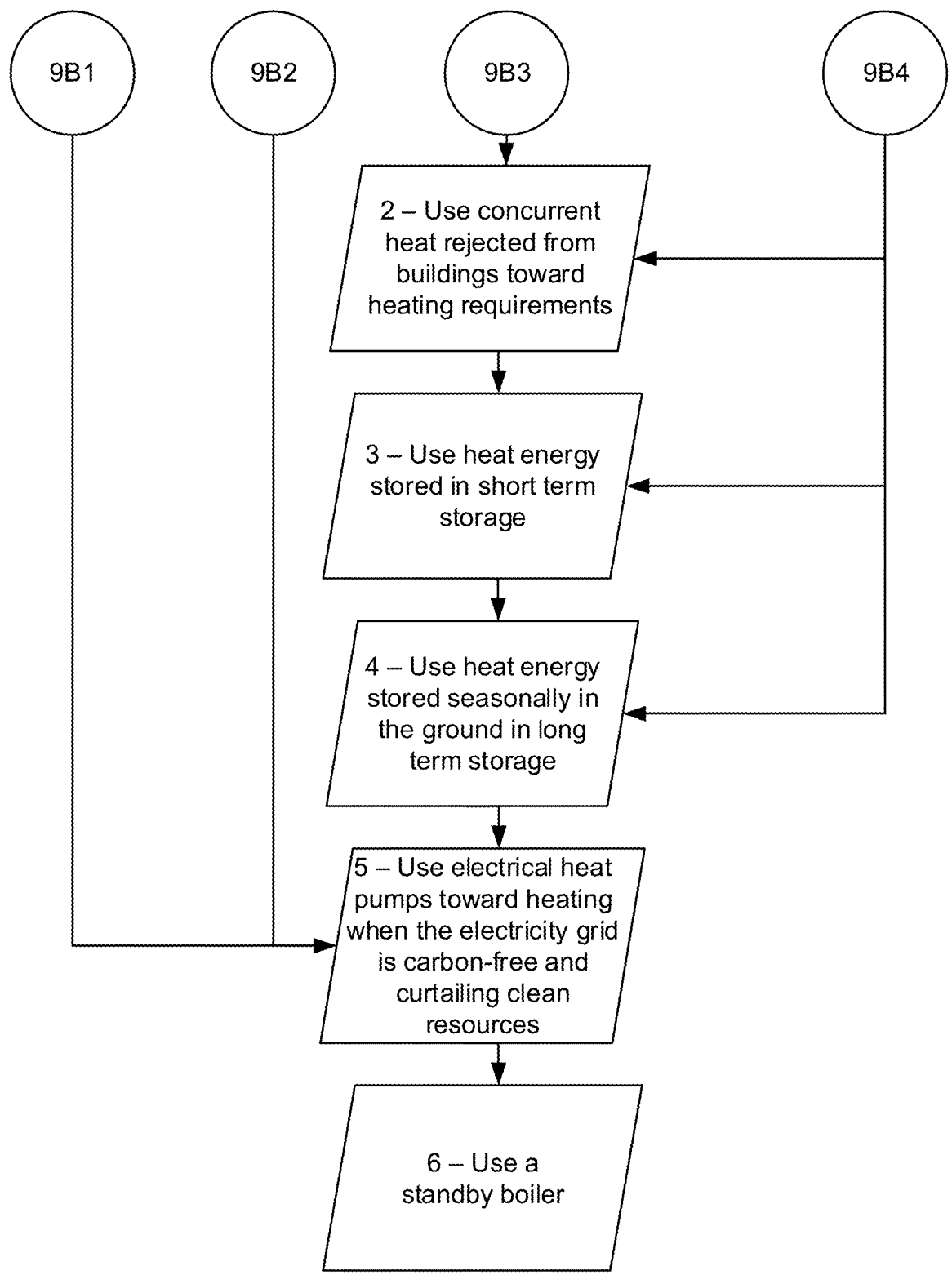

A predicted overall node load model can be defined from a combination of the predicted high-time-resolution heating, cooling and electricity demands of individual buildings. The predicted overall node load model can be defined to employ a weighted decision matrix that considers the different possible load mixes optimized different design and operation criteria. An example process for determining the district energy system operations based on a predicted overall node load is illustrated in FIGS. 9A-9B. The example process illustrated in FIGS. 9A-9B can allow the EMS 1000 to predict hourly operations of a district energy system 100 according to various operational criteria.

One example of an operational criterion is maximizing the simultaneous/concurrent energy harvesting by collecting the heat rejected from buildings and using it for heating other buildings in the node. The predicted overall node load model can be used to determine which individual buildings to connect via microgrids to form a node 102. This predicted overall node load model can also be used to accurately predict the high-resolution load profile of the potential node 102 that can, in turn, be used for equipment selection and sizing.

Selecting and Sizing a District Energy System

The selection and sizing of EMC and ETS equipment units can vary between districts given the many site constraints to consider and the large number of technology combinations and operational strategies. Example processes that can be used to select and size energy resource units is illustrated in FIGS. 5, 6, 7, 8 and 9.

The example processes illustrated in FIGS. 5-9 is defined with the primary operational criterion of minimizing GHG emissions, while also targeting secondary operational criteria, such as reducing peak electrical demand. The example processes illustrated in FIGS. 5-9 are described in the context of the electricity generation mix in the jurisdiction of Ontario. However, the methods shown there can be adapted to the energy generation context for districts in other jurisdictions and locales, such as locations where energy generation is primarily hydro-electric or locations where energy generation is primarily fossil fuel based. In addition, although the example processes illustrated in FIGS. 5-9 are described in the context of minimizing GHG emissions as the primary operational criterion, other criteria may be used as the primary operational criteria such as reducing peak demands, peak mitigation/demand management etc. This may be relevant for districts with low levels of GHG emissions and/or high rates of electrified heating.

In the examples illustrated, the primary operational criteria can be met by prioritizing utilization of carbon-free sources, such as heat recovery from existing processes and utilizing otherwise curtailed carbon-free electrical generation, over GHG emission emitting sources. As described above, an initial node identification process can be used to select the set of buildings to connect to a micro-thermal network. Subsequently, the node sizing process can be performed using both the electrical and thermal demand profiles of the buildings in the node.

The data defining the electrical and thermal demand profiles of the buildings in the node can either be obtained from predictive modeling for new buildings or consumption interval metering or from monthly bills for retrofit. As noted above, accurate disaggregation techniques may be deployed on the electrical consumption data to provide separate high-resolution plug load electrical demand and cooling electrical demand profiles. Similarly, natural gas consumption data may be disaggregated into space heating and domestic hot water (DHW) demand profiles.

Building information for individual buildings can be used to identify any process heating or cooling/refrigeration loads in the buildings. The COP of the cooling equipment can then be estimated. With a proper estimation of the coefficient of performance (COP) of the cooling equipment, both the cooling demand profile and the rate profile of the harvestable heat rejection can be calculated for a given building. Once all the demand profiles are identified, the node can be classified accordingly into three main node classification categories: heating dominant, cooling dominant and balanced depending on the ratio of the total annual heating to cooling energy requirements (FIG. 5). Within each category, the node can be sub-classified based on the occurrence of simultaneous heating and cooling demands into high concurrent and low concurrent harvesting. This reflects the potential of utilizing the heat rejected from the cooling process directly into the heat demand.

The minimum size of the EMC main thermal and electrical distribution header modules can be determined based on the peak thermal and electrical consumption of the load profile that will be met by the district energy system 100 at a node 102. The minimum size of the ETS for each building can be determined based on the peak thermal and electrical consumption of each building's load profile.

The thermal and electrical micro-grid configuration can be selected based on site constraints, building HVAC systems and in some cases owner priorities for a given node. For simplicity, the design process is described in relation to micro-thermal network distribution systems with operating temperatures that allow heat recovery between cooling and heating thermal networks when there is simultaneous heating and cooling demands (e.g. $4^{th}/5^{th}$ later generation thermal distribution networks), although similar processes may be followed for earlier generation thermal distribution networks. Harvesting otherwise rejected process cooling energy can be crucial in reducing GHG emissions.

The distribution equipment needed in the thermal and electrical modules (e.g. the EMC modules) can be determined based on the selection of the micro-grid configuration. For example, the size and number of the thermal distribution loop pumps and heat exchangers can be defined by the selected micro-thermal network configuration.

The size of heat recovery heat pumps (as well as the size of equipment needed to meet the remaining load not met by heat recovery) can be determined based on high resolution modelling of the cooling process heat recovery and harvestable process heat recovery for the node 102. The high-resolution modelling of the cooling process heat recovery and harvestable process heat recovery for the node 102 with high time resolution heating demand, the amount of instantaneous heating demand that can be met with instantaneous heat recovery can be determined. The real time electricity to drive the heat pumps necessary to instantaneously harvest this heat recovery can then be calculated. This electricity gets converted to heat and must be accounted for when comparing to the heating demand. The same data can be used to determine the site thermal energy harvesting that is possible beyond instantaneous matching, such as the site thermal energy harvesting that is possible with short- and long-term thermal storage.

For nodes employing on-site renewables, the generation output of those on-site renewables can be determined at a high time resolution. In some cases, however, site constraints, such as space available on site to install renewable generation, such as solar PV, and the economics of site renewable generation may limit the amount of renewable generation available on site. Nonetheless, site renewable generation can be considered when determining the remaining load profile for the node, as renewable generation can meet the load, reducing the need for other thermal or electrical sources to meet the load. Factors such as curtailment of site renewable generation, and reduction in behind-the-meter electrical demand for export-limited sites can also be determined at this stage.

Figure 6A:
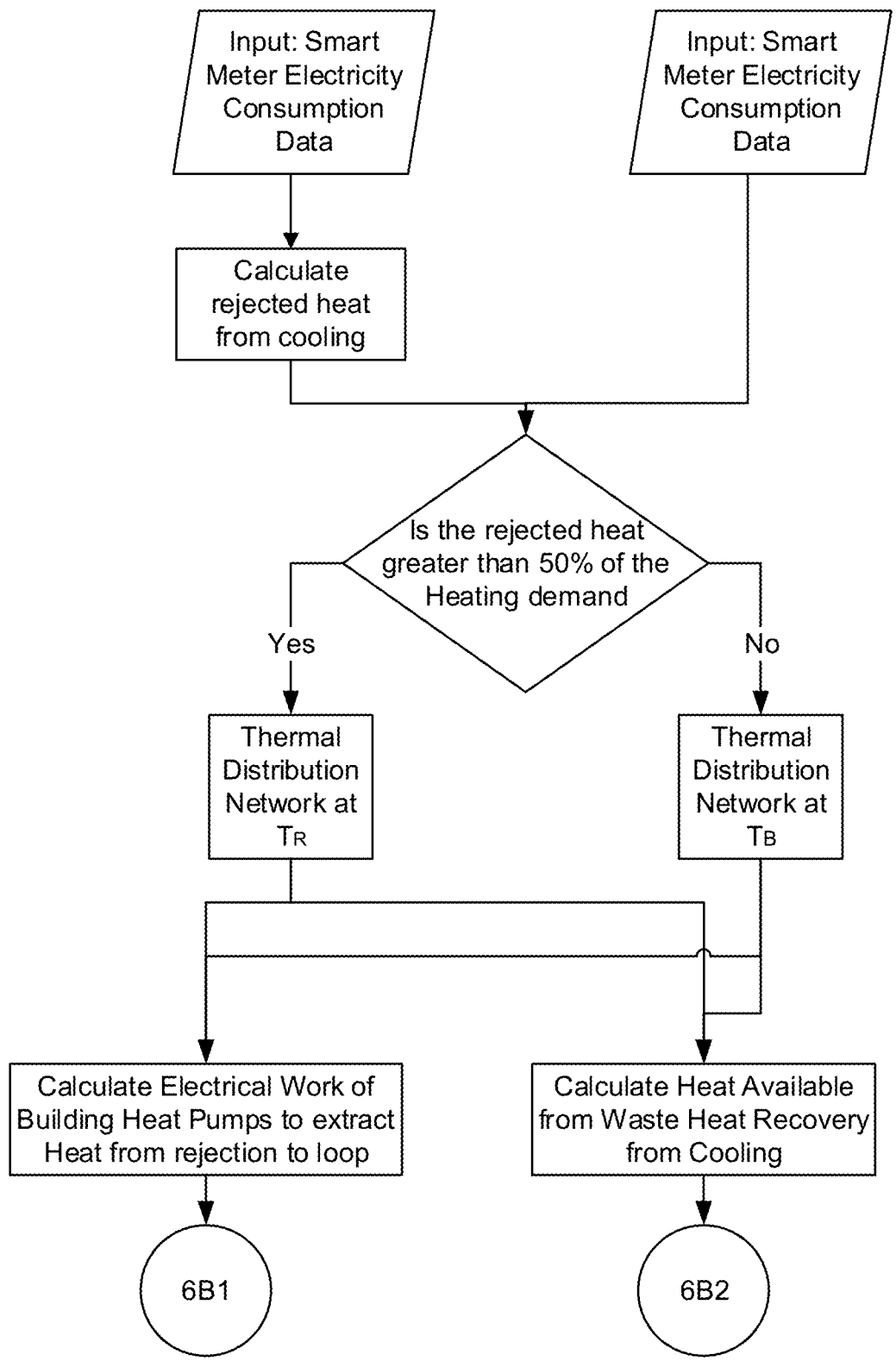
FIGS. 6A-6C show a flowchart of an example method for determining thermal network operating temperature and short-term and seasonal storage element characteristics that may be used for a district energy system such as the example district energy system of FIG. 1.
Figure 6B:
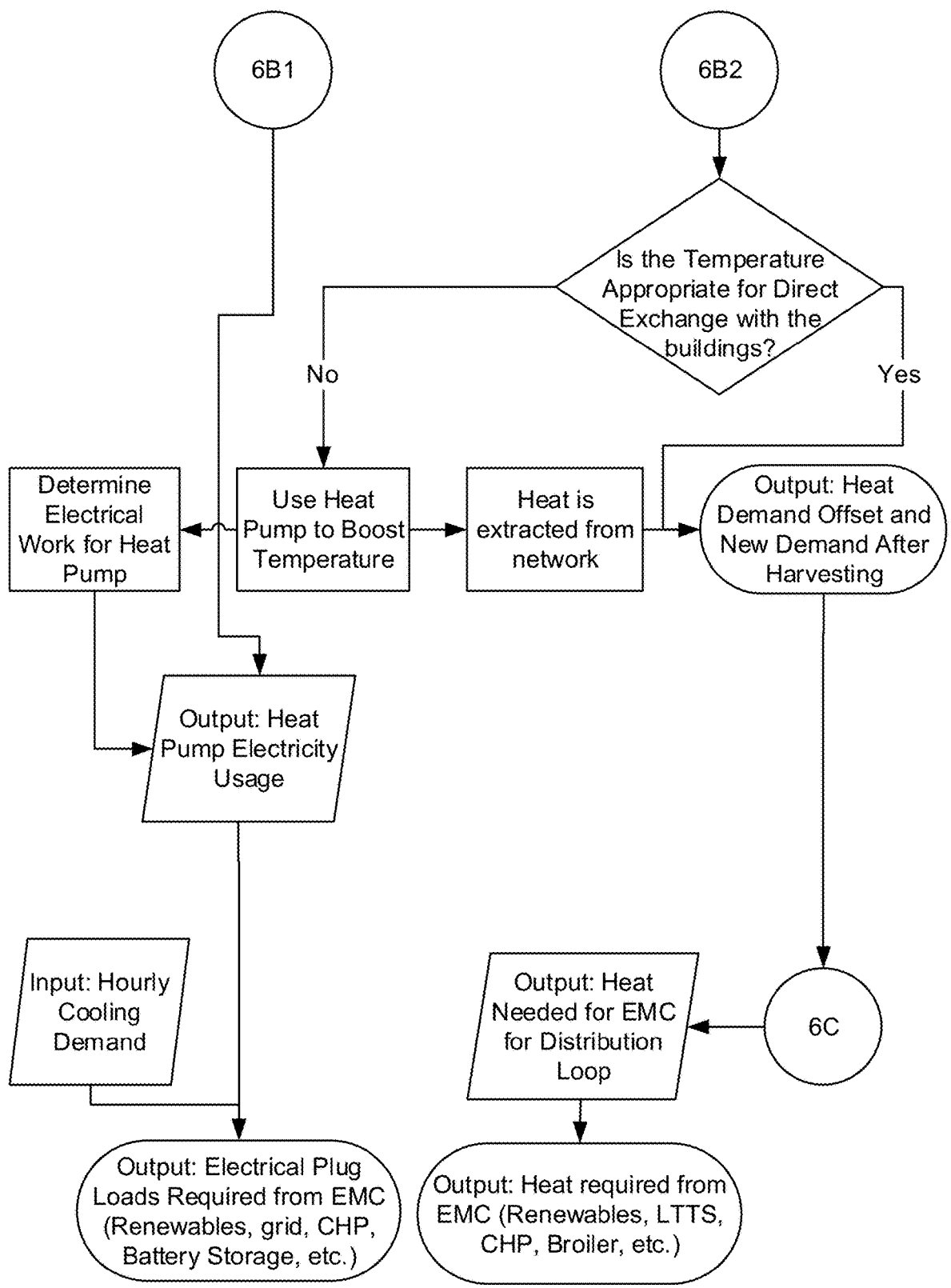
Figure 6C:
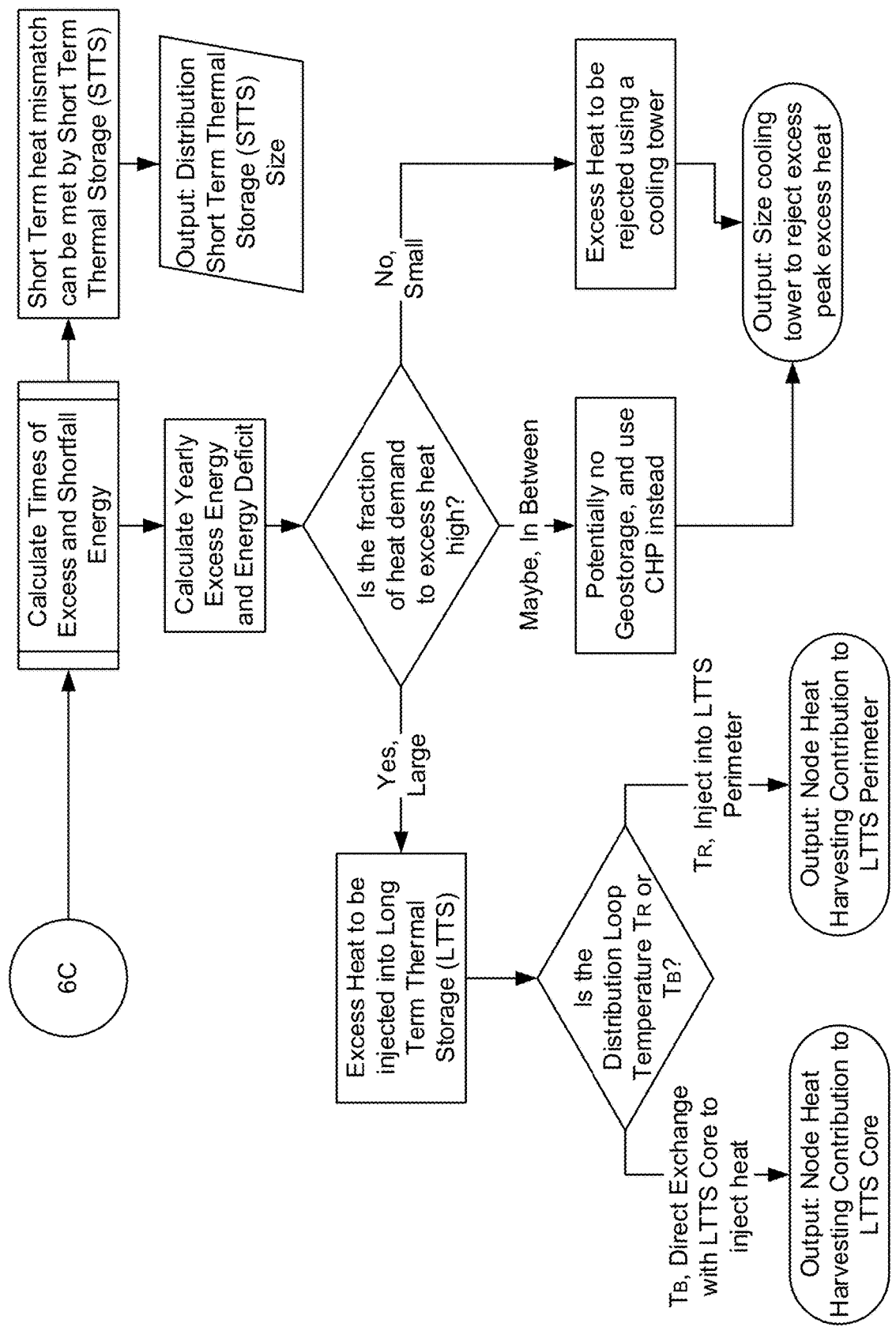
Figure 7A:
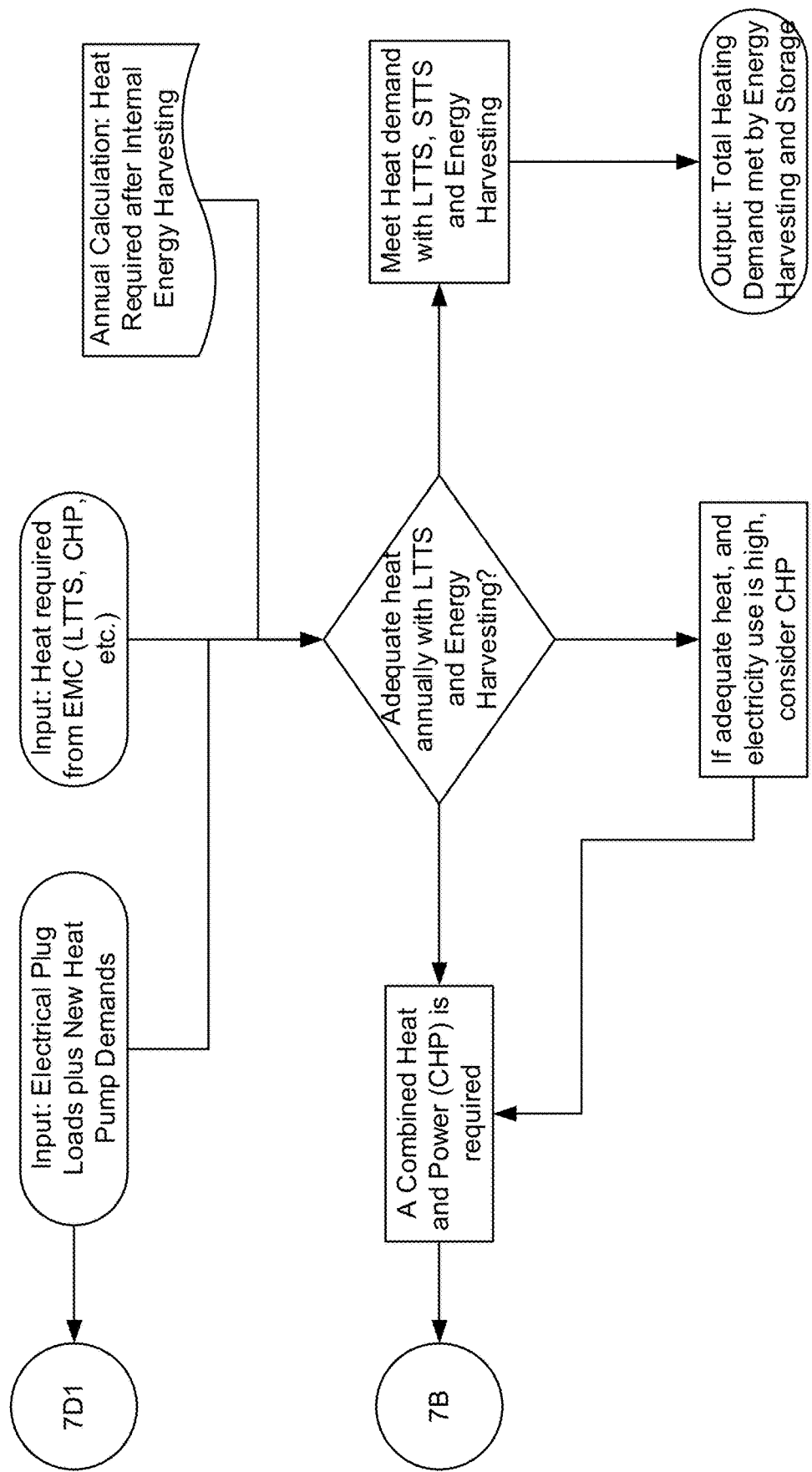
FIGS. 7A-7D show a flowchart of an example method for determining the type and size of energy provisioning elements in an example centralized energy management unit that may be used in a district energy system such as the example district energy system of FIG. 1.
Figure 7B:
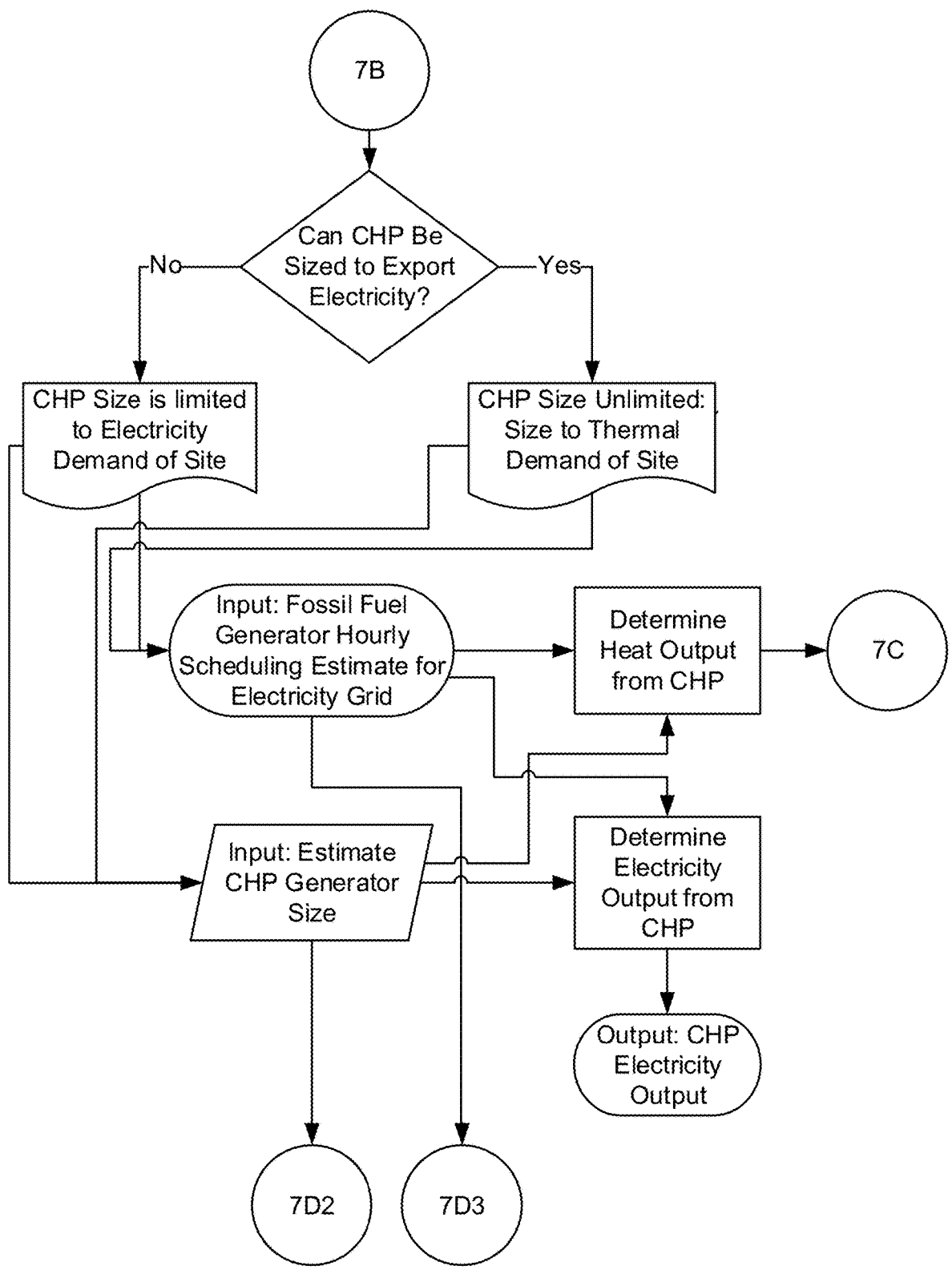
Figure 7C:
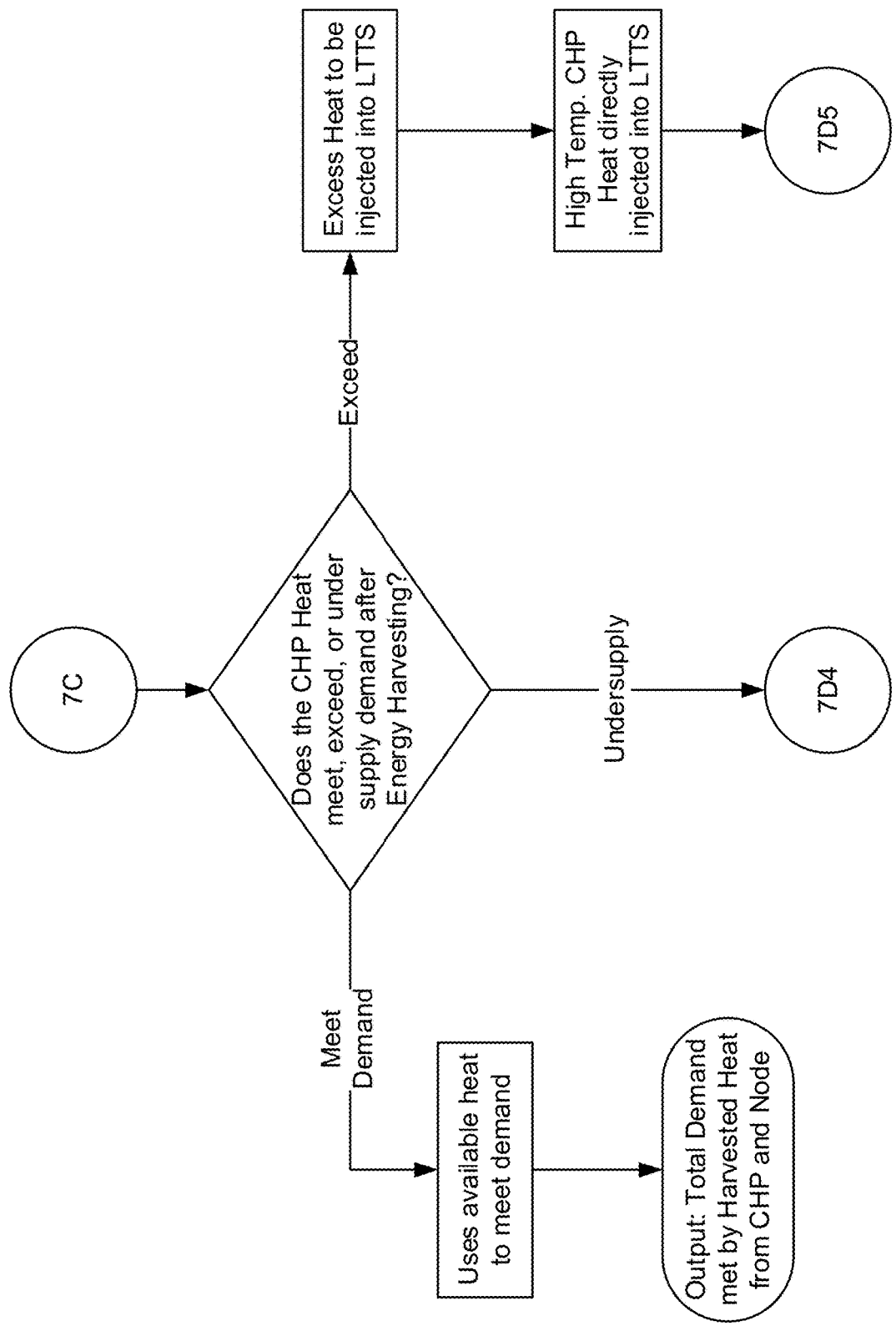
Figure 7D:
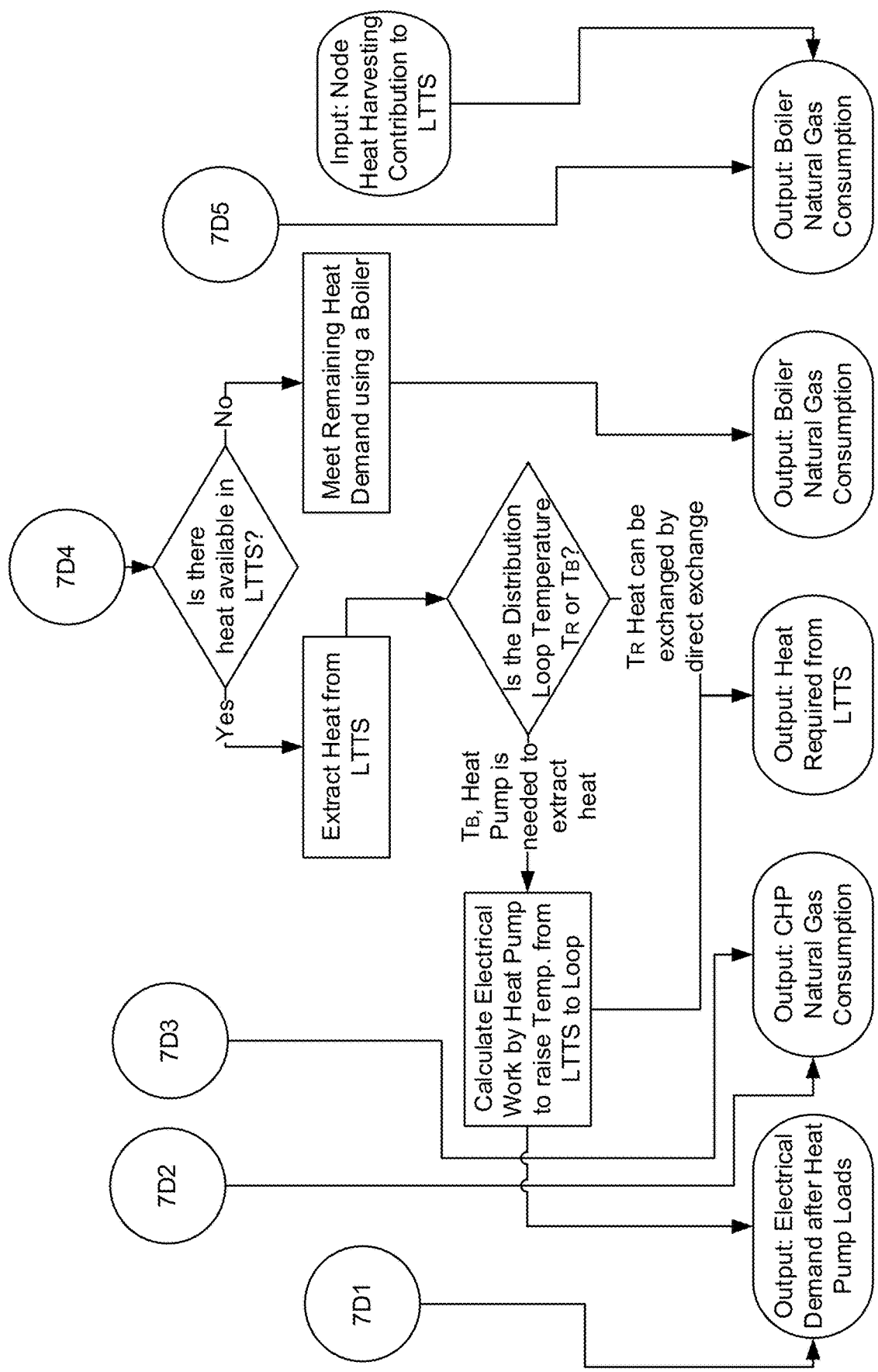
Figure 8A:
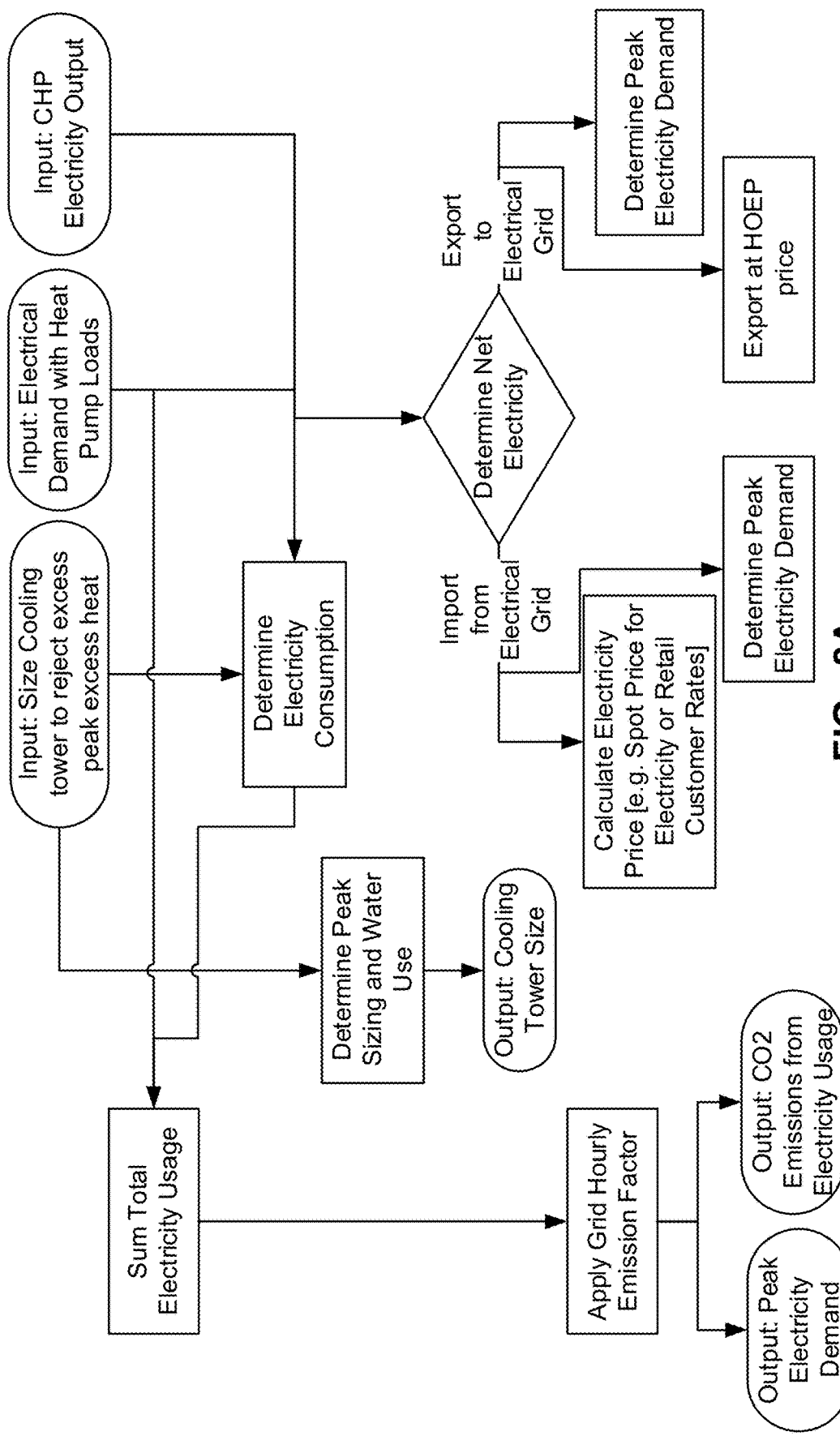
FIGS. 8A-8B show a flowchart of an example method for determining the total energy, cost and greenhouse gas (GHG) emissions for an example district energy system.
Figure 8B:
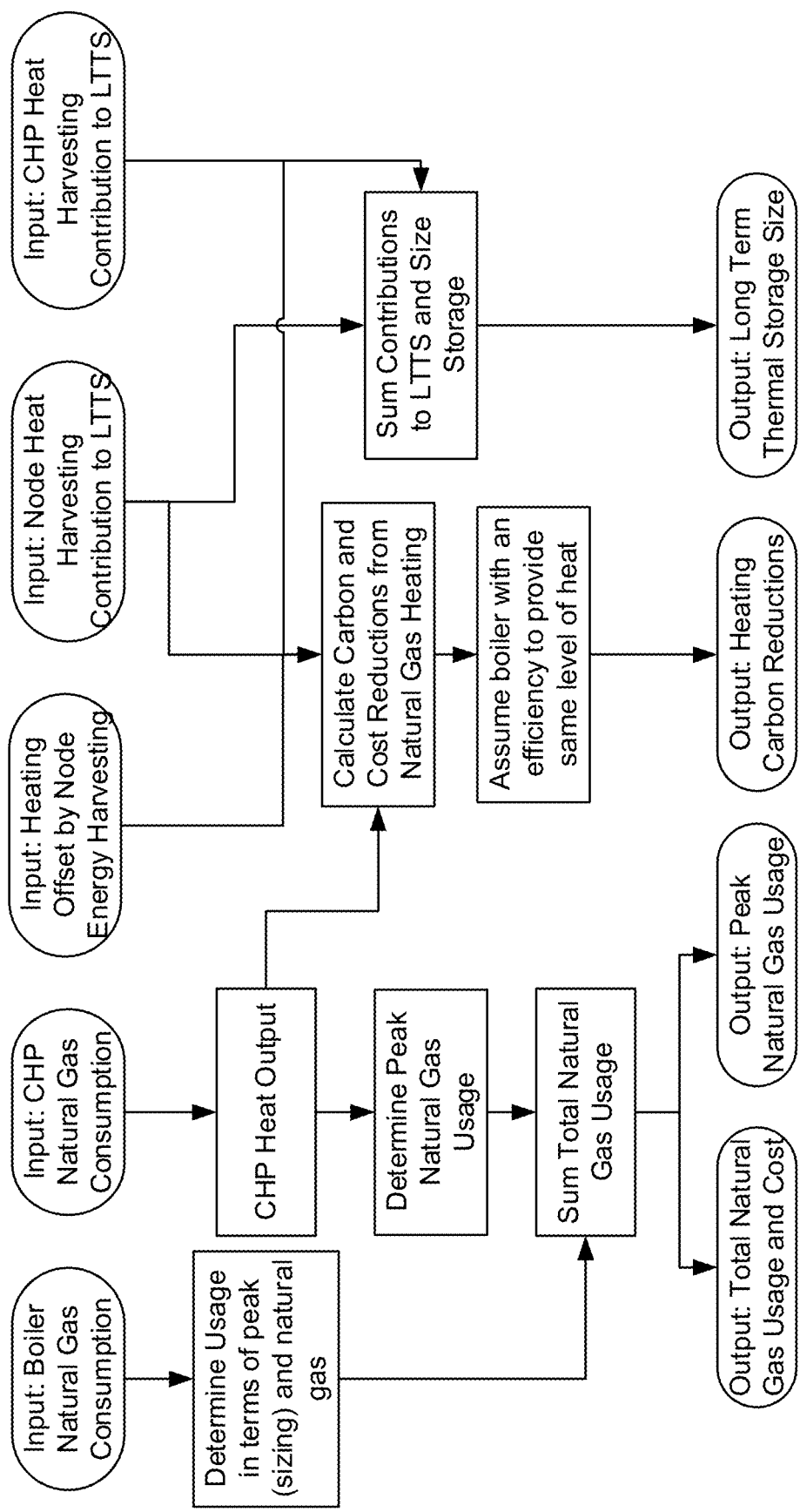

As noted above, the temperature of the micro-thermal network 108 may be adjustable within a district energy system 100. For instance, systems 100 using a 5GDHC thermal network to provide the micro-thermal network 108 may allow the operating temperature of the thermal network can be controlled to target specific operational criteria such as minimizing the GHG emissions of the system. FIG. 6 illustrates an example process for managing the thermal network operating temperature as well as short-term and seasonal storage elements within a district energy system 100.

The portion of the heating demand that can be covered by the harvested heat rejected from the cooling process can impact the operating temperature of the micro-thermal network, as the COP of heat pumps 220 at the ETS 120 is determined by the operating temperature. Thus, a high-resolution model of the operating temperature of a micro-thermal network may be required to determine the electrical load of heat pumps in ETS's as well as the thermal energy added or removed from the thermal network. When the harvested heat from the cooling processes exceeds or provides a large portion of the heating demand, the thermal network can be operated at low temperature to facilitate either direct heat transfer or higher heat pump COPs for cooling loads, reducing node electrical consumption. Contrarily, if the harvested heat covers a smaller portion, and the heat source in the EMC can provide the majority of the heating demand at a higher temperature, then the operating temperature of the network can be set at a higher value. This enables minimum loss of exergy at the EMC, promotes direct heat exchange or increased COP of the heat pumps with the heated buildings, and reduces node electrical consumption. With the operating temperature of the micro-thermal network accounted for, electrical consumption of heat pumps can be determined as well as thermal energy required from the EMC to maintain the thermal network operating temperature.

At this stage, short-term thermal storage can play a crucial role in bridging the time mismatch between the availability of harvested heat from the cooling processes in the node and the heating demands. Short-term thermal storage can be sized to store the harvested heat over a time period of 1 hour up to a few days to satisfy a portion of the heating demand. The real time electricity to drive heat pumps necessary to harvest this heat recovery can then be determined, as this electricity gets converted to heat and must be accounted for when comparing to the heating demand short-term thermal storage will meet. Thermal efficiency of short-term thermal storage can also be determined at this stage.

Where there is sufficient potential harvested heat remaining that cannot be utilized instantaneously or through short-term thermal storage into the heating demand, long-term thermal storage elements can be used to store the excess heat over longer time periods (i.e. few months). Depending on the operating temperature of the network and the long-term thermal storage reservoir, the harvested energy can be stored directly into the seasonal storage or a heat pump may be used to lift the temperature of the network to the storage temperature level. The sizing, design, zoning, charge and discharge strategy of the seasonal storage can be defined to minimize the losses, thus maintaining high storage efficiency. Zoning strategies should also be considered, e.g. where a geothermal field can be split into a high-temperature core, acting as a storage zone, surrounded by a low-temperature shell acting as an insulation region. Such an insulation region can be charged with the heat rejected from cooling processes, thus reducing the heat losses from the storage zone into the far field. Thermally stratified long term thermal storage can cost effectively maintain the highest exergy of thermal storage and minimize the need to operate heat pumps to boost the energy quality later. This can help further reduce peak demands. The amount of thermal energy that can be supplied by the seasonal storage elements can be determined based on predicted storage efficiency. A predicted available supply temperature can be used to determine the COP of heat pumps, which will in turn impact the electrical consumption of the node. Since losses increase with smaller size, the remainder of the harvested heat that is too small to be effectively stored when directed into seasonal storage can be used in a cooling tower sized to reject the heat into the atmosphere.

CHP Selection

FIG. 7 illustrates an example process for selecting a CHP 210 for a district energy system 100. In general, the CHP selection process can be performed once all the internal harvesting within a node has been determined and the electrical demand added due to the operation of heat pumps (for harvesting and/or heating) has been determined. The CHP can then be selected based on the remaining heat demand and the added electrical demand.

The description below relates to the selection of a fossil fuel fired CHP, although alternate forms of CHPs may be used with appropriate modifications to the design process described. To minimize GHG emissions the CHP can be configured to operate as a marginal generator displacing less efficient fossil fuel fired generation, and having the recovered heat displace fossil fuel fired heating. The ratio of the remaining node thermal to electrical demand can be used to determine the optimal sizing the CHP. If the electrical demand is much larger than the heating demand, and the CHP is sized for the node's peak electrical demand, the CHP heat generated may be so large that it is larger than the heat demand, resulting in the need for heat to be wasted through rejection to the atmosphere. This would not reduce GHG emissions. Accordingly, where the remaining node electrical demand is much larger than the thermal demand, the CHP can be sized to the thermal demand to ensure all the CHP heat generated is usefully used, which reduces GHG emissions.

Where the remaining node electrical demand is much smaller than the thermal demand, if the CHP is sized for the node's peak electrical demand, the CHP heat generated is always below the heat demand, so all CHP heat can be usefully utilized, reducing GHG emissions. If the CHP is sized for peak heating demand in this case where remaining node electrical demand is much smaller than the thermal demand, there may be times that the CHP electrical generation exceeds the nodes electrical demand. In this case, surplus electricity generation from the CHP can either be exported—if permitted—to the electrical grid, stored in electric batteries, or converted via a heat pump into thermal energy.

In all cases when the CHP produces surplus thermal generation above the instantaneous thermal demand, other thermal technologies can be used to ensure the surplus thermal generation from the CHP is utilized and not wasted, to ensure GHG emissions are reduced. Thermal technologies such as Absorption Chillers, Short-term Thermal Storage and Long-term Seasonal Thermal Storage can use surplus thermal generation from the CHPs. The sizing of the CHP will depend on these other technologies, so an optimization process can be used to size these technologies simultaneously as they are interdependent.

As noted above, in this example the CHP is operating as a marginal generator displacing less efficient fossil fuel fired generation. Accordingly, the CHP can be shut off during periods when no fossil fuel generation is running, such as times when there is excess carbon-free generation being curtailed.

Harvested heat from cooling processes may not be considered totally carbon-free depending on whether the increased electrical demand for the associated heat recovery heat pump operation results in an increase in fossil fuel fired marginal generators, which occurs primarily during peak demand periods. The system 100 can be configured to prioritize the use of harvested heat rejection from the cooling processes in the node for concurrent and semi-concurrent (through short-term storage) heating and cooling demand. Long-term storage of the surplus harvested cooling process heat is less likely to be useful in minimizing GHG emissions due to the associated increase of the electrical demand in the lift heat pumps as well as the lower efficiency of some seasonal storage technologies.

By contrast, the high-grade heat generated in the CHP can be stored seasonally during the low-heat-demand seasons (i.e. summer and shoulder) to satisfy peak heating demand periods in other seasons (i.e. winter). Accordingly, the size of the CHP generation and the seasonal storage can also be performed simultaneously.

The use of harvested and stored energy can be determined before the sizing of back-up sources. On the thermal side, the load that can be met by discharging the short- and long-term thermal storage can be determined. Additionally, the electricity consumed to run heat pumps when the CHP is off during periods when there would otherwise be curtailed carbon-free generation can be determined, as well as how much thermal demand can be met at this time from heat pumps using geothermal or the atmosphere as thermal reservoir. Electrical battery storage of otherwise curtailed carbon-free generation along with when it is discharged during peaks can also be determined at this stage.

A detailed accounting of the electrical and thermal demands of the node 102 can specify the unmet electrical demand needed from the grid, the remaining heat demand needed from a back-up heat source (e.g. boiler) and the excess heat rejected from cooling processes that require a cooling tower to dispose of.

The design of a district energy system may be more complex when using a lower temperature micro-thermal network such as a 5GDHC network. In some cases, the operation of the CHP unit may be more complex, and system 100 can be configured to include harvesting low-grade waste heat, distributed short-term thermal storage, seasonal thermal storage, an absorption chiller and heat pumps, at both the centralized Energy Management Center (EMC) and at each individual building within the system.

GHG Emissions Factor

The goal of minimizing GHG emissions requires the consideration of the GHG emission factor of the electricity grid. As such, any electricity consumed during peak operating hours in which fossil fuel fired sources are generating electricity will have the attributed GHG emissions associated with it. FIG. 14b shows an example plot of how the hourly GHG emission factor can vary based on natural gas generation each hour for a given regional electrical grid. The design and operation processes described herein can use machine learning and historical data to predict a region's hourly GHG emission factor.

GHG emissions reductions of a district energy system can be determined by comparison between an example district energy system 100 and a conventional status quo system, both using the same initial load profile used for the node 102. Assuming the status quo case with a dedicated natural gas boiler and electric chiller for each individual building, the GHG emissions of the status quo can be attributed to the natural gas consumption at the boiler and the electric consumption at the chiller. For the GHG emissions from the electrical consumption, the hourly-average grid emission factor can be used. The estimated GHG emissions of the district energy system 100 can be determined as the sum of:

The GHG emissions from the new total electrical consumption (including the heat pumps, electric chillers, hydraulic pumps, cooling towers) of the node 102 calculated using the hourly-average grid emission factor. In this example, the CHP electrical generation may not be subtracted from the total electrical consumption of the node because the CHP is assumed to operate as a marginal generator displacing less efficient fossil fuel fired generation. Since the electrical generation on the grid is coming from a fossil fuel source when the CHP runs, it does not change hourly-average grid emission factor.

The GHG emissions from the fossil fuel consumption of equipment other than the CHP (expected to be primarily a back-up boiler). In this example, the fossil fuel consumption of the CHP may not be included because the CHP is assumed to operate as a marginal generator displacing less efficient fossil fuel fired generation in this example. Thus, the GHG emissions are already accounted for in the hourly-average grid emission factor. As such, the heat recovery from the CHP is then considered a carbon-free source of thermal energy at the node 102, just like heat recovery from other processes in the node would be.

After district energy system design has been optimized for a given criterion (e.g. minimizing GHG emissions at a regional grid level), the design for the initial criterion can be compared to additional design criterion, such as managing peak electrical demand and capacity to provide energy services in island mode. If additional design criteria are not met by the design for the initial criterion, technology selection, equipment size and operational strategies can be changed, and the analysis redone to determine the impacts of meeting the different operational criteria. Multi-objective function techniques can be used with priority weightings to find solutions that provide a specified performance or the largest value out of the fewest and smallest equipment combinations. Due to the highly integrated nature of the district energy systems described herein, small changes such as changing an individual equipment size or operational strategies can have a small impact on one design criterion, while having a major impact on another criterion.

Embodiments of the district energy systems 100 described herein may provide several benefits over existing energy systems. For example, many jurisdictions have targets to be carbon emission neutral by 2050 or earlier. To achieve this, fossil fuel consumption needs to stop in all sectors including transportation, electricity generation, and thermal generation. This requires a change in energy infrastructure to replace fossil fuel-based infrastructure with carbon-free infrastructure, which is often one of the costly barriers to achieving carbon emission neutral targets. The flexibility of the district energy systems described herein allow such systems to be installed initially with fossil fuel-based sources but can use carbon-free sources in the future with no changes to the system infrastructure besides the change in the energy source technology. District energy systems 100 can achieve these advantages through various features and processes, such as harvesting waste heat from cooling processes, which is a carbon-free source of thermal energy, harvesting otherwise curtailed carbon-free electricity generation, and then harvesting waste heat from electrical generation with CHP's.

In some examples, CHP systems may be fossil fuel driven, such as by Natural Gas, Petroleum and Coal. Additionally, CHP systems can be driven by carbon neutral sources such as Bio Natural Gas, Ethanol, Garbage Incineration, Biomass, etc. Finally, CHP systems can be driven by carbon-free sources such as Small Modular Nuclear Reactors and Hydrogen generated from renewable electricity powered electrolysis, etc. By using electricity from carbon-free sources on the electrical grid, and using either carbon neutral or carbon-free sources in the CHP, district energy systems 100 as described herein can be carbon emission free with no changes to the base infrastructure.

District energy systems 100 as described herein may enable an all-renewable electrical grid level generation mix. All renewable generation mixes tend to have large amounts of curtailment of renewable electricity generation. This is due to low-capacity factors and non-dispatchability of renewable sources such as solar, wind and run-of-river-hydro, which can have excess electricity production on sunny and windy days after a large rain fall. On days that are cloudy, calm, with little prior rain, or short winter days, there can be a short fall of renewable generation requiring demand response to reduce load to match limited renewable generation. Without a CHP, through storage technologies alone (seasonal storage, short-term storage, and electrical storage) the district energy systems 100 described herein can be configured to harvest/capture otherwise curtailed renewable sources (through storage elements adding demand when generation is available) and discharge this harvesting energy to reduce peak demand at times when renewable generation sources are limited.

Small Modular Nuclear Reactors can be used to provide a carbon-free CHP technology in district energy systems 100. Nuclear reactors can generate heat which is used to create steam to drive a steam turbine. Any steam turbine cycle needs to reject low grade thermal heat through a condenser. The lower the condenser temperature, the higher the steam turbine efficiency, resulting in this heat typically being rejected to the atmosphere unutilized. By combining the CHP with a low-temperature thermal network as the micro-grid 108, when a SMNR is connected, this steam turbine cycle condenser heat can be used for direct heating or stored seasonally.

While nuclear reactors are not typically used as peaking electrical generators (because the nuclear reaction does not ramp up and down quickly) the connection to a district energy system 100 provides more flexibility. Currently, nuclear reactors provide peaking capacity by operating the nuclear reaction at near full capacity during low demand periods and bypassing the steam turbine and rejecting the generated heat directly to the atmosphere, without generating electricity, as a means to cool the reactor. Thus, the high-quality energy from the nuclear reactor is wasted, resulting in low to no efficiency at these low demand periods. By contrast, when used in a district energy system 100 that includes thermal storage and/or an absorption chiller, this high-quality thermal energy from the nuclear reactor during periods of low electrical demand can be effectively utilized or stored without being wasted. Therefore, the district energy systems 100 described herein can improve SMNR's total efficiency both during peak and off-peak periods by harvesting currently wasted heat.

As described above, the equipment selection, sizing and operation for a district energy system 100 can be optimized to provide responsive generation and loads to maximize utilization of carbon-free sources before utilizing fossil fuel sources. As such, the district energy systems 100 described herein compliment the construction of renewable generation sources. Through storage and transient control of energy resources used to meet site loads, the district energy systems 100 described herein can add loads at times of low demand and excess renewable generation to avoid curtailment of renewable sources. System loads can then be removed at time of high demand and reduced renewable generation, to reduce the need for standby generation needed to firm variable renewable generation. This operation extends beyond conventional Renewable Firming, by adding dispatchable loads during periods that otherwise would lead to curtailment of renewables, increasing the useful capacity factor of renewable generation. In this way, the district energy systems 100 described herein enable a higher penetration rate of renewable generation sources before grid stability problems become a challenge to grid operators.

The high-resolution energy demands of different high intensified energy buildings tends to reflect a high correlation between when building electricity demands are low and when carbon-free generation sources are curtailed to balance the electrical grid. The design and operation methodologies described herein can maximize the utilization of carbon-free electrical generation sources by providing prediction tools for curtailment time periods, e.g. based on the plots shown in FIGS. 14A-14C and implementing demand management strategies.

The district energy systems 100 described herein can also improve on Smart Grid concepts by going beyond electrical micro-grids and smart electrical grid infrastructure to seamlessly couple electrical micro-grids with micro-thermal networks and smart thermal grid infrastructure. The district energy systems 100 can provide additional stacked benefits than electrical micro-grids or virtual power plants. However, the design and operation of the district energy systems 100 described herein is on GHG reductions, which innately provides some benefits and ancillary services, while reducing the potential for other benefits and ancillary services. Intrinsic benefit that come from targeting GHG reductions are the example of using storage in the district energy systems 100 described herein to add load during carbon-free generation curtailment to reduce the following day's peak electrical demand. This presents a form of arbitrage which also provides renewable generation firming. Operating natural gas fired CHPs only when they displace centralized fossil fuel fired peaking generation with no heat recovery, displaces these less efficient generators, and provides peaking capacity to balance grid supply and demand. A limited benefit from focusing on targeting GHG reductions is voltage and frequency regulation, which can be provided by ramping up and down a CHP's output, however from an engine efficiency and thus GHG perspective it may be better to run CHP consistently at optimum design point rather than vary their output (although this may not always be the case where overall system efficiency is considered). Other system equipment, such as electrical storage, EV chargers and heat pumps are more suited to providing voltage and frequency regulation as constantly varying their output does not impact GHG emissions. Spinning reserve can be provided by all the system's dispatchable generation and loads, however being on standby and not turning on the CHP or initiating the demand response of heat pumps until an activation signal is received from an Independent Electricity Systems Operator (IESO) misses out on the opportunity to displace a centralized fossil fuel fired peaking generation.

The challenge of which ancillary services to provide, is typically an optimization analysis of revenue versus cost versus impact to provide such ancillary services. While district energy systems 100 described herein can be optimized for economic gain, the guiding principle of district energy systems 100 described herein is typically to meet site loads, while minimizing GHG emissions by controlling generation and loads for the benefit of the electrical grid. Thus, district energy systems 100 described herein are designed and configured to benefit the entire electrical grid, and the selection of which ancillary services to provide can be done with the goal of minimizing deviations from the operation which gives the lowest grid-wide GHG emissions. Examples of ancillary services that can be provided by district energy systems 100 described herein with minimal deviations from optimal GHG reduction are non-wired solutions, black start capabilities, reactive power compensation, etc. One example is to locally generate with the CHP and reduce heat pump demand by discharging thermal storage at peak demand times to displace a centralized fossil fuel fired peaking generation, and provide non-wired solutions, which avoid needing new transmission and distribution infrastructure to go from centralized generation to the load, reducing capital investment costs. CHP's and electrical battery storage can provide black start capabilities to reenergize the electrical grid after a grid power failure. Advanced smart inverters on system generators and Variable Frequency Drives (VFDs) on heat pumps and fluid pumps can provide reactive power compensation during periods when they are not operating at peak capacity.

Due to the distributed nature within electrical distribution systems, district energy systems 100 described herein may provide ideal Distributed Energy Resources (DER) for not just grid-wide Independent System Operators to control, but also local Distribution System Operators as well. The district energy systems 100 described herein can provide ancillary services to address local distribution feeder challenges. Services unique to distribution systems include non-wired alternatives to new distribution system expansion. Rather than building new substation and distribution lines, ICE-Harvest generation may be contracted to be on call to provide generation at the Distribution System Operators request during local distribution feeder peaks. Additionally, ICE-Harvest system demand response capabilities could be used for balancing and firming uncontrolled solar PV generation, which at high penetrations at solar noon can cause voltage stability issues on specific distribution feeders when clouds pass by quickly varying the generation from solar PV.

As shown, ICE-Harvest systems have multiple heating, cooling and electrical generation equipment. To increase reliability, often energy systems have N+1 redundancy of the same equipment, so that if one equipment unit fails, there is a back-up equipment to ensure all or partial/critical energy services are met and there is no/limited loss in occupant functionality. Since the district energy systems 100 described herein can include multiple energy resources for heating, cooling and electrical generation, there is often greater than N+1 redundancy if one equipment unit fails. Heating for example can come from various energy provisioning elements such as cooling process heat rejection, a CHP, short-team thermal storage, long-term thermal storage, and/or a heat pump. Electricity can come from the electrical grid, a CHP, an electrical battery, on-site renewable generation, and/or bi-directional EV charging. While it is unlikely any single one of these equipment unit's capacity would be sized to the site peak demand, added together their capacity would typically exceed the site peak demand. If any one of the equipment units failed, the other units could be used to meet the required thermal and electrical demands with minimal to no impact to occupant functionality until the failed equipment unit is repaired or replaced. In addition to the N+1 redundancy on site, as explained above the EMC 110 can include exterior connection points for mobile back-up units to quickly connect and seamlessly integrate into the operations of an EMC, providing further redundancy in case of equipment failure.

As noted above, the EMC 110 can be designed with standardized sizing. Some examples of standard EMC sizes that can be provided in one or more portable shipping containers include 250 kWe/330 gpm, 500 kWe/660 gpm, and 1,000 kWe/1,320 gpm. Some examples of standard Energy Transfer Stations (ETS) sizes that can be provided in modular skid units are 20 Ton/50 gpm, 50 Ton/125 gpm, 100 Ton/250 gpm and 300 Ton/750 gpm. These are examples but specific sizes may vary depending on peak electrical and thermal demands of the ICE-Harvest node. The use of standardized sizes can provide several advantages, such as

- Economies of scale from mass production can reduce costs dramatically. Hybrid transportation vehicles (passenger cars and highway transport trucks) can produce the same amount of electricity, heating and cooling of what a similarly sized EMC can do, but hybrid vehicles currently have a capital cost less than ⅕ of an EMC due to economies of scale and can safely drive on roads.
- If 750 kWe needed or 1,500 kWe needed, it may be more cost effective to use a 250 kWe+500 kWe=750 kWe or 500 kWe+1,000 kWe=1,500 kWe than producing a larger size variety of EMC sizes with lower production volume each.
- Engineering design time can be reduced by selecting standard pre-engineered solution for variety of site conditions.
- Portable sizing allows for quick replacement of an EMC or equipment modules at end of life or if node load profile changes.

However, there are also challenges associated with standardized sizing of EMCs 110. For standard EMC sizes to be commercially effective, they must be flexible enough to meet a variety of site load conditions. However, as noted above, the EMC 110 can be designed to enable a high degree of flexible operation for various site constraints.

In a first example implementation scenario, an EMC 110 may be optimized for annual energy:
Scenario 1: A 600 kWe EMC would seem to be more optimal for an annual heating thermal energy perspective, however
- The EMC can provide flexibility in the annual capacity of individual technologies
  - For example, a standard 500 kWe EMC can be configured to operate with increased run hours, to move from a standard 50% capacity factor to a 60% capacity factor to meet annual heating thermal load
- The EMC can provide flexibility from switching between technologies
  - For example, a standard 500 kWe EMC can be configured to use additional otherwise curtailed surplus baseload electricity generation, e.g. by increasing run hours on a heat pump to store more thermal energy in spring, summer and fall for the winter heating season
- The EMC can provide sizing flexibility in energy storage technologies
  - For example, a standard 500 kWe EMC can be configured to increase the size of a local site geothermal seasonal storage to reduce losses and accommodate larger seasonal thermal storage requirements In a second example implementation scenario, an EMC 110 may be optimized for peak power:
Scenario 2: a 600 kWe EMC would seem to be more optimal for resilient islanded microgrid peak electrical demand case, however
- The EMC can provide flexibility from controlling the operation of energy resources
  - For example, a standard 500 kWe EMC can be configured to control electrical battery operation to meet peak demand rather than annual energy optimization. The EMC can be configured to provide demand response where site heat pumps are shut off to reduce peak demand from 600 kWe to 500 kWe. The EMC can also be configured to control site electric vehicle charging as a demand response to reduce peak demand.

For the case where a combination of standard EMC sizes are used, such as 250 kWe+500 kWe used together to meet a 750 kWe load, the thermal and electrical microgrid design described here in allows these standard EMC sizes to be connected seamlessly, with no additional engineering needed to be done. The EMS 1000 can be configured to automatically coordinate the operation of multiple standard EMC units connected, with no additional control programing required. This enables simple design and selection of EMC units, with no concerns of integration issues.

I. Definitions

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The term "and/of" as used herein means that the listed items are present, or used, individually or in combination. In effect, this term means that "at least one of" or "one or more" of the listed items is used or present.

While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

The invention claimed is:

1. A district energy system for a district comprising a plurality of buildings, each building having an associated heating, ventilation, and air conditioning (HVAC) system and associated electrical loads, the district energy system comprising:
(a) a central energy management unit comprising:
   i) at least one energy provisioning unit, the at least one energy provisioning unit including at least one thermal storage element, each thermal storage element configured to store thermal energy; and
   ii) an energy management controller;
(b) a district thermal distribution network thermally coupled to the central energy management unit and thereby the at least one energy provisioning unit, the district thermal distribution network comprising at least one fluid conduit, each fluid conduit transporting a heat transfer fluid, the district thermal distribution network comprising a plurality of external thermal coupling interfaces, each external thermal coupling interface connectable to the associated HVAC system of one of the buildings in the plurality of buildings within the district, wherein the district thermal distribution network is operable to transfer thermal energy between the central energy management unit and each external thermal coupling interface using the heat transfer fluid;
(c) a district electrical distribution network electrically coupled to the central energy management unit, the district electrical distribution network comprising a plurality of external electrical coupling interfaces, each external electrical coupling interface connectable to one of the buildings in the plurality of buildings within the district, wherein the district electrical distribution network is operable to transfer electrical energy between the central energy management unit and each external electrical coupling interface;
wherein
the energy management controller is configured to:
   determine a district thermal energy demand and a district electrical energy demand for the plurality of buildings based on a thermal demand of the HVAC system of each building and associated electrical loads of each building;
   determine a district electricity supply state of the central energy management unit;
   determine a district operational energy state based on the district thermal energy demand, district electrical energy demand, and the district energy supply state; and
   adjust the operation of the at least one energy provisioning unit and/or the thermal coupling between the district thermal distribution network and the at least one energy provisioning unit based on the district operational energy state such that a set of energy provisioning units coupled with the central energy management unit and the plurality of external thermal coupling interfaces using the thermal distribution network is responsive to the district operational energy state.

2. The district energy system of claim 1, wherein
(a) the at least one energy provisioning unit comprises a combined heat and power generation unit;
(b) the combined heat and power generation unit is thermally coupled to the at least one thermal storage element and to the thermal distribution network; and
(c) the energy management controller is configured to operate the central energy management unit to perform at least one of:
   i) storing excess thermal energy generated by the combined heat and power generation unit using the at least one thermal storage element; and/or
   ii) directing at least some of the excess thermal energy to the plurality of external thermal coupling interfaces using the thermal distribution network.

3. The district energy system of claim 1, wherein
(a) the at least one energy provisioning unit comprises a bidirectional heat pump;
(b) the bidirectional heat pump is thermally coupled to the at least one thermal storage element and to the thermal distribution network; and
(c) the energy management controller is configured to:
   i) operate the bidirectional heat pump using electricity from the central energy management unit to generate heat pump thermal energy; and
   ii) operate the central energy management unit to perform at least one of:
      (1) storing the heat pump thermal energy using the at least one thermal storage element; and/or
      (2) directing at least some of the heat pump thermal energy to the plurality of external thermal coupling interfaces using the thermal distribution network.

4. The district energy system of claim 1, wherein the at least one energy provisioning unit comprises at least one bidirectional heat pump and the energy management controller is configured to:
(a) determine that the district operational energy state is an excess carbon-free electricity supply state by determining that the district energy supply state represents an excess supply of electricity from carbon-free energy sources that exceeds the district electrical energy demand;
(b) operate the at least one bidirectional heat pump using at least some of the excess supply of electricity to generate heat pump thermal energy; and
(c) store the heat pump thermal energy using the at least one thermal storage element.

5. The district energy system of claim 1, further comprising:
(a) a plurality of energy transfer interfaces, each energy transfer interface coupled to a particular building in the plurality of buildings within the district, each energy transfer interface defining both the external electrical coupling interface and external thermal coupling interface corresponding to that particular building, wherein each energy transfer interface enables the transfer of:
  i) thermal energy between the associated HVAC system of that particular building and the district thermal distribution network; and
  ii) electrical energy between that particular building and the district electrical distribution network.

6. The district energy system of claim 5, wherein each energy transfer interface comprises at least one bidirectional heat pump and at least one heat exchanger connectable to the associated HVAC system of that particular building.

7. The district energy system of claim 5, wherein each energy transfer interface is configured to enable a bidirectional transfer of thermal energy between the associated HVAC system of that particular building and the district thermal distribution network.

8. The district energy system of claim 1, wherein a temperature of the heat transfer fluid in the at least one fluid conduit is adjustable.

9. The district energy system of claim 8, wherein the energy management controller is configured to:
(a) determine an on-peak operating temperature and an off-peak operating temperature;
(b) adjust the temperature of the heat transfer fluid to the on-peak operating temperature during an on-peak period in the district; and
(c) adjust the temperature of the heat transfer fluid to the off-peak operating temperature during an off-peak period in the district.

10. The district energy system of claim 8, wherein the energy management controller is configured to:
(a) determine a first seasonal operating temperature and a second seasonal operating temperature;
(b) adjust the temperature of the heat transfer fluid to the first seasonal operating temperature during a first season period in the district; and
(c) adjust the temperature of the heat transfer fluid to the second seasonal operating temperature during a second season period in the district.

11. The district energy system of claim 1, wherein
(a) the at least one thermal storage element comprises at least one short-term thermal storage tank.

12. The district energy system of claim 11, wherein at least one short-term thermal storage tank holds a phase change material as a thermal storage medium.

13. The district energy system of claim 1, wherein
(a) the at least one thermal storage element comprises at least one seasonal storage element.

14. The district energy system of claim 13, wherein:
(a) the at least one seasonal storage element comprises a thermally stratified geothermal storage element, the thermally stratified geothermal storage element having a central storage region and a perimeter storage region, the perimeter storage region at least partially surrounding a perimeter of the central storage region;
(b) the central storage region is operated to store thermal energy of a first temperature and the perimeter storage region is operated to store thermal energy of a second temperature; and
(c) the second temperature is nearer to an environmental temperature of a surrounding environment than the first temperature.

15. The district energy system of claim 1, further comprising at least one electrical storage element electrically coupled to the district electrical distribution network.

16. The district energy system of claim 1, further comprising at least one EV charging interface coupled to the district electrical distribution network, each EV charging interface operable to charge and discharge a vehicle energy storage system of an electric vehicle electrically connected thereto.

17. The district energy system of claim 1, wherein the central energy management unit is housed within one or more shipping containers.

18. The district energy system of claim 13, wherein each energy provisioning unit other than the at least one seasonal storage element is housed within a separate shipping container.

19. The district energy system of claim 1, wherein:
(a) the at least one energy provisioning unit comprises a plurality of energy provisioning units including the at least one thermal storage element and at least one energy generating element;
(b) the central energy management unit comprises an internal thermal distribution network operable to transfer thermal energy to and from each of the energy provisioning units, the internal thermal distribution network comprising a plurality of fluid conduit networks, the plurality of fluid conduit networks comprising a first fluid conduit network and a second fluid conduit network, wherein each fluid conduit network is fluidly coupled to each energy provisioning unit; wherein
the first fluid conduit network transports a first heat transfer fluid in a first temperature range that is greater than 60° C.; and
the second fluid conduit network transports a second heat transfer fluid in a second temperature range between 15° C. and 60° C.

20. The district energy system of claim 19, wherein the plurality of fluid conduit networks comprises a third fluid conduit network, wherein the third fluid conduit network transports a third heat transfer fluid in a third temperature range that is less than 15° C.

21. The district energy system of claim 19, wherein
(a) each fluid conduit network is fluidly coupled to each energy provisioning unit by a unit specific conduit interface; and
(b) the unit specific conduit interface for each energy provisioning unit comprises:
  i) a pair of fluid conduits, the pair of fluid conduits comprising a supply conduit and a return conduit;
  ii) a fluid pump operable to control the flow of heat transfer fluid through the supply conduit and the return conduit; and
  iii) a heat exchanger coupled to the pair of fluid conduits, the heat exchanger operable to adjust a temperature of the heat transfer fluid received from the supply conduit prior to the heat transfer fluid being returned to the fluid conduit network via the return conduit.

22. The district energy system of claim 21, wherein
(a) the pair of fluid conduits is selectively connectable to each fluid conduit network; and
(b) the unit specific conduit interface for each energy provisioning unit comprises a thermal loop valve that is operable to adjust which fluid conduit network is connected to the pair of fluid conduits, wherein the thermal loop valve is configured to prevent the pair of fluid conduits from being connected to more than one of the fluid conduit networks at any given time.

23. The district energy system of claim 21, wherein the unit specific conduit interface for each energy provisioning unit comprises a separate pair of fluid conduits connectable to each fluid conduit network.

24. The district energy system of claim 1, wherein the energy management controller is configured to:
(a) determine that the district operational energy state is an excess carbon-free electricity supply state; and
(b) control the operation of the at least one energy provisioning unit and/or the thermal coupling between the district thermal distribution network and the at least one energy provisioning unit to prioritize electrification of thermal loads over non-harvested energy resources.

25. The district energy system of claim 1, wherein the at least one energy provisioning unit comprises a combined heat and power generation unit and the energy management controller is configured to:
(a) determine that the district operational energy state is a fossil fuel electricity supply state; and
(b) control the operation of the at least one energy provisioning unit and/or the thermal coupling between the district thermal distribution network and the at least one energy provisioning unit to prioritize use of thermal energy from the combined heat and power generation unit as a thermal source for the district thermal distribution network over non-harvested energy resources.

26. The district energy system of claim 1, wherein the energy management controller is configured to:
(a) control the operation of the at least one energy provisioning unit and/or the thermal coupling between the district thermal distribution network and the at least one energy provisioning unit based on one or more operational criteria, wherein the one or more operational criteria include at least one of:
 i) a GHG emission minimization criteria;
 ii) a grid ancillary service criteria;
 iii) a service disruption resiliency criteria; or
 iv) a risk management flexibility criteria.

27. The district energy system of claim 1, wherein the energy management controller is configured to:
(a) determine that the district operational energy state is an excess harvested thermal energy state; and
(b) control the operation of the at least one energy provisioning unit and/or the thermal coupling between the district thermal distribution network and the at least one energy provisioning unit to prioritize use of the excess harvested thermal energy as a thermal source for the district thermal distribution network over non-harvested energy resources.

28. A district energy system for a district comprising a plurality of buildings, each building having an associated heating, ventilation, and air conditioning (HVAC) system and associated electrical loads, the district energy system comprising:
(a) at least one energy provisioning unit, the at least one energy provisioning unit including at least one thermal energy provisioning unit and at least one electrical energy provisioning unit; and
(b) an energy management controller;
(c) a district thermal distribution network thermally coupled to the at least one thermal energy provisioning unit and the energy management controller, the district thermal distribution network comprising at least one fluid conduit, each fluid conduit transporting a heat transfer fluid, the district thermal distribution network comprising a plurality of external thermal coupling interfaces, each external thermal coupling interface connectable to the associated HVAC system of one of the buildings in the plurality of buildings within the district, wherein the district thermal distribution network is operable to transfer thermal energy between the at least one thermal energy provisioning unit and each external thermal coupling interface using the heat transfer fluid;
(d) a district electrical distribution network electrically coupled to the at least one electrical energy provisioning unit, the district electrical distribution network comprising a plurality of external electrical coupling interfaces, each external electrical coupling interface connectable to one of the buildings in the plurality of buildings within the district, wherein the district electrical distribution network is operable to transfer electrical energy between the at least one electrical energy provisioning unit and each external electrical coupling interface;
wherein
the energy management controller is configured to:
 determine a district thermal energy demand and a district electrical energy demand for the plurality of buildings based on a thermal demand of the HVAC system of each building and associated electrical loads of each building;
 determine a district electricity supply state of the at least one electrical energy provisioning unit;
 determine a district operational energy state based on the district thermal energy demand, district electrical energy demand, and the district energy supply state; and
 adjust the operation of the at least one thermal energy provisioning unit and/or the thermal coupling between the district thermal distribution network and the at least one thermal energy provisioning unit based on the district operation energy state such that a set of the thermal energy provisioning units coupled with the plurality of external thermal coupling interfaces using the thermal distribution network is responsive to the district operational energy state.

* * * * *

UNITED STATES PATENT AND TRADEMARK OFFICE
CERTIFICATE OF CORRECTION

PATENT NO. : 12,078,370 B2
APPLICATION NO. : 17/301907
DATED : September 3, 2024
INVENTOR(S) : James Scott Cotton et al.

Page 1 of 1

It is certified that error appears in the above-identified patent and that said Letters Patent is hereby corrected as shown below:

In the Specification

Column 26, Line 48:
CUP should recite -- CHP --

Column 26, Line 59:
CUP should recite -- CHP --

Column 85, Line 20:
"and/of" should recite -- "and/or" --

Signed and Sealed this
Fourth Day of February, 2025

Coke Morgan Stewart
*Acting Director of the United States Patent and Trademark Office*